(12) United States Patent
Siminoff

(10) Patent No.: US 10,511,810 B2
(45) Date of Patent: Dec. 17, 2019

(54) ACCESSING CAMERAS OF AUDIO/VIDEO RECORDING AND COMMUNICATION DEVICES BASED ON LOCATION

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/028,252

(22) Filed: Jul. 5, 2018

(65) Prior Publication Data

US 2019/0014291 A1 Jan. 10, 2019

Related U.S. Application Data

(60) Provisional application No. 62/529,460, filed on Jul. 6, 2017.

(51) Int. Cl.
*H04N 7/18* (2006.01)
*H04M 11/02* (2006.01)
(Continued)

(52) U.S. Cl.
CPC ............ *H04N 7/18* (2013.01); *H04M 1/0291* (2013.01); *H04M 1/7253* (2013.01);
(Continued)

(58) Field of Classification Search
CPC .. H04N 7/186; H04N 21/482; H04N 21/4424; H04N 21/4223; H04N 7/18;
(Continued)

(56) References Cited

U.S. PATENT DOCUMENTS 4,764,953 A 8/1988 Chern et al.
5,428,388 A 6/1995 von Bauer et al.
(Continued)

FOREIGN PATENT DOCUMENTS

CN 2585521 Y 11/2003
CN 2792061 Y 6/2006
(Continued)

*Primary Examiner* — Stella L. Woo
(74) *Attorney, Agent, or Firm* — Chong IP Law, LLP

(57) ABSTRACT

First data representing geographic coordinates defining a proximity zone for access to an A/V recording and communication device may be received from a first client device associated with the A/V recording and communication device. Based at least in part on a graphical user interface being accessed within an application executing on the second client device, second data representing a location of the second client device may be received. A determination that the second client device is within the proximity zone may be made, and third data indicating that the A/V recording and communication device is accessible by the second client device may be transmitted to the second client device. A request for access to the A/V recording and communication device may be received from the second client device, and image data generated by the A/V recording and communication device may be obtained and transmitted to the second client device.

20 Claims, 28 Drawing Sheets

(51) Int. Cl.
  *H04N 21/4223* (2011.01)
  *H04N 21/442* (2011.01)
  *H04N 21/482* (2011.01)
  *H04M 1/02* (2006.01)
  *H04M 1/725* (2006.01)

(52) U.S. Cl.
  CPC ....... *H04M 1/72536* (2013.01); *H04M 11/02* (2013.01); *H04M 11/025* (2013.01); *H04N 21/4223* (2013.01); *H04N 21/442* (2013.01); *H04N 21/482* (2013.01)

(58) Field of Classification Search
  CPC ...... H04N 21/442; H04N 7/181; H04N 7/147; H04N 7/152; H04N 2007/145; H04N 21/21805; H04N 21/25; H04N 21/25816; H04N 21/41407; H04N 21/4627; H04N 21/4788; H04N 5/23258; H04N 7/15; H04N 7/185; H04M 11/025; H04M 1/0291; H04M 1/02; H04M 11/02; H04M 2203/2094; H04M 2242/30; H04W 12/00503; H04W 4/02; H04W 4/023
  See application file for complete search history.

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2009/0094649 A1* | 4/2009 | Patel ............... G08B 13/19641 725/86 |
| 2009/0174763 A1* | 7/2009 | Bengtsson ............ H04N 7/147 348/14.08 |
| 2010/0149335 A1* | 6/2010 | Miller, II ............... H04N 7/181 348/148 |
| 2010/0225455 A1 | 9/2010 | Claiborne et al. | |
| 2011/0058034 A1* | 3/2011 | Grass ............... G08B 13/19656 348/143 |
| 2013/0057695 A1 | 3/2013 | Huisking | |
| 2014/0133831 A1* | 5/2014 | Billau ..................... H04N 5/76 386/262 |
| 2014/0267716 A1 | 9/2014 | Child et al. | |
| 2015/0163463 A1 | 6/2015 | Hwang et al. | |
| 2016/0277708 A1* | 9/2016 | Rintel ................... H04N 7/142 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |

(56) References Cited

FOREIGN PATENT DOCUMENTS

| WO | 2006/038760 A1 | 4/2006 |
|---|---|---|
| WO | 2006/067782 A1 | 6/2006 |
| WO | 2007/125143 A1 | 8/2007 |

* cited by examiner

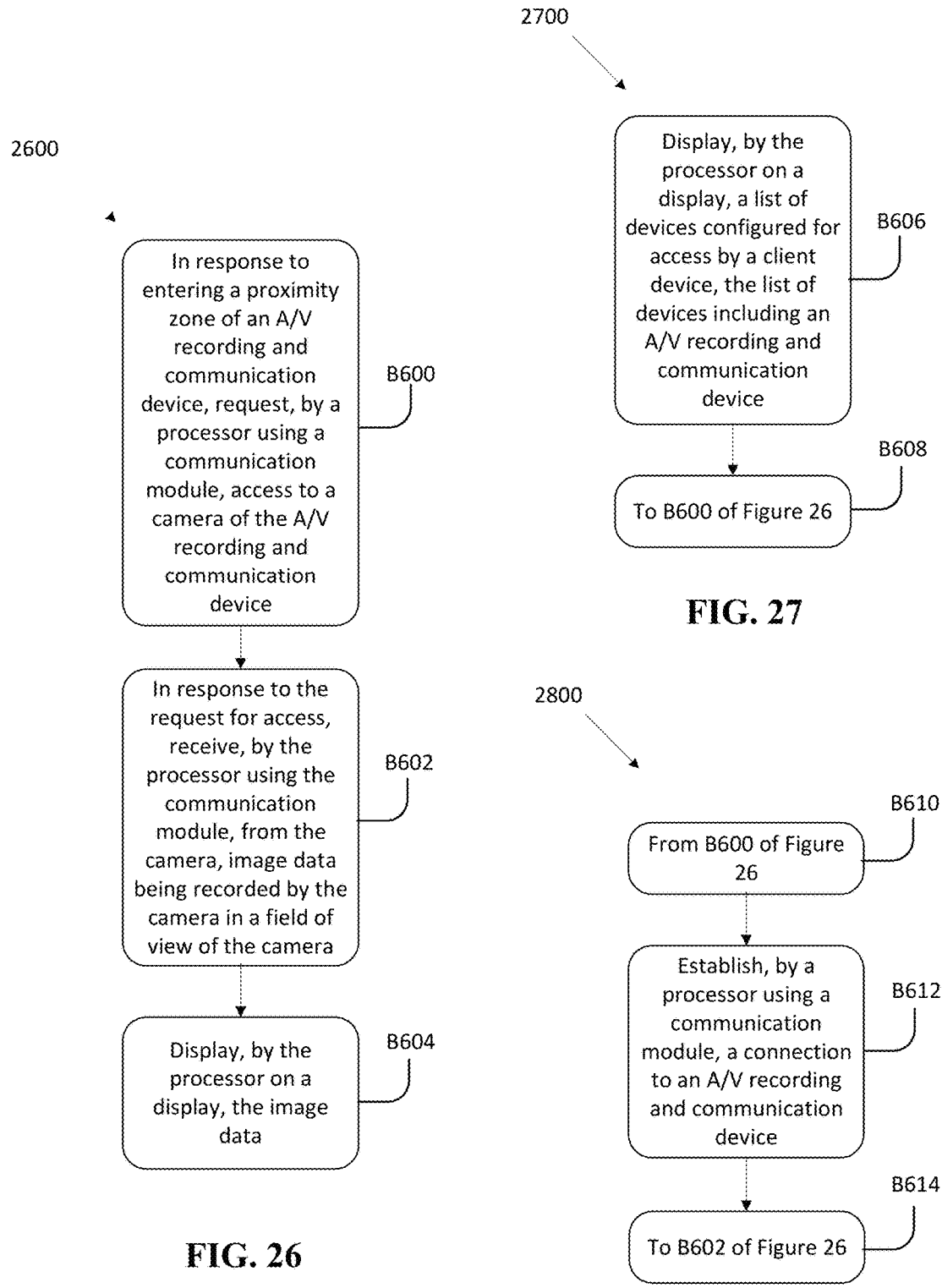

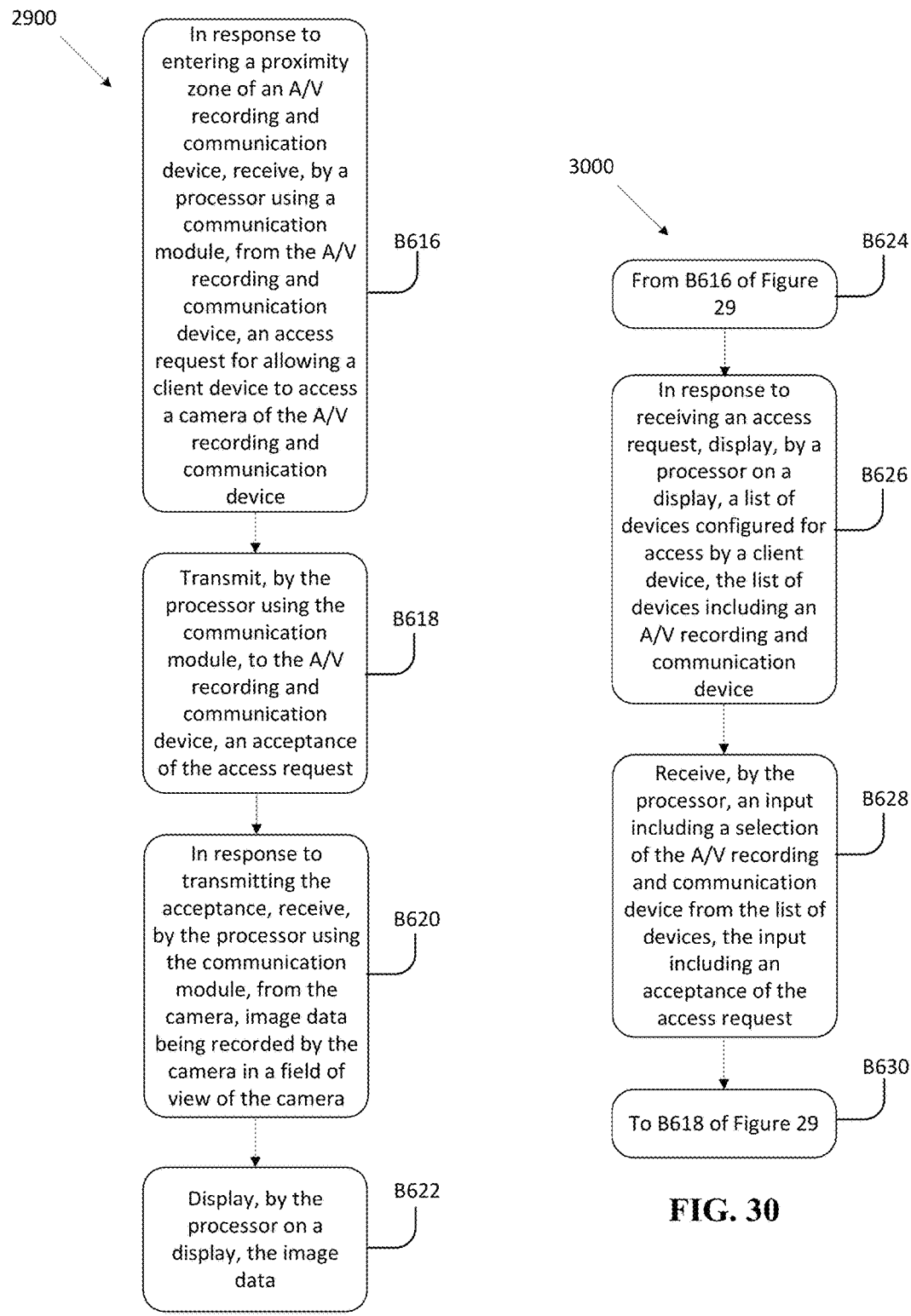

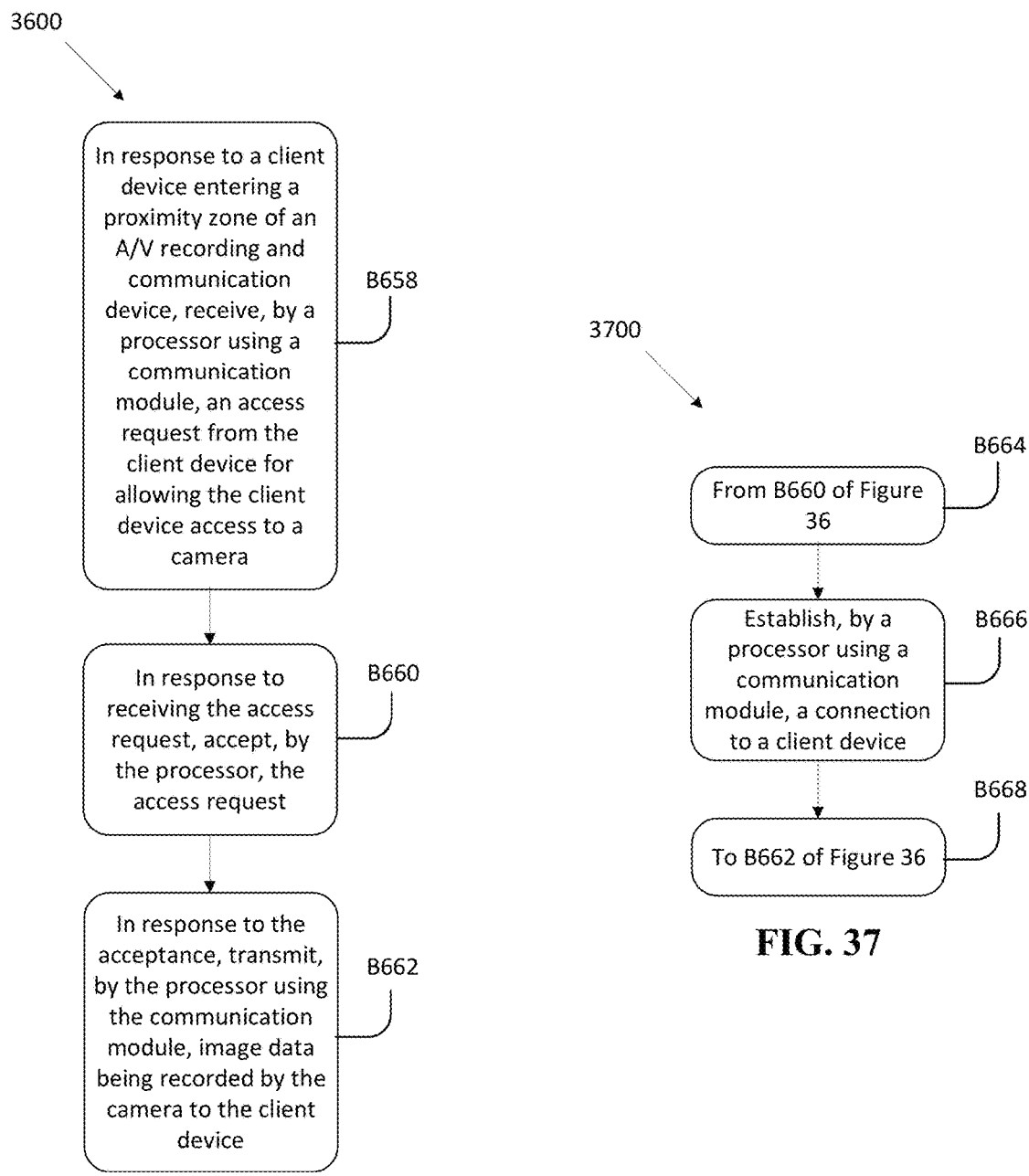

ACCESSING CAMERAS OF AUDIO/VIDEO
RECORDING AND COMMUNICATION
DEVICES BASED ON LOCATION

CROSS-REFERENCE TO RELATED
APPLICATIONS

This application claims priority to provisional application Ser. No. 62/529,460, filed on Jul. 6, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of one or more an A/V recording and communication devices on the exterior of a home, such as a doorbell unit at the entrance of a home, acts as a powerful deterrent against would-be burglars.

SUMMARY

The various embodiments of the present accessing cameras of A/V recording and communication devices based on location have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that as A/V recording and communication devices continue to become more prevalent, leveraging the functionalities of these devices (e.g., video doorbells, security cameras, etc.) by persons other than the owners/users of the A/V recording and communication devices may prove increasingly useful. Current A/V recording and communication devices, other than the present embodiments, sometimes do not allow persons other than the owner/user of the A/V recording and communication device access to the device's functionalities (e.g., the camera, the speaker, etc.). As a result, there may be missed opportunities for persons other than the owners/users of the A/V recording and communication devices to leverage these functionalities to provide safety, security, and peace of mind. For example, a neighborhood may include a plurality of A/V recording and communication devices installed at various homes, and the neighborhood may be dark and/or dangerous. As a result, a person walking through the neighborhood may desire to view video being recorded in a field of view of one or more of the A/V recording and communication devices in order to determine if there is any suspicious activity or suspicious persons in the neighborhood.

The present embodiments solve this problem by leveraging the functionality of A/V recording and communication devices, such as A/V recording and communication doorbells, to allow access to the A/V recording and communication devices by users of client devices in proximity to the A/V recording and communication devices. By allowing this access, the users of the client devices may be able to determine if any suspicious activity and/or persons are present, and in response, take the appropriate action. For example, the users of the client devices may notify law enforcement, leave the area, signal for help, signal an alarm, and/or speak to a suspicious person through a speaker of one or more of the A/V recording and communication devices. Ultimately, because the users of the client devices in proximity to the A/V recording and communication devices may be able to leverage the functionalities of the devices, the safety of the users and the neighborhood, in addition to the overall public safety, may be increased.

In a first aspect, a client device including a display, a communication module, and a processor, in response to entering a proximity zone of an audio/video (A/V) recording and communication device, requests, by the processor using the communication module, access to a camera of the A/V recording and communication device; in response to the request for access, receives, by the processor using the communication module, from the camera, image data being recorded by the camera in a field of view of the camera; and displays, by the processor on the display, the image data.

In an embodiment of the first aspect, the A/V recording and communication device is visible to a user of the client device when the client device is within the proximity zone.

In another embodiment of the first aspect, the proximity zone is defined by the A/V recording and communication device.

In another embodiment of the first aspect, the proximity zone includes the field of view of the camera of the A/V recording and communication device.

In another embodiment of the first aspect, prior to requesting access, the client device determines, by the processor, that the client device has entered the proximity zone.

In another embodiment of the first aspect, determining that the client device has entered the proximity zone includes comparing client device location data to proximity zone location data.

In another embodiment of the first aspect, the client device location data and the proximity zone location data include at least one of global positioning system (GPS) data and Wi-Fi positioning system (WPS) data.

In another embodiment of the first aspect, prior to receiving the image data and after requesting access, the client device establishes a connection to the A/V recording and communication device.

In another embodiment of the first aspect, establishing the connection includes connecting to a network of the A/V recording and communication device.

In another embodiment of the first aspect, the network is a Wi-Fi network.

In another embodiment of the first aspect, the network is an ad hoc network generated by the A/V recording and communication device.

In another embodiment of the first aspect, the connection to the network is an unsecure connection.

In another embodiment of the first aspect, the client device, in response to entering the proximity zone, displays, by the processor on the display, a list of devices configured for access by the client device, the list of devices including the A/V recording and communication device, wherein requesting access to the camera includes receiving, by the processor on the display, a selection of the A/V recording and communication device from the list of devices.

In a second aspect, a client device including a display, a communication module, and a processor, in response to entering a proximity zone of an audio/video (A/V) recording and communication device, receives, by the processor using the communication module, from the A/V recording and communication device, an access request for allowing the client device to access the camera of the A/V recording and communication device; in response to receiving the access request, transmits, by the processor using the communication module, to the A/V recording and communication device, an acceptance of the access request; in response to transmitting the acceptance, receives, by the processor using the communication module, from the camera, image data being recorded by the camera in a field of view of the camera; and displays, by the processor on the display, the image data.

In an embodiment of the second aspect, the A/V recording and communication device is visible to a user of the client device when the client device is within the proximity zone.

In another embodiment of the second aspect, the proximity zone is defined by the A/V recording and communication device.

In another embodiment of the second aspect, the proximity zone includes the field of view of the camera of the A/V recording and communication device.

In another embodiment of the second aspect, a determination that the client device has entered the proximity zone includes comparing client device location data to proximity zone location data.

In another embodiment of the second aspect, the client device location data and the proximity zone location data include at least one of global positioning system (GPS) data and Wi-Fi positioning system (WPS) data.

In another embodiment of the second aspect, the client device, prior to receiving the image data and after transmitting the acceptance, establishes, by the processor using the communication module, a connection to the A/V recording and communication device.

In another embodiment of the second aspect, establishing the connection includes connecting to a network of the A/V recording and communication device.

In another embodiment of the second aspect, the network is a Wi-Fi network.

In another embodiment of the second aspect, the network is an ad hoc network generated by the A/V recording and communication device.

In another embodiment of the second aspect, the connection to the network is an unsecure connection.

In another embodiment of the second aspect, in response to receiving the access request, the client device displays, by the processor on the display, a list of devices configured for access by the client device, the list of devices including the A/V recording and communication device, wherein acceptance of the access request includes receiving, by the processor on the display, a selection of the A/V recording and communication device from the list of devices.

In a third aspect, a client device including a display, a communication module, and a processor, in response to entering a proximity zone of an audio/video (A/V) recording and communication device having a camera, receives, by the processor using the communication module, an access request for allowing the client device access to the camera of the A/V recording and communication device; displays, by the processor on the display, a list of devices accessible by the client device, the list of devices including at least the A/V recording and communication device; in response to the displaying and based on the receiving the access request, receives, by the processor, an input including an acceptance of the access request; in response to receiving the input, transmits, by the processor using the communication module, to the A/V recording and communication device, the acceptance of the access request; in response to transmitting the acceptance of the access request, receives, by the processor using the communication module, from the camera of the A/V recording and communication device, image data being recorded in a field of view of the camera; and displays, by the processor on the display, the image data.

In an embodiment of the third aspect, the A/V recording and communication device is visible to a user of the client device when the client device is within the proximity zone.

In another embodiment of the third aspect, the proximity zone is defined by the A/V recording and communication device.

In another embodiment of the third aspect, the proximity zone includes the field of view of the camera of the A/V recording and communication device.

In another embodiment of the third aspect, a determination that the client device has entered the proximity zone includes comparing client device location data to proximity zone location data.

In another embodiment of the third aspect, the client device location data and the proximity zone location data include at least one of global positioning system (GPS) data and Wi-Fi positioning system (WPS) data.

In another embodiment of the third aspect, prior to receiving the image data and after transmitting the acceptance, the client device establishes a connection to the A/V recording and communication device.

In another embodiment of the third aspect, establishing the connection includes connecting to a network of the A/V recording and communication device.

In another embodiment of the third aspect, the network is a Wi-Fi network.

In another embodiment of the third aspect, the network is an ad hoc network generated by the A/V recording and communication device.

In another embodiment of the third aspect, the connection to the network is an unsecure connection.

In a fourth aspect, an audio/video (A/V) recording and communication device including a processor, a communication module, and a camera, in response to detecting the presence of a client device in a proximity zone of the A/V recording and communication device, transmits, by the processor using the communication module, an access request to the client device for allowing the client device access to the camera; in response to the transmitting the access request, receives, by the processor using the communication module, an acceptance of the access request from the client device; and in response to receiving the acceptance, transmits, by the processor using the communication module, image data being recorded by the camera to the client device.

In an embodiment of the fourth aspect, the A/V recording and communication device detects, by the processor using the communication module, the presence of the client device in the proximity zone of the A/V recording and communication device.

In another embodiment of the fourth aspect, detecting the presence of the client device includes scanning, by the processor using the communication module, the proximity zone for network connection signals.

In another embodiment of the fourth aspect, the network connection signals are at least one of Bluetooth signals and Wi-Fi signals.

In another embodiment of the fourth aspect, detecting the presence of the client device further includes, in response to scanning, identifying client device network connection signals being broadcast by the client device.

In another embodiment of the fourth aspect, the proximity zone is generated by the A/V recording and communication device.

In another embodiment of the fourth aspect, the proximity zone is defined by a user of a client device associated with the A/V recording and communication device.

In another embodiment of the fourth aspect, prior to transmitting the image data and after receiving the acceptance, the A/V recording and communication device establishes a connection to the client device.

In another embodiment of the fourth aspect, establishing the connection includes: transmitting, by the processor using the communication module, network access credentials of a network of the A/V recording and communication device to the client device; and in response to the transmitting, connecting, by the processor using the communication module, to the client device over the network.

In another embodiment of the fourth aspect, the network is a Wi-Fi network.

In another embodiment of the fourth aspect, the network is an ad hoc network generated by the A/V recording and communication device.

In another embodiment of the fourth aspect, transmitting the image data includes: analyzing, by the processor, the image data to determine whether a person is present; and in response to determining that a person is present, transmitting the image data to the client device.

In another embodiment of the fourth aspect, transmitting the image data includes: analyzing, by the processor, the image data to determine whether a person is present; in response to determining that a person is present, determining, by the processor, whether the person is a user of the client device; and in response to determining that the person is the user, transmitting, by the processor using the communication module, the image data to the client device.

In a fifth aspect, an audio/video (A/V) recording and communication device including a processor, a communication module, and a camera, in response to a client device entering a proximity zone of the A/V recording and communication device, receives, by the processor using the communication module, an access request from the client device for allowing the client device access to the camera; in response to the receiving the access request, accepts, by the processor, the access request; and in response to the accepting, transmits, by the processor using the communication module, to the client device, image data being recorded by the camera in a field of view of the camera.

In an embodiment of the fifth aspect, accepting the access request includes: analyzing, by the processor, the image data to determine whether a person is present; and in response to determining that a person is present, accepting the access request.

In another embodiment of the fifth aspect, accepting the access request includes: analyzing, by the processor, the image data to determine whether a person is present; in response to determining that a person is present, determining, by the processor, whether the person is a user of the client device; and in response to determining that the person is the user, accepting the access request.

In another embodiment of the fifth aspect, prior to transmitting the image data and after accepting the access request, the A/V recording and communication device establishes a connection to the client device.

In another embodiment of the fifth aspect, establishing the connection includes: transmitting, by the processor using the communication module, network access credentials of a network of the A/V recording and communication device to the client device; and in response to the transmitting, connecting, by the processor using the communication module, to the client device over the network.

In another embodiment of the fifth aspect, the network is a Wi-Fi network.

In another embodiment of the fifth aspect, the network is an ad hoc network generated by the A/V recording and communication device.

In another embodiment of the fifth aspect, the proximity zone is generated by the A/V recording and communication device.

In another embodiment of the fifth aspect, the proximity zone is defined by a user of a client device associated with the A/V recording and communication device.

In a sixth aspect, an audio/video (A/V) recording and communication device including a processor, a communication module, and a camera, generates, by the processor, a proximity zone for detecting the presence of one or more client devices within the proximity zone; based on the generating, detects, by the processor, the presence of a first client device within the proximity zone of the A/V recording and communication device; in response to detecting the presence of the first client device, transmits, by the processor using the communication module, an access request to the client device for allowing the client device access to the camera; in response to the transmitting the access request, receives, by the processor using the communication module, an acceptance of the access request from the client device; and in response to receiving the acceptance, transmits, by the processor using the communication module, image data being recorded by the camera to the client device.

In an embodiment of the sixth aspect, the proximity zone is defined by a user of a client device associated with the A/V recording and communication device.

In another embodiment of the sixth aspect, prior to transmitting the image data and after receiving the acceptance, the A/V recording and communication device establishes a connection to the client device.

In another embodiment of the sixth aspect, establishing the connection includes: transmitting, by the processor using the communication module, network access credentials of a network of the A/V recording and communication device to the client device; and in response to the transmitting, connecting, by the processor using the communication module, to the client device over the network.

In another embodiment of the sixth aspect, the network is a Wi-Fi network.

In another embodiment of the sixth aspect, the network is an ad hoc network generated by the A/V recording and communication device.

In another embodiment of the sixth aspect, transmitting the image data includes: analyzing, by the processor, the image data to determine whether a person is present; and in response to determining that a person is present, transmitting the image data to the client device.

In another embodiment of the sixth aspect, transmitting the image data includes: analyzing, by the processor, the image data to determine whether a person is present; in response to determining that a person is present, determining, by the processor, whether the person is a user of the client device; and in response to determining that the person is the user, transmitting, by the processor using the communication module, the image data to the client device.

In a seventh aspect, a method for use with a client device and an audio/video (A/V) recording and communication device having a camera, comprises: in response to the client device entering a proximity zone of the A/V recording and communication device, receiving, from the client device, an access request to allow the client device access to the camera of the A/V recording and communication device; in response to receiving the access request, transmitting the access request to the A/V recording and communication device; in response to transmitting the access request, receiving, from the A/V recording and communication device, image data being recorded by the camera of the A/V recording and communication device in a field of view of the camera; and in response to receiving the image data, transmitting the image data to the client device.

In an embodiment of the seventh aspect, the proximity zone is generated by the A/V recording and communication device.

In another embodiment of the seventh aspect, the proximity zone is defined by a user of a client device associated with the A/V recording and communication device.

In another embodiment of the seventh aspect, the method is performed by a backend device.

In another embodiment of the seventh aspect, the backend device is a server.

In an eighth aspect, a method for use with a client device and an audio/video (A/V) recording and communication device having a camera, comprises: in response to the client device entering a proximity zone of the A/V recording and communication device, receiving, from the A/V recording and communication device, an access request to allow the client device access to the camera of the A/V recording and communication device; in response to receiving the access request, transmitting the access request to the client device; in response to transmitting the access request, receiving an acceptance of the access request from the client device; in response to the receiving the acceptance, retrieving, from the A/V recording and communication device, image data being recorded by the camera in a field of view of the camera; and in response to retrieving the image data, transmitting the image data to the client device.

In an embodiment of the eighth aspect, the proximity zone is generated by the A/V recording and communication device.

In another embodiment of the eighth aspect, the proximity zone is defined by a user of a client device associated with the A/V recording and communication device.

In another embodiment of the eighth aspect, the method is performed by a backend device.

In another embodiment of the eighth aspect, the backend device is a server.

In a ninth aspect, a method for use with a client device and an audio/video (A/V) recording and communication device having a camera, comprises: receiving, from the A/V recording and communication device, first location information including a proximity zone; receiving, from the client device, second location data including a location of the client device; in response to receiving the second location data and based on the first location data, analyzing the second location data to determine whether the client device is within the proximity zone; based on the determination of whether the client device is within the proximity zone, transmitting, to the client device, an access request for allowing the client device to access the camera of the A/V recording and communication device; in response to transmitting the access request, receiving, from the client device, an acceptance of the access request; in response to receiving the acceptance, retrieving, from the A/V recording and communication device, image data being recorded by the camera in a field of view of the camera; and in response to retrieving the image data, transmitting the image data to the client device.

In an embodiment of the ninth aspect, the proximity zone is generated by the A/V recording and communication device.

In another embodiment of the ninth aspect, the proximity zone is defined by a user of a client device associated with the A/V recording and communication device.

In another embodiment of the ninth aspect, the method is performed by a backend device.

In another embodiment of the ninth aspect, the backend device is a server.

BRIEF DESCRIPTION OF THE DRAWINGS

The various embodiments of the present accessing cameras of A/V recording and communication devices based on location now will be discussed in detail with an emphasis on highlighting the advantageous features. These embodiments depict the novel and non-obvious accessing cameras of A/V recording and communication devices based on location shown in the accompanying drawings, which are for illustrative purposes only. These drawings include the following figures, in which like numerals indicate like parts:

FIGS. 26-39 are flowcharts illustrating processes for accessing cameras of A/V recording and communication devices based on location according to various aspects of the present disclosure;

DETAILED DESCRIPTION

Figure 1:
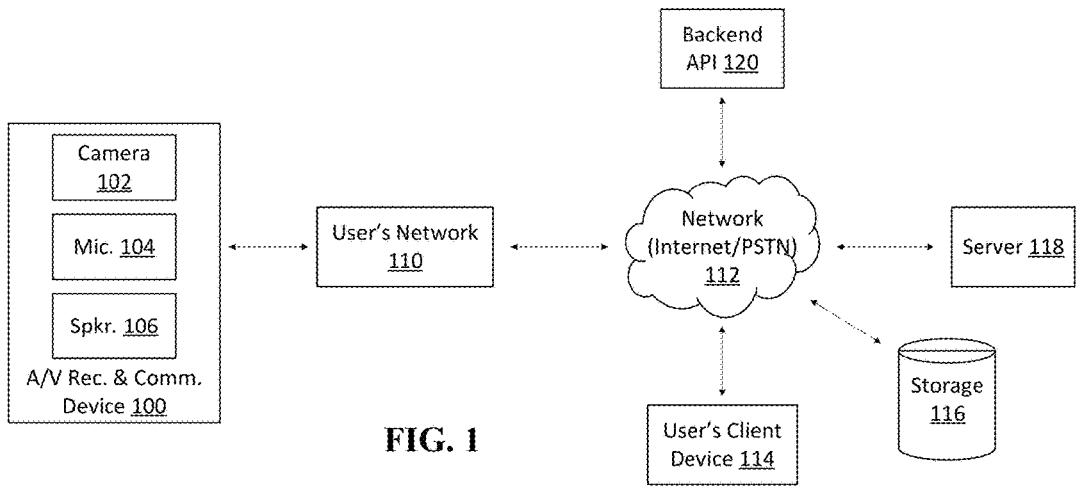
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present accessing cameras of A/V recording and communication devices based on location are described below with reference to the figures. These figures, and their written descriptions, indicate that certain components of the apparatus are formed integrally (e.g., a single unitary piece), and certain other components are formed as separate pieces. Components shown and described herein as being formed integrally may in alternative embodiments be formed as separate pieces. Further, components shown and described herein as being formed as separate pieces may in alternative embodiments be formed integrally.

With reference to FIG. 1, the present embodiments include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite systems (GNSS), such as global positioning system (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
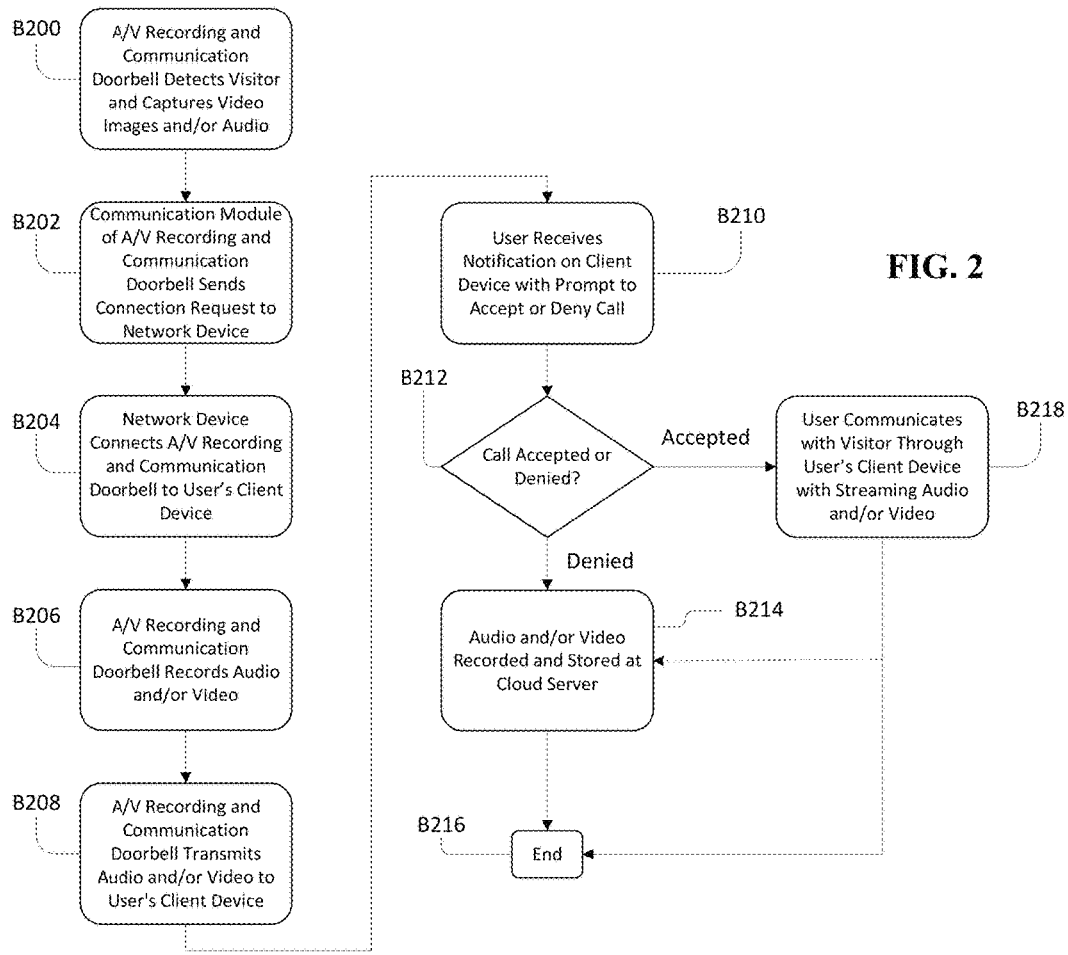
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

FIGS. 3-13 illustrate one embodiment of a low-power-consumption A/V recording and communication doorbell 130 according to various aspects of the present disclosure.

Figure 3:
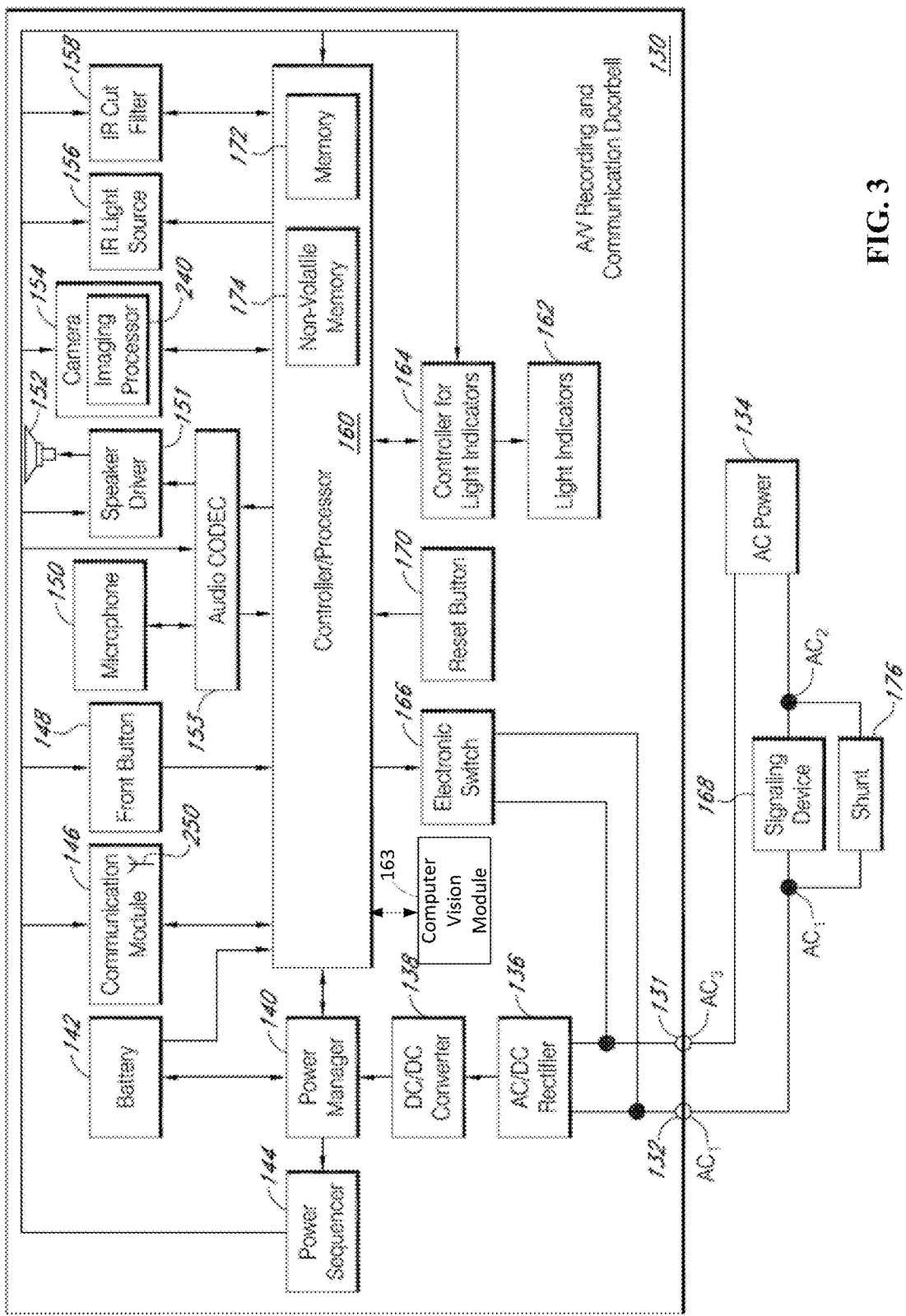
FIG. 3 is a functional block diagram illustrating an embodiment of an A/V recording and communication doorbell system according to the present disclosure.

FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
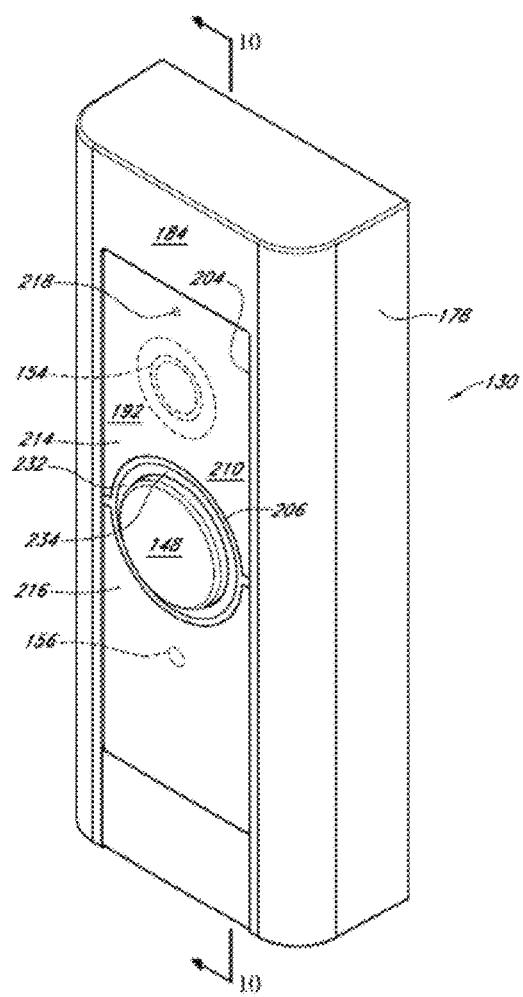
FIG. 4 is a front perspective view of an embodiment of an A/V recording and communication doorbell according to the present disclosure.
Figure 5:
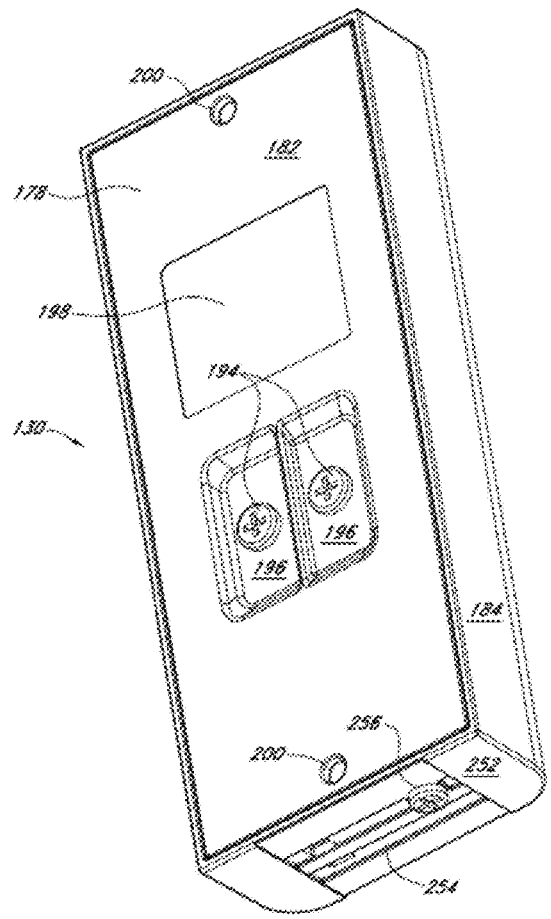
FIG. 5 is a rear perspective view of the A/V recording and communication doorbell of FIG. 4.
Figure 6:
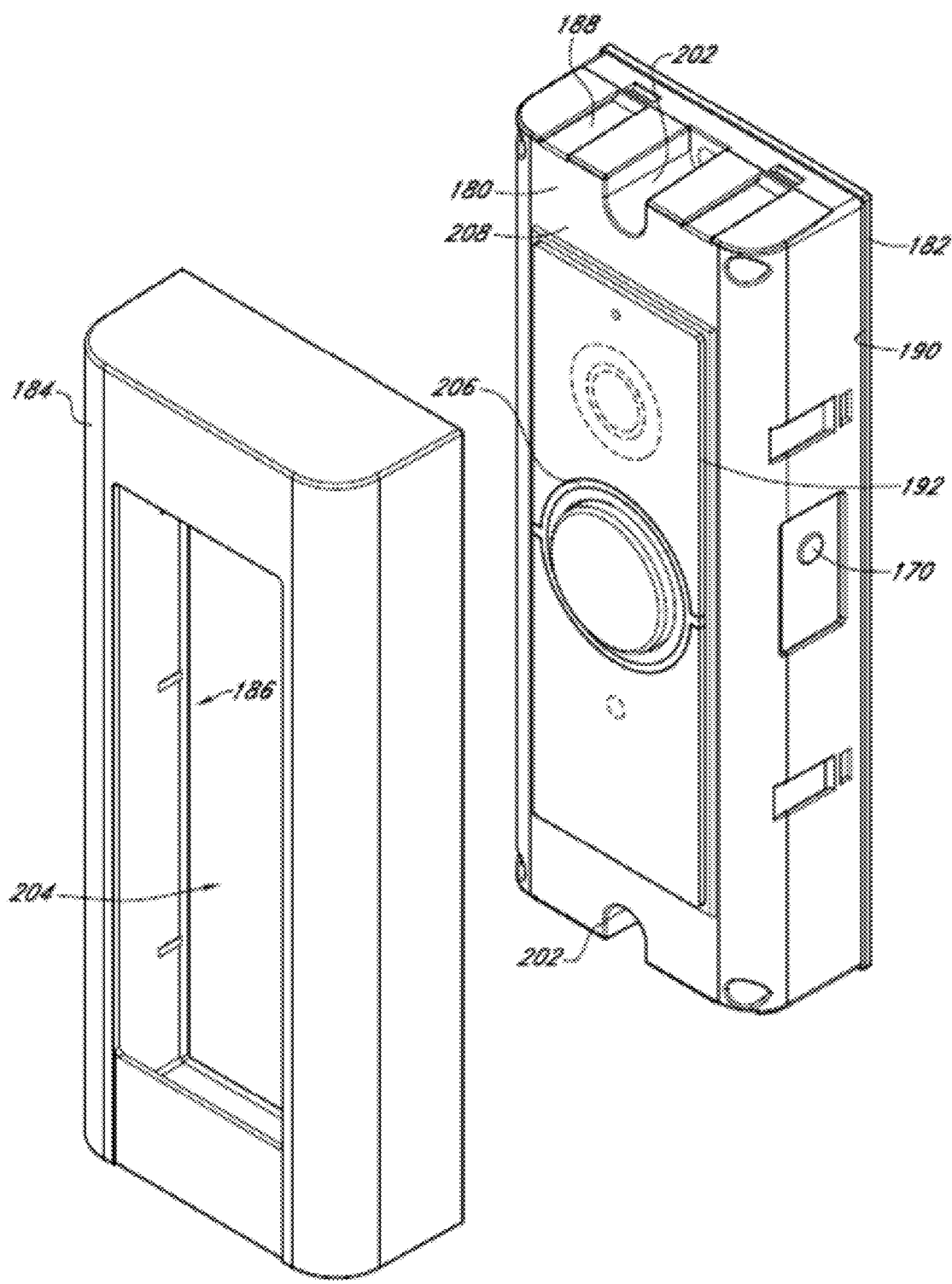
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close-fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
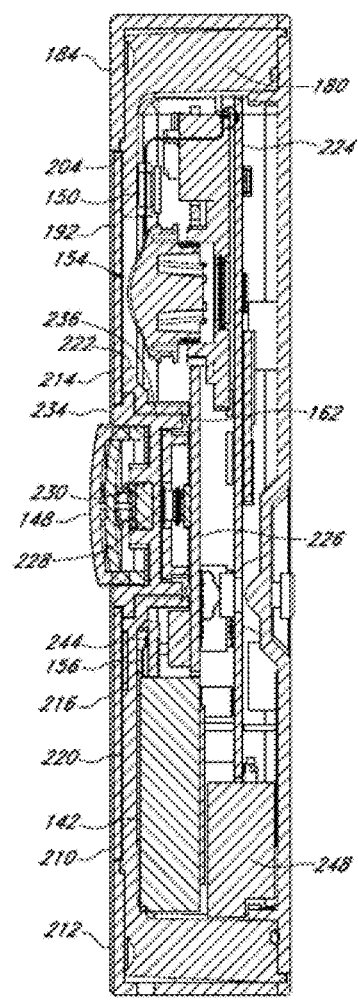
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
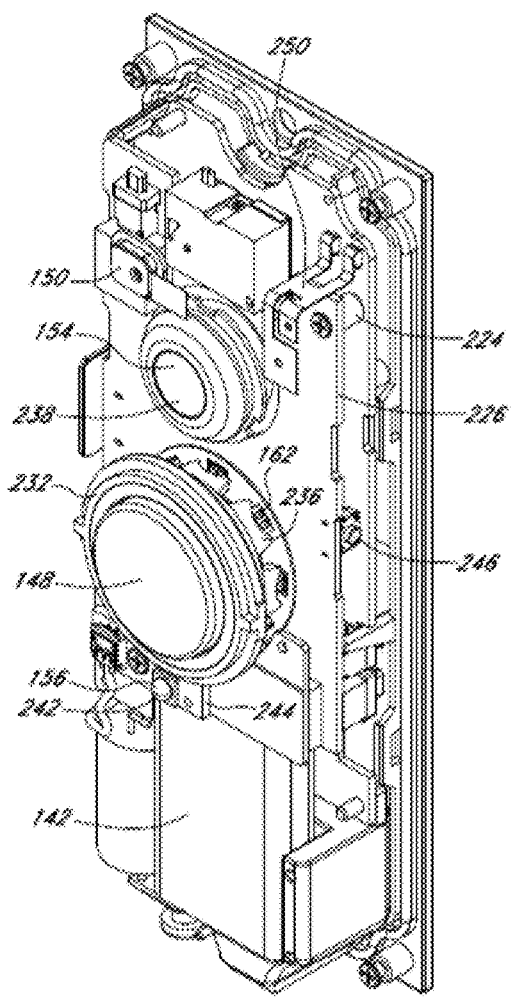
FIGS. 7, 8, and 9 are front perspective views of various internal components of the A/V recording and communication doorbell of FIG. 4.
Figure 8:
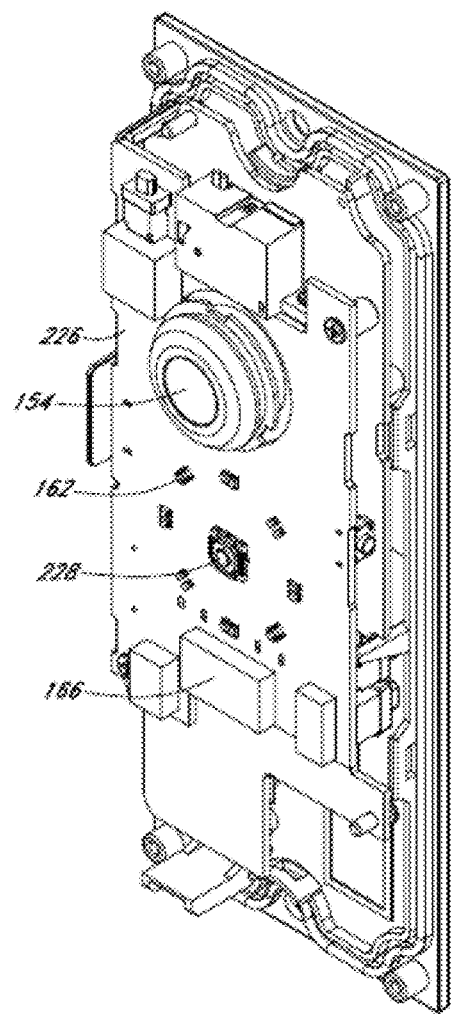
Figure 9:
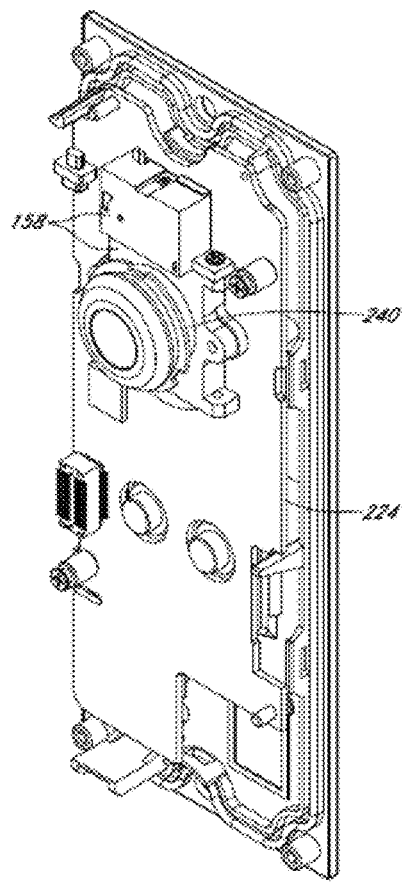

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
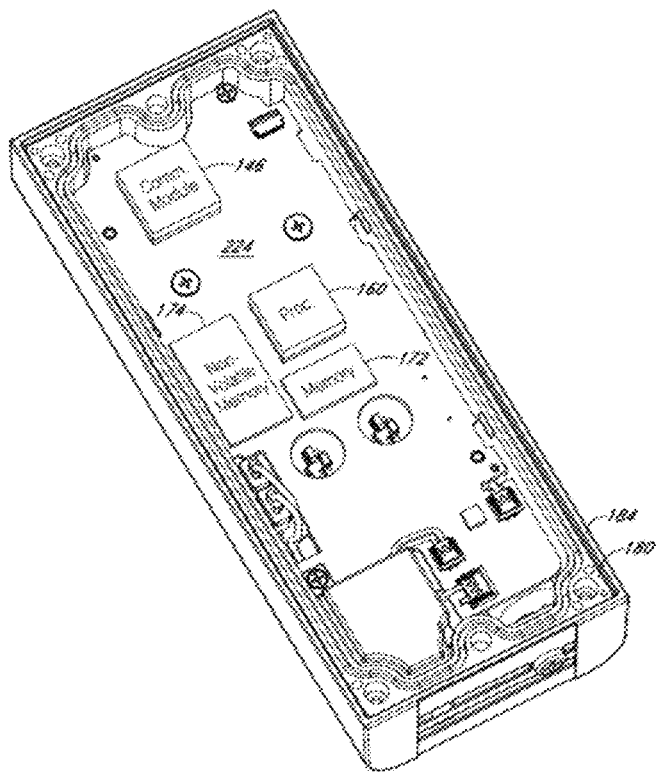
FIGS. 11-13 are rear perspective views of various internal components of the A/V recording and communication doorbell of FIG. 4.
Figure 12:
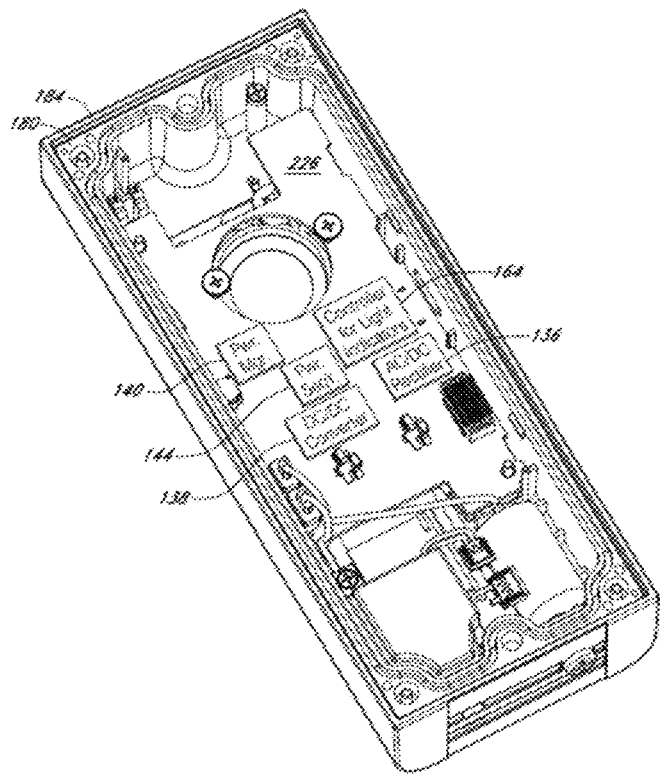
Figure 13:
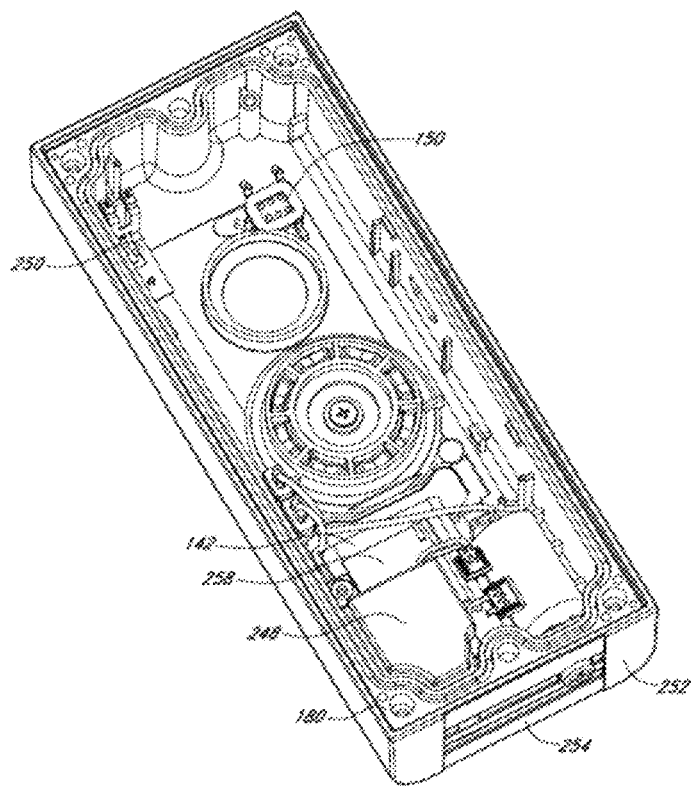

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 16:
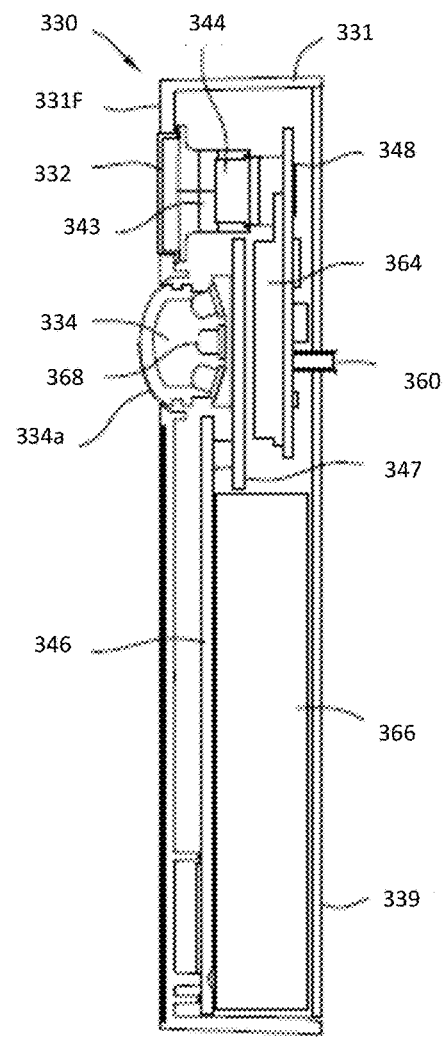
FIG. 16 is right-side cross-sectional view of the A/V recording and communication device of FIG. 14.
Figure 14:
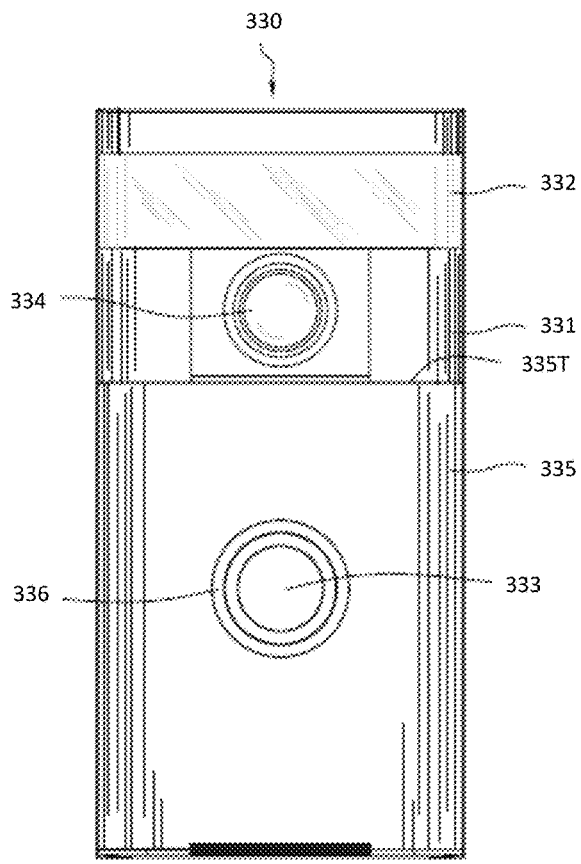
FIG. 14 is a front view of an A/V recording and communication device according to various aspects of the present disclosure.
Figure 15:
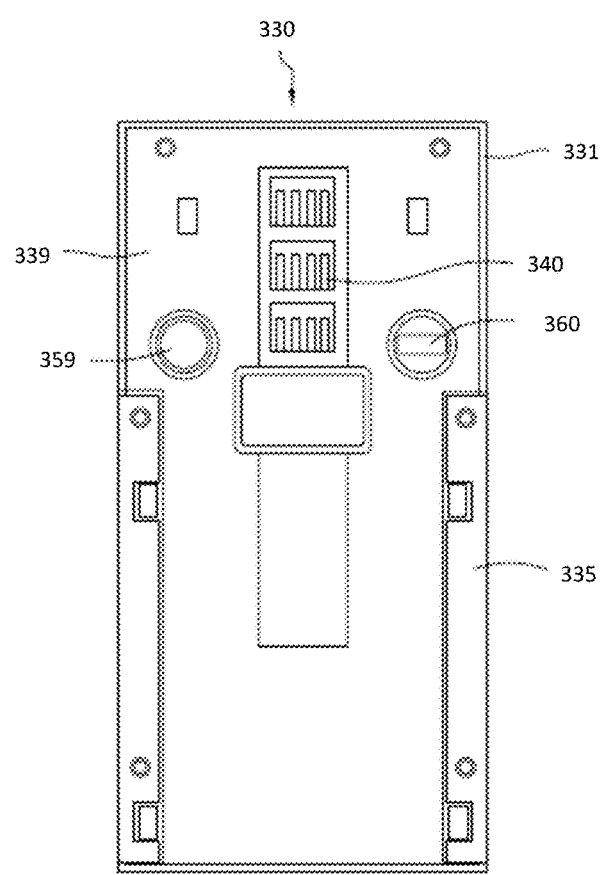
FIG. 15 is a rear view of the A/V recording and communication device of FIG. 14.
Figure 17:
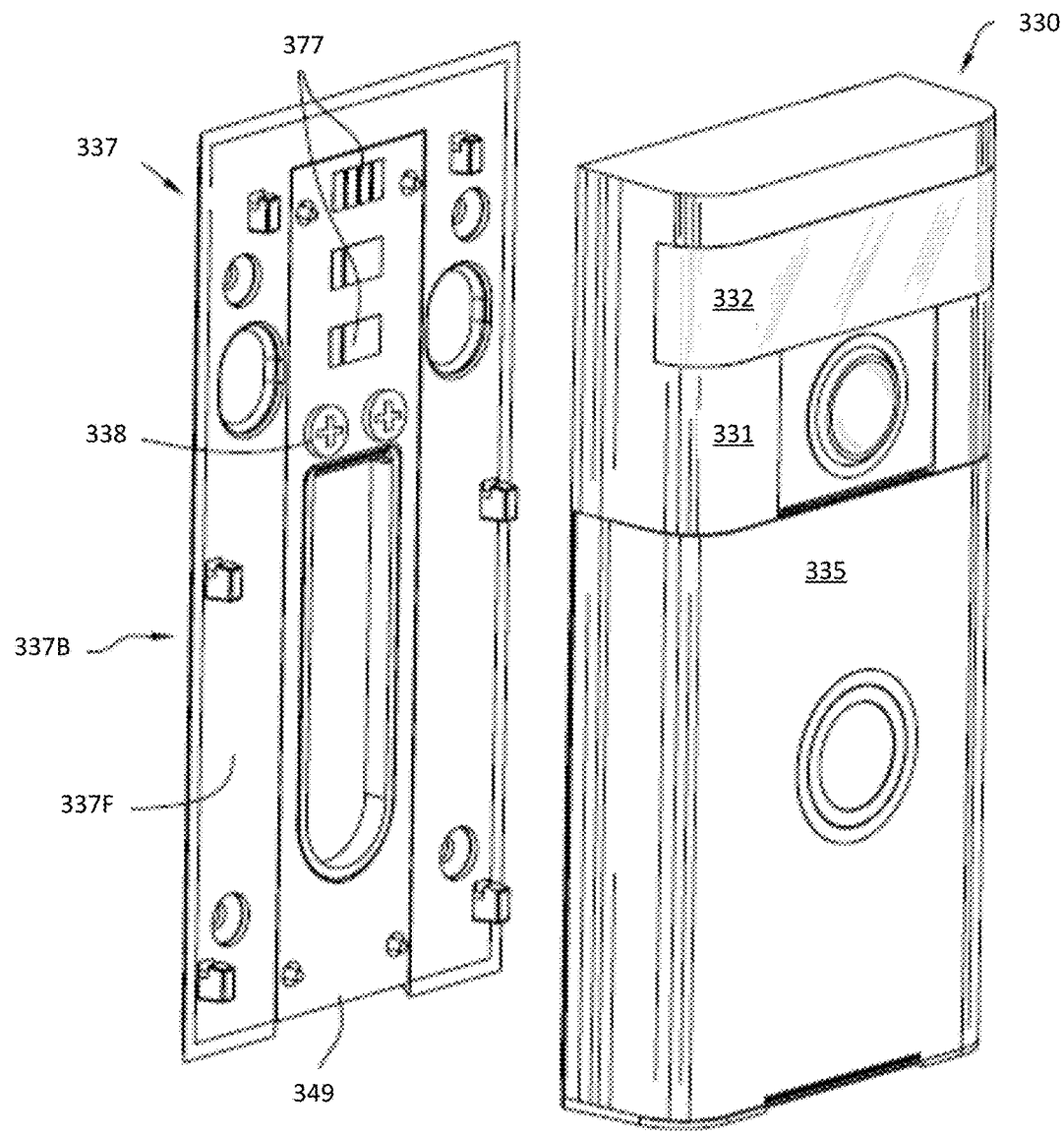
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some embodiments the material of the enclosure 331 preferably permits infrared light to pass through from inside the doorbell 330 to the environment and vice versa. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some embodiments, the doorbell 330 may comprise three PIR sensors 344, as further described below, but in other embodiments any number of PIR sensors 344 may be provided. In some embodiments, one or more of the PIR sensors 344 may comprise a pyroelectric infrared sensor. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
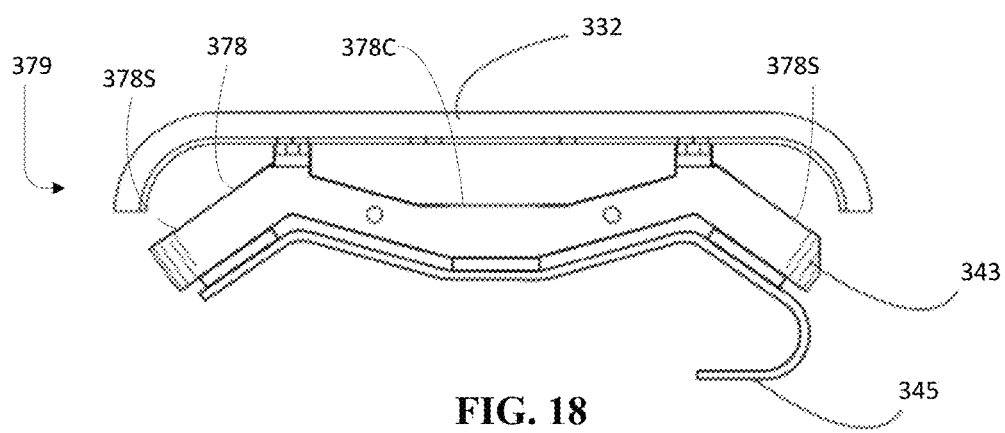
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
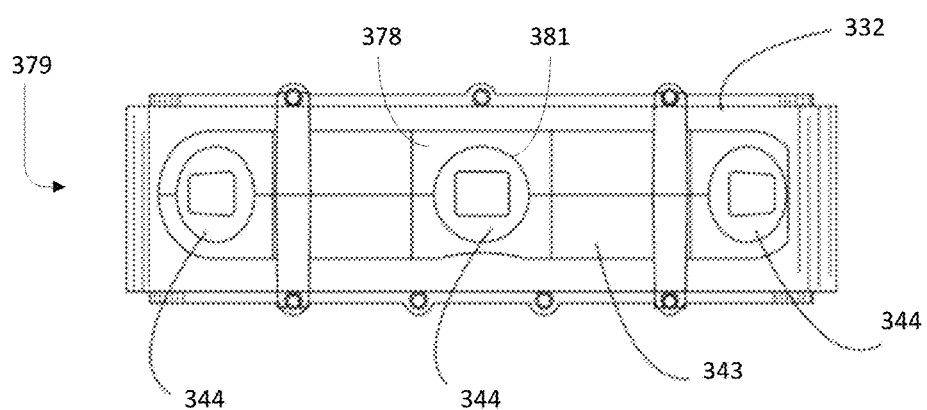
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 20:
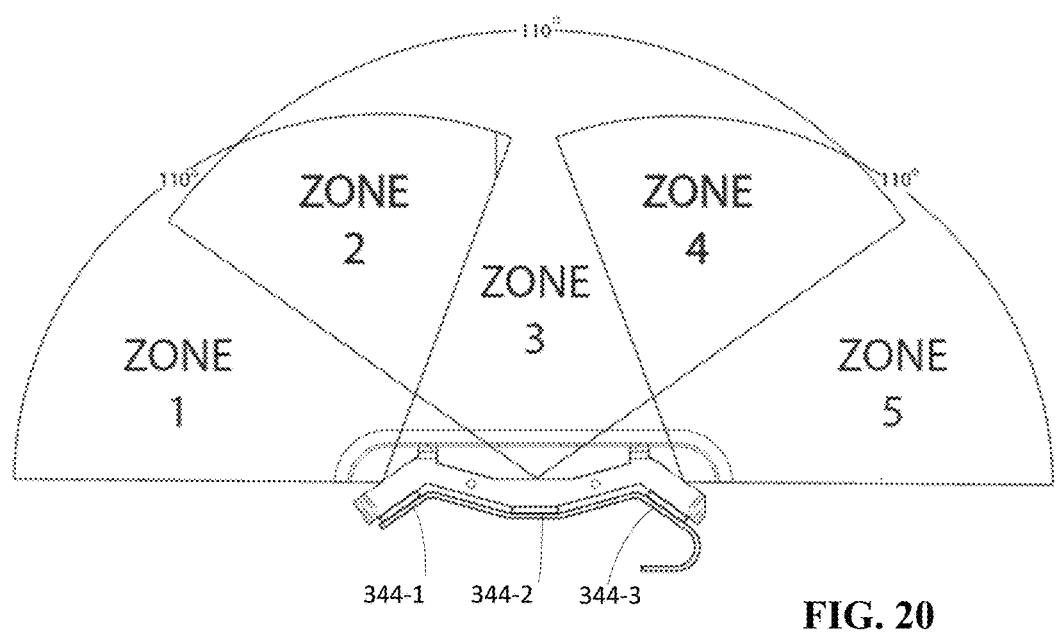
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 21:
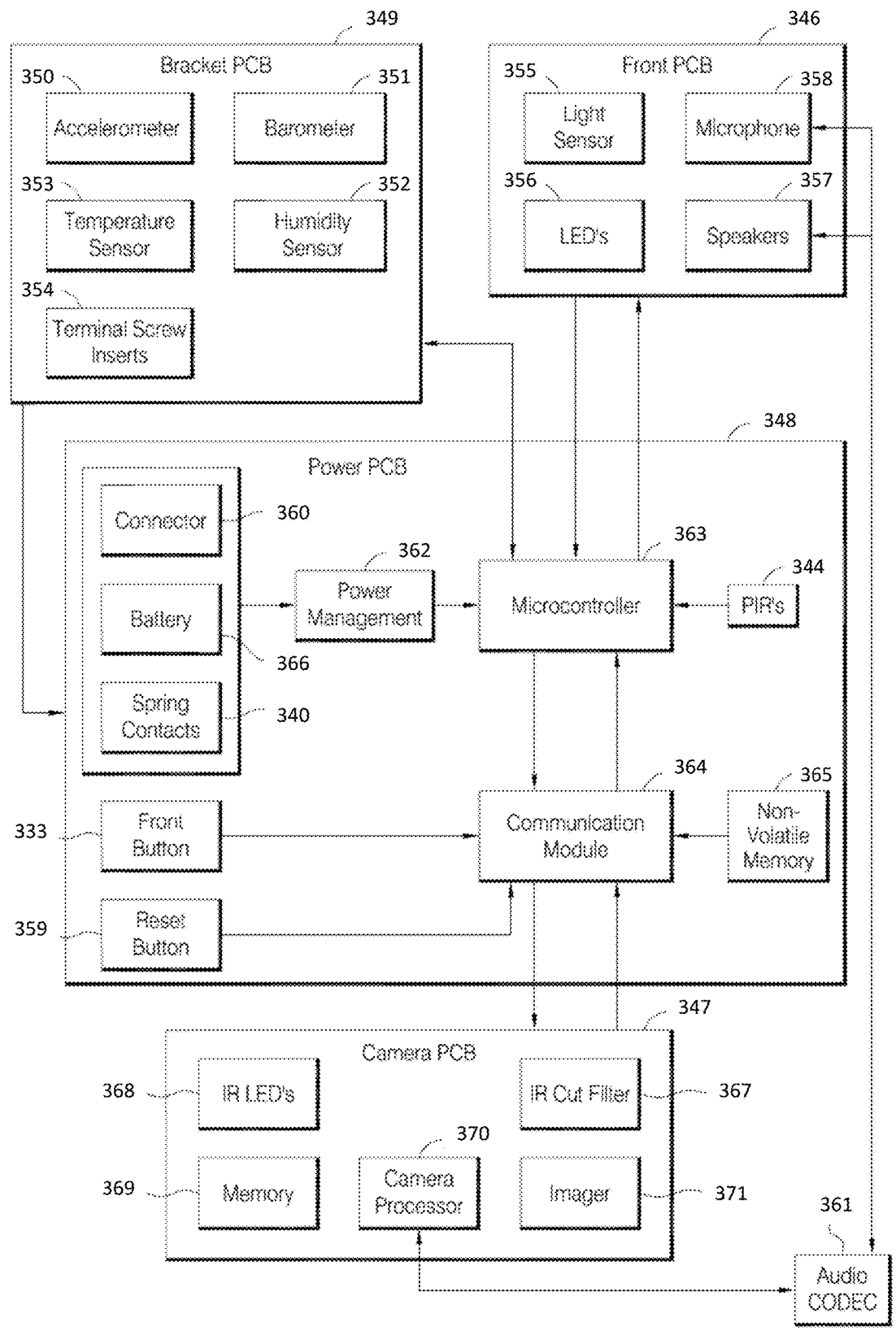
FIG. 21 is a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electromechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication doorbell 130 may include a computer vision module 163. The computer vision module 163 may include any of the components (e.g. hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many core DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

As discussed above, one aspect of the present embodiments includes the realization that as A/V recording and communication devices continue to become more prevalent, leveraging the functionalities of these devices (e.g., video doorbells, security cameras, etc.) by persons other than the owners/users of the A/V recording and communication devices may prove increasingly useful. Current A/V recording and communication devices, other than the present embodiments, sometimes do not allow persons other than the owner/user of the A/V recording and communication device access to the device's functionalities (e.g., the camera, the speaker, etc.). As a result, there may be missed opportunities for persons other than the owners/users of the A/V recording and communication devices to leverage these functionalities to provide safety, security, and peace of mind. For example, a neighborhood may include a plurality of A/V recording and communication devices installed at various homes, and the neighborhood may be dark and/or dangerous. As a result, a person walking through the neighborhood may desire to view video being recorded in a field of view of one or more of the A/V recording and communication devices in order to determine if there is any suspicious activity or suspicious persons in the neighborhood.

The present embodiments solve this problem by leveraging the functionality of A/V recording and communication devices, such as A/V recording and communication doorbells, to allow access to the A/V recording and communication devices by users of client devices in proximity to the A/V recording and communication devices. By allowing this access, the users of the client devices may be able to determine if any suspicious activity and/or persons are present, and in response, take the appropriate action. For example, the users of the client devices may notify law enforcement, leave the area, signal for help, signal an alarm, and/or speak to a suspicious person through a speaker of one or more of the A/V recording and communication devices. Ultimately, because the users of the client devices in proximity to the A/V recording and communication devices may be able to leverage the functionalities of the devices, the safety of the users and the neighborhood, in addition to the overall public safety, may be increased.

For example, in some of the present embodiments, a client device, in response to entering a proximity zone of an audio/video (A/V) recording and communication device, requests, by a processor of the client device using a communication module, access to a camera of the A/V recording and communication device; in response to the request for access, receives, by the processor using the communication module, from the camera, image data being recorded by the camera in a field of view of the camera; and displays, by the processor on the display, the image data.

Figure 22:
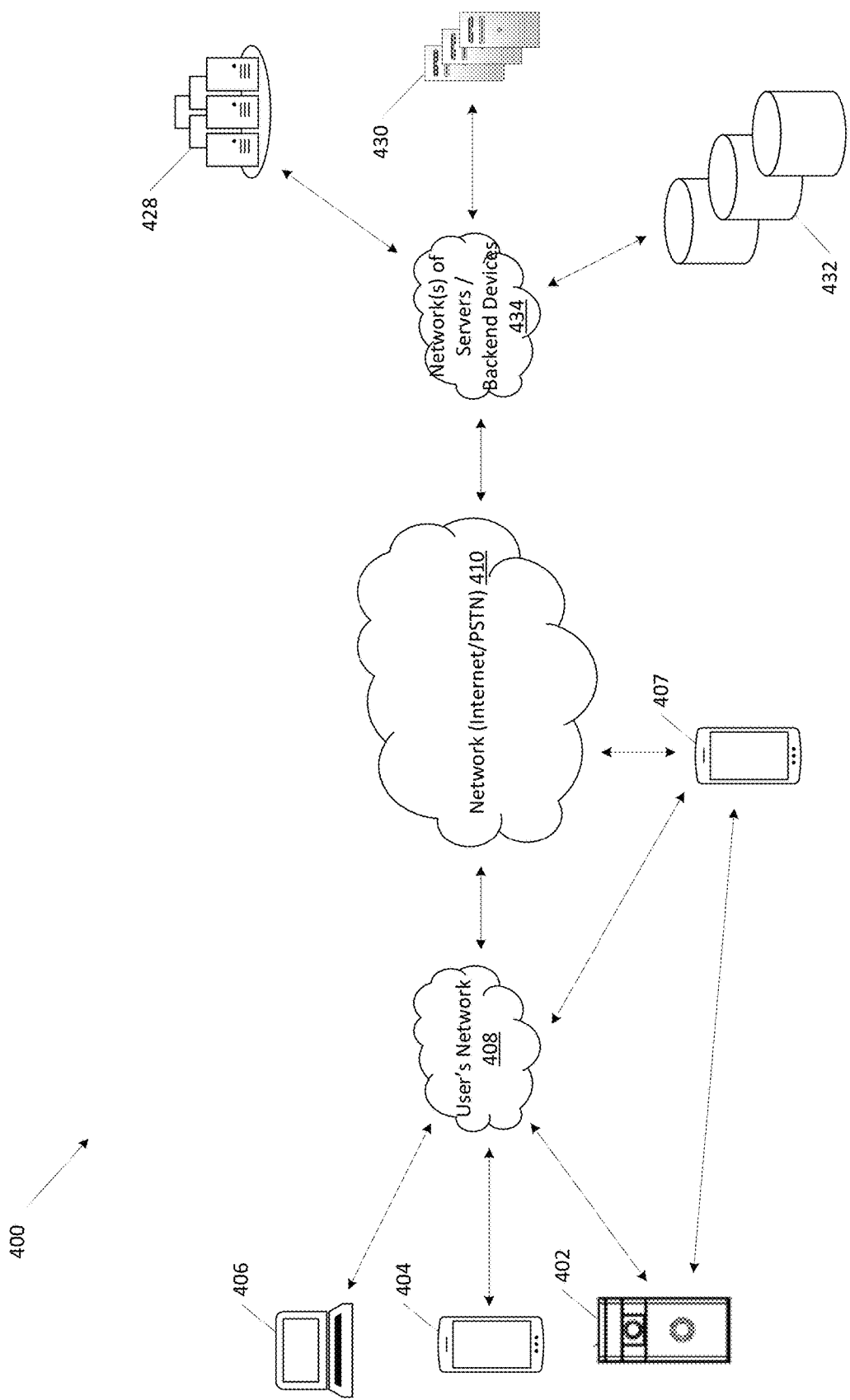
FIG. 22 is a functional block diagram illustrating a system for communicating in a network according to various aspects of the present disclosure.

Now referring to FIG. 22, FIG. 22 is a functional block diagram illustrating a system 400 for communicating in a network according to various aspects of the present disclosure. The system 400 may include one or more audio/video (A/V) recording and communication devices 402 configured to access a user's network 408 to connect to a network (Internet/PSTN) 410. The one or more A/V recording and communication devices 402 may include any or all of the components and/or functionality of the A/V recording and communication device 100 (FIGS. 1-2), the A/V recording and communication doorbell 130 (FIGS. 3-13), and/or the A/V recording and communication doorbell 330 (FIGS. 14-21). As discussed herein, the present disclosure provides numerous examples of methods and systems including A/V recording and communication devices 402, such as A/V recording and communication doorbells, but the present embodiments are equally applicable for A/V recording and communication devices 402 other than doorbells. For example, the present embodiments may include one or more A/V recording and communication security cameras and/or A/V recording and communication security floodlights instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

The user's network 408 may include any or all of the components and/or functionality of the user's network 110 described herein. The network (Internet/PSTN) 410 may include any or all of the components and/or functionality of the network (Internet/PSTN) 112 described herein. The system 400 may also include one or more client devices 404, 406, which in various embodiments may be configured to be in network communication and/or associated with the A/V recording and communication device 402. In some of the present embodiments, the client devices 404, 406 may be configured to be in network communication with one or more backend devices, such as the backend server(s) 430. The client devices 404, 406 may comprise, for example, a mobile phone such as a smartphone, or a computing device such as a tablet computer, a laptop computer, a desktop computer, etc. The client devices 404, 406 may include any or all of the components and/or functionality of the client device 114 and/or the client device 800 described herein. In some embodiments, the client devices 404, 406 may not be associated with the A/V recording and communication device 402. In other words, the user/owner of the client device(s) 404, 406 may not also use/own a A/V recording and communication device 402.

The system 400 may also include one or more client devices 407, which in various embodiments may be configured to be in communication with the one or more A/V recording and communication devices 402. The one or more client devices 407 may be in network communication with the A/V recording and communication device 402 over the network (Internet/PSTN) 410 and/or the user's network 408. In some of the present embodiments, the one or more client devices 407 may be connected to the user's network 408 and communicate with the A/V recording and communication device 402 directly over the user's network 408. In further embodiments, the one or more client devices 407 may be directly connected to the A/V recording and communication device 402 (e.g., where the A/V recording and communication device 402 generates an ad hoc network), and thus communicate directly with the A/V recording and communication device 402 without using the network (Internet/PSTN) 410 and/or the user's network 408. In some of the present embodiments, the client devices 407 may be configured to be in network communication with one or more backend devices, such as the backend server(s) 430. For example, the client devices 407 may communicate with the one or more backend devices to access the image data 460 (FIG. 23) of the A/V recording and communication device 402 (e.g., where the image data 460 is stored on the backend device, such as the backend server 430). The client devices 407 may comprise, for example, a mobile phone such as a smartphone, or a computing device such as a tablet computer, a laptop computer, a desktop computer, etc. The client devices 407 may include any or all of the components and/or functionality of the client device 114 and/or the client device 800 described herein. The client devices 407 may not be associated with any A/V recording and communication devices, including the A/V recording and communication device 402. In some of the present embodiments, the client devices 407 may be associated with an A/V recording and communication device that is not connected to and/or in communication with the user's network 408. In addition, the user/owner of the A/V recording and communication device 402 may not be the user/owner of the client device 407.

With further reference to FIG. 22, the system 400 may also include various backend devices such as (but not limited to) storage devices 432, backend servers 430, and backend APIs 428 that may be in network communication with the A/V recording and communication device 402, the client devices 404, 406, and/or the client devices 407. In some embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

Figure 23:
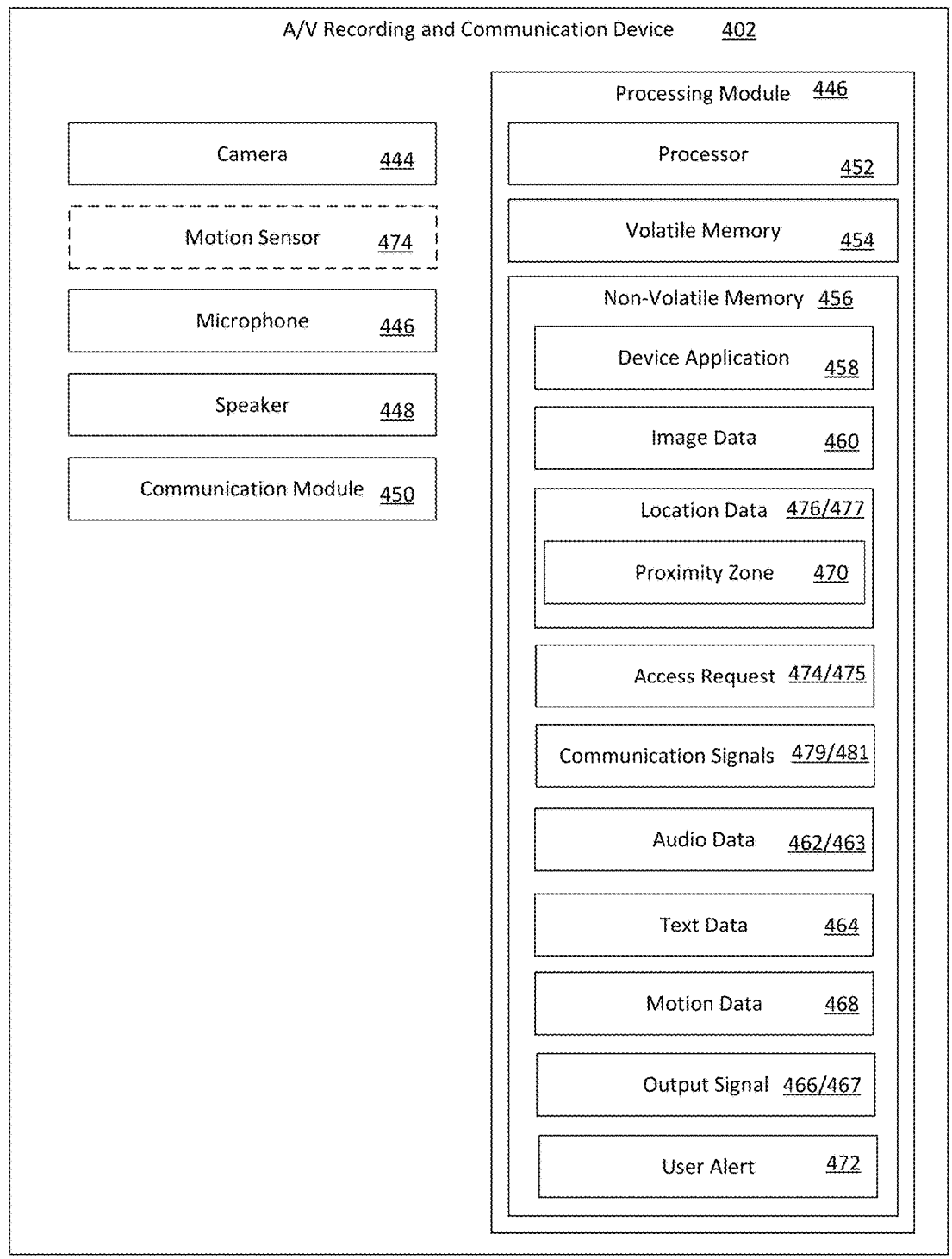
FIG. 23 is a functional block diagram illustrating one embodiment of an A/V recording and communication device according to various aspects of the present disclosure.

FIG. 23 is a functional block diagram illustrating an embodiment of the A/V recording and communication device 402 according to various aspects of the present disclosure. The A/V recording and communication device 402 may comprise a processing module 446 that is operatively connected to a camera 444, a microphone 446, a speaker 448, a motion sensor 474, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, and/or motion data 468 using the camera 444 and/or the motion sensor 474. In some embodiments, the device application 458 may also configure the processor 452 to generate text data 464 describing the image data 460, such as in the form of metadata, for example. In some of the present embodiments, the device application 458 may also configure the processor 452 to generate the proximity zone 470 and/or monitor the proximity zone 470 using the communication module 450. In addition, the device application 458 may configure the processor 452 to transmit the image data 460, the audio data 462, the motion data 468, and/or the text data 464 to the client device 404, 406, the client device 407, and/or the backend server 430 using the communication module 450. In some of the present embodiments, the processor 452 may further configure the device application 458 to transmit the communication signals 479 and/or receive the communication signals 481 (FIG. 25) from the client device 407 and measure the signal strength (e.g., Received Signal Strength Indication (RSSI)) of the communication signals 481.

In various embodiments, the device application 458 may also configure the processor 452 to generate and transmit an output signal 466 that may include the image data 460, the audio data 462, the text data 464, the access request 474, and/or the motion data 468. In some of the present embodiments, the output signal 466 may be transmitted to the backend server(s) 430 using the communication module 450, and the backend server(s) 430 may transmit (or forward) the output signal 466 to the client device 404, 406 and/or the client device 407. In other embodiments, the output signal 466 may be transmitted directly to the client device 404, 406 and/or the client device 407. In some of the present embodiments, the device application 458 may configure the processor 452 to receive the output signal 467 from the client device 407 using the communication module 450, where the output signal 467 may include the access request 475, the location data 477 (e.g., the current physical location of the client device 407), and/or the communication signals 479 generated by the client device 407.

In further reference to FIG. 23, the image data 460 may comprise image sensor data such as (but not limited to) exposure values and data regarding pixel values for a particular sized grid. Further, the image data 460 may comprise converted image sensor data for standard image file formats such as (but not limited to) JPEG, JPEG 2000, TIFF, BMP, or PNG. In addition, the image data 460 may also comprise data related to the still image, video, or combination thereof, included in the image data 460. Such data may include (but is not limited to) image sequences, frame rates, and the like. Moreover, the image data 460 may include data that is analog, digital, compressed, uncompressed, and/or in vector formats.

The image data 460 may include still images, live video, and/or pre-recorded video. The image data 460 may be recorded by the camera 444 in a field of view of the camera 444. The processor 452 may be configured to transmit the image data 460 (e.g., as live streaming video) to the client device 404, 406 and/or the client device 407 (in some embodiments, via the backend server 430). The image data 460 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 23, the motion data 468 may comprise motion sensor data generated in response to motion events. For example, in embodiments using a motion sensor 474, the motion data 468 may include an amount or level of a data type generated by the motion sensor 474. For example, in embodiments that use PIRs, the motion data 468 may include voltage data generated by the motion sensor 474 in response to the presence of infrared radiation. In some of the present embodiments, the motion data 468 may also comprise time-based and/or location-based information such as the amount of time a motion event is detected and/or the location of the motion event in the field of view of the motion sensor 474 (e.g., Zones 1-5 (FIG. 20), the location within one of the Zones 1-5, and/or the proximity to the motion sensor 474). For example, in embodiments that use PIRs, the motion data 468 may include the amount of time an increase in voltage is detected based on the presence of infrared radiation indicative of a motion event. In other embodiments, dependent on the type of motion sensor 474 implemented in a given embodiment, the motion data 468 may include the data type (e.g., voltage) generated specific to the type of motion sensor 474 (e.g., PIR, microwave, acoustic, etc.).

The motion data 468 may further include an estimated speed and/or direction data of the person and/or object that caused the motion event. For example, the motion data 468 may include an estimated speed of a person and/or object passing in a field of view of the motion sensor 474. For another example, the motion data 468 may include a direction that a person and/or object in front of the motion sensor 474 is traveling, such as toward or away from the A/V recording and communication device 402.

In some of the present embodiments, such as those where the A/V recording and communication device is similar to that of the A/V recording and communication doorbell 130 of FIGS. 3-13, the motion data 468 may be generated by the camera 444. In such embodiments, the A/V recording and communication device 402 may not have a motion sensor 474 (as illustrated by the dashed lines around the motion sensor 474 in FIG. 23). As such, the detection of a motion event, the determination of whether a motion event is caused by the movement of a person in a field of view of the A/V recording and communication device 402, and/or the speed and/or location of a person and/or object in the field of view of the A/V recording and communication device 402 may be determined using the motion data 468 generated by the camera 444. In such embodiments, the motion data 468 may include differences between successive frames (e.g., pixels) of the image data 460, where the differences may be the result of motion in the field of view of the camera 444, for example.

With further reference to FIG. 23, the location data 476 may include the location of the A/V recording and communication device 402. The location data 476 may be based on global positioning system (GPS) data, Wi-Fi positioning system (WPS) data, the known location of the Access Point (e.g., router) that the A/V recording and communication device 402 is using to access the user's network 408, the IP Address of the A/V recording and communication device 402, or the like. The location of the A/V recording and communication device 402 may be determined from the location data 476 during a set-up/activation process of the device 402 (and during any subsequent set-up/activation process).

In some of the present embodiments, the location data 476 may include the proximity zone 470. For example, the proximity zone 470 may be an area, region, etc. where, when the client device 407 enters the proximity zone 470, the client device 407 may be able to access and/or communicate with the A/V recording and communication device 402 (e.g., access the camera 444 and/or access the speaker 446). The proximity zone 470 may or may not include the location of the A/V recording and communication device 402, depending on the embodiment. For example, the proximity zone 470 may include a portion of the street on which the house having the A/V recording and communication device 402 is located, but may not include the house and/or the property the house sits on, so as not to encourage the user of the client device 407 to enter the property where the A/V recording and communication device 402 is located. In other embodiments, the proximity zone 470 may include the A/V recording and communication device 402 along with other A/V recording and communication devices (e.g., similar to the illustration of FIG. 41). In such embodiments, the proximity zone 470 may be defined by a portion of a street, a neighborhood, a town, etc., and the A/V recording and communication devices within the proximity zone 470 may share the same or similar proximity zone 470. In some of the present embodiments, the proximity zone 470 may be defined by the user of the client device 404, 406 associated with the A/V recording and communication device 402 (e.g., as user settings). In other embodiments, the proximity zone 470 may be defined by the settings of the A/V recording and communication device 402 (e.g., as default settings).

In various embodiments, the user of the client device 404, 406 may be able to activate a sharing mode of the A/V recording and communication device 402, for example, whereby the A/V recording and communication device 402 may generate and monitor the proximity zone 470 and allow access to the A/V recording and communication device 402 in response to the client device 407 (and/or other client devices) entering the proximity zone 470. In various embodiments, the client device 407 may transmit an access request 475 to the A/V recording and communication device 402 when inside of the proximity zone 470 to request access to the A/V recording and communication device 402. In response, the user of the client device 404, 406 may receive a notification of the access request 475 (FIG. 25) from the A/V recording and communication device 402 (and/or the backend server 430) and determine whether or not to accept the access request 475 from the client device 407. In other embodiments, the client device 407 may be automatically allowed access, or may be allowed access based on the settings of the A/V recording and communication device 402 (e.g., user settings, default settings, etc.). For example, in some of the present embodiments, the client device 407 may be allowed access to the A/V recording and communication device 402 only if the client device 407 is associated with another A/V recording and communication device (e.g., part of a network of users/owners of A/V recording and communication devices). In other words, if the user of the client device 407 is also a user/owner of an A/V recording and communication device (e.g., at a home of the user of the client device 407), and/or the user of the client device 407 has opted in to allow access to his or her A/V recording and communication device 402, the client device 407 may be allowed access to the A/V recording and communication device 402.

With further reference to FIG. 23, the communication signals 479 may be transmitted by the A/V recording and communication device 402 (e.g., within the proximity zone 470). In some of the present embodiments, the communication signals 481 may be transmitted by the client device 407 (FIG. 25) to the A/V recording and communication device 402. The communication signals 479 may include the access request 474 from the A/V recording and communication device 402, such that when the client device 407 enters the proximity zone 470, the client device 407 receives the communication signals 479 including the access request 474. In response, the user of the client device 407 may accept the access request 474 and access the A/V recording and communication device 402. Alternatively, the client device 407 may automatically (without user intervention) accept the access request 474 and access the A/V recording and communication device 402. In some of the present embodiments, the communication signals 479 may be received by the client device 407 (and/or other client devices), and in response, the client device 407 may transmit the location data 477 of the client device 407 to the A/V recording and communication device 402 (and/or the backend server 430) for comparing against the proximity zone 470 to determine if the client device 407 is within the proximity zone 470. Once it is determined that the client device 407 is within the proximity zone 470, the A/V recording and communication device 402 may transmit the access request 474 to the client device 407 to establish connection/communication with the client device 407 (in some embodiments, via the backend server 430).

In other embodiments, the A/V recording and communication device 402 may receive the communication signals 481 from the client device 407, where the communication signals 481 may include the access request 475 and/or the location data 477. In such embodiments, the A/V recording and communication device 402 (and/or the backend server 430) may compare the location data 477 of the client device 407 to the proximity zone 470 to determine if the client device 407 is within the proximity zone 470. If it is determined that the client device 407 is within the proximity zone 470, the client device 407 may be allowed access to the A/V recording and communication device 402.

In some of the present embodiments, as described in greater detail below, the communication signals 479, 481 may be used for defining the proximity zone 470. For example, the communication signals 479, 481 may include Wi-Fi, Bluetooth, ZigBee, and/or other signal types. In some embodiments, for example, the Received Signal Strength Indication (RSSI) of the communication signals 479, 481 may define the proximity zone 470 (because RSSI values may be indicative of a distance from the device transmitting the communication signals 479, 481). For example, the A/V recording and communication device 402 may transmit the communication signals 479 and the client device 407 may receive the communication signals 479 and analyze the communication signals 479 to determine the RSSI values of the communication signals 479. The client device 407 may then transmit the RSSI values of the communication signals 479 to the A/V recording and communication device 402 (and/or the backend server 430), and the A/V recording and communication device 402 (and/or the backend server 430) may compare the RSSI values to the RSSI values that define the proximity zone 470 (e.g., Bluetooth RSSI values greater than −70 dBm on a −100-0 scale) to determine if the client device 470 is within the proximity zone 470. In some of the present embodiments, the client device 407 may transmit the communication signals 481 (e.g., Bluetooth, Wi-Fi (e.g., acting as a mobile hotspot), ZigBee, and/or other signal types) to the A/V recording and communication device 402 and the A/V recording and communication device 402 may analyze the communication signals 481 to determine the RSSI values of the communication signals 481. Once the RSSI values of the communication signals 481 are determined, the A/V recording and communication device 402 (and/or the backend server 430) may determine if the client device 407 is within the proximity zone 470.

In embodiments where the RSSI values are measured, the scale used to determine the RSSI values may be different dependent on the manufacturer of the Wi-Fi chip, Bluetooth chip, ZigBee chip, or other signal type chip. For example, one Bluetooth chip manufacturer may have an RSSI scale of −100-0 dBm while another Bluetooth Chip manufacturer may have an RSSI scale of −200-0 dBm. In embodiments where the A/V recording and communication device 402 is measuring the RSSI values of the communication signals 481 received from the client device 407, the RSSI scale of the chip from the A/V recording and communication device 402 may be known, and the proximity zone 470 may be defined based on the known RSSI scale. However, in embodiments where the client device 407 is measuring the RSSI of the communication signals 479 from the A/V recording and communication device 402, the processor 534 of the client device 407 may program the client application 540 to determine an identification of the chip of the client device 407 and/or the RSSI scale of the particular chip of the client device 407. In response, the client device 407 may transmit the identification of the chip and/or the RSSI scale along with the RSSI values of the communication signals 479 from the A/V recording and communication device 402 to the A/V recording and communication device 402 and/or the backend server 430. In such embodiments, the RSSI values may be normalized, such as by converting the RSSI values to a percentage in view of the RSSI scale, and the percentage may be used to define the proximity zone 470. In another example, an RSSI database may be stored on the A/V recording and communication device 402 and/or the backend server 430, and the client device 407 may transmit the RSSI values and an identification of the chip and/or the RSSI scale to the A/V recording and communication device 402 and/or the backend server 430 to be compared against the RSSI database. In response to comparing the identification of the chip and/or the RSSI scale to the RSSI database, the RSSI values that define the proximity zone 470 may be determined in view of the identification of the chip and/or the RSSI scale. The RSSI values may then be compared to the RSSI values that define the proximity zone 470 to determine if the client device 407 is within the proximity zone 470.

In some of the present embodiments, the communication signals 479, 481 may include signals generated in Low Power Wide Area Networks (LPWAN) such as Long Range Wide Area Network (LoRaWAN™) devices. In such embodiments, location data 476, 477 of the A/V recording and communication device 402 and/or the client device 407 may be based on the communication signals 479, 481 from LPWANs. For example, the A/V recording and communication device 402 and/or the backend server 430 may be in communication with and/or include a LPWAN device (e.g., a concentrator or gateway, such as a LoRa® gateway) configured to operate in LoRaWANs™ and/or other LPWANs. In some of the present embodiments, the LPWAN device may be included in the Access Point (e.g., router) that the A/V recording and communication device 402 is connected. The LPWAN device may be configured to detect the presence and/or location of devices that include an LPWAN sensor (e.g., a LoRa® RF sensor), which in some embodiments, may be the client device 407 and/or the A/V recording and communication device 402. Ultimately, in embodiments that use LPWAN technology, the communication signals 479, 481 (e.g., LoRa® RF signals transmitted by the LoRa® RF sensor) may be received by the LPWAN device and analyzed (e.g., by the LPWAN device, the backend server 430, etc.) to determine the location data 476, 477 of the client device 407 and/or the A/V recording and communication device 402. The location data 476, 477 may then be used by the A/V recording and communication device 402 and/or the backend server 430 to determine if the client device 407 is within the proximity zone 470.

Figure 24:
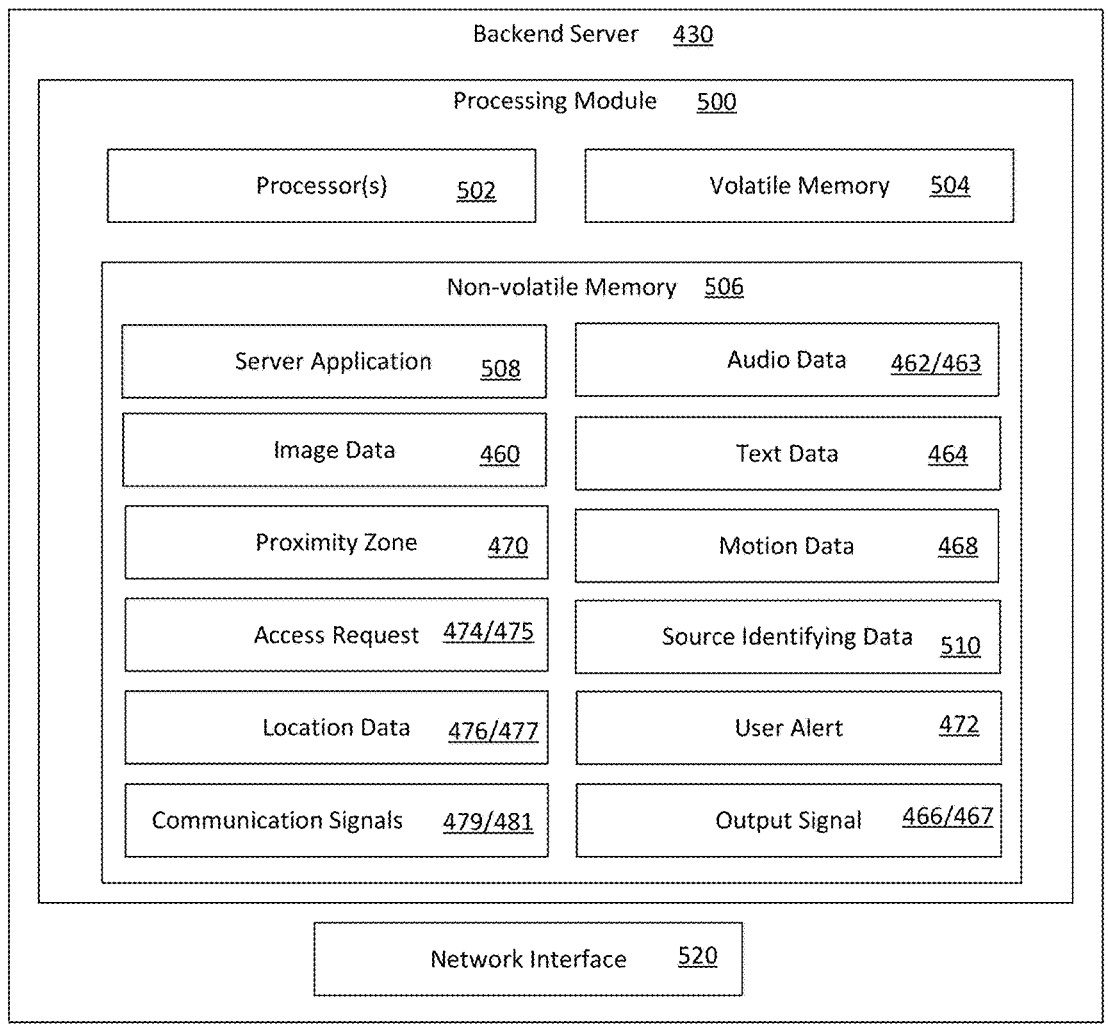
FIG. 24 is a functional block diagram illustrating one embodiment of a backend device according to various aspects of the present disclosure.

FIG. 24 is a functional block diagram illustrating one embodiment of the backend server(s) 430 according to various aspects of the present disclosure. The backend server(s) 430 may comprise a processing module 500 including a processor 502, volatile memory 504, a network interface 520, and non-volatile memory 506. The network interface 520 may allow the backend server(s) 430 to access and communicate with devices connected to the network (Internet/PSTN) 410. The non-volatile memory 506 may include a server application 508 that configures the processor 502 to receive the image data 460, the audio data 462, the text data 464, the motion data 468, the location data 476, 477, the access requests 474, 475, the proximity zone 470, and/or information related to the communication signals 479, 481 from the A/V recording and communication device 402 and/or the client device 407 (e.g., in the output signal 466, 467).

In further reference to FIG. 24, the non-volatile memory 506 may also include source identifying data 510 that may be used to identify the A/V recording and communication device 402, the client devices 404, 406, and/or the client device 407. In some of the present embodiments, the source identifying data 410 may include (and/or be used in combination with) the location data 476, 477. For example, identifying the A/V recording and communication device 402 may include determining the location of the A/V recording and communication device 402 and/or the corresponding proximity zone 470 of the device 402 based on the location data 476. In response to determining the proximity zone 470, a determination of which client devices 407 will receive the image data 460 may be made. In some embodiments, the server application 508 may further configure the processor 502 to generate and transmit a report signal (not shown) to a third-party client device (not shown), which may be associated with a law enforcement agency, for example. The report signal sent to the law enforcement agency may include information indicating an approximate location of where the image data 460 was captured, which may assist the law enforcement agency with apprehending the criminal perpetrator shown in the image data 460.

In some of the present embodiments, the backend server 430 may determine the proximity zone 470 and/or the location data 476 associated with the proximity zone 470. In such embodiments, the backend server 430 may also receive the location data 477 of the client device 407 and compare the location data 477 to the proximity zone 470 to determine if the client device 407 is within the proximity zone 470. In some of the present embodiments, the backend server 430 may receive the location data 476 of the A/V recording and communication device 402 to determine the location (e.g., geographical coordinates) of the A/V recording and communication device 402. The backend server 430 may use this information, and the information pertaining to the proximity zone 470 (e.g., size, shape, etc.), to determine the location data 476 (e.g., geographical coordinates) of the proximity zone 470. In such embodiments, the backend server 430 may transmit the proximity zone 470 and/or location data 476 to the A/V recording and communication device 402, or may analyze the proximity zone 470 locally on the backend server 430.

Figure 41:
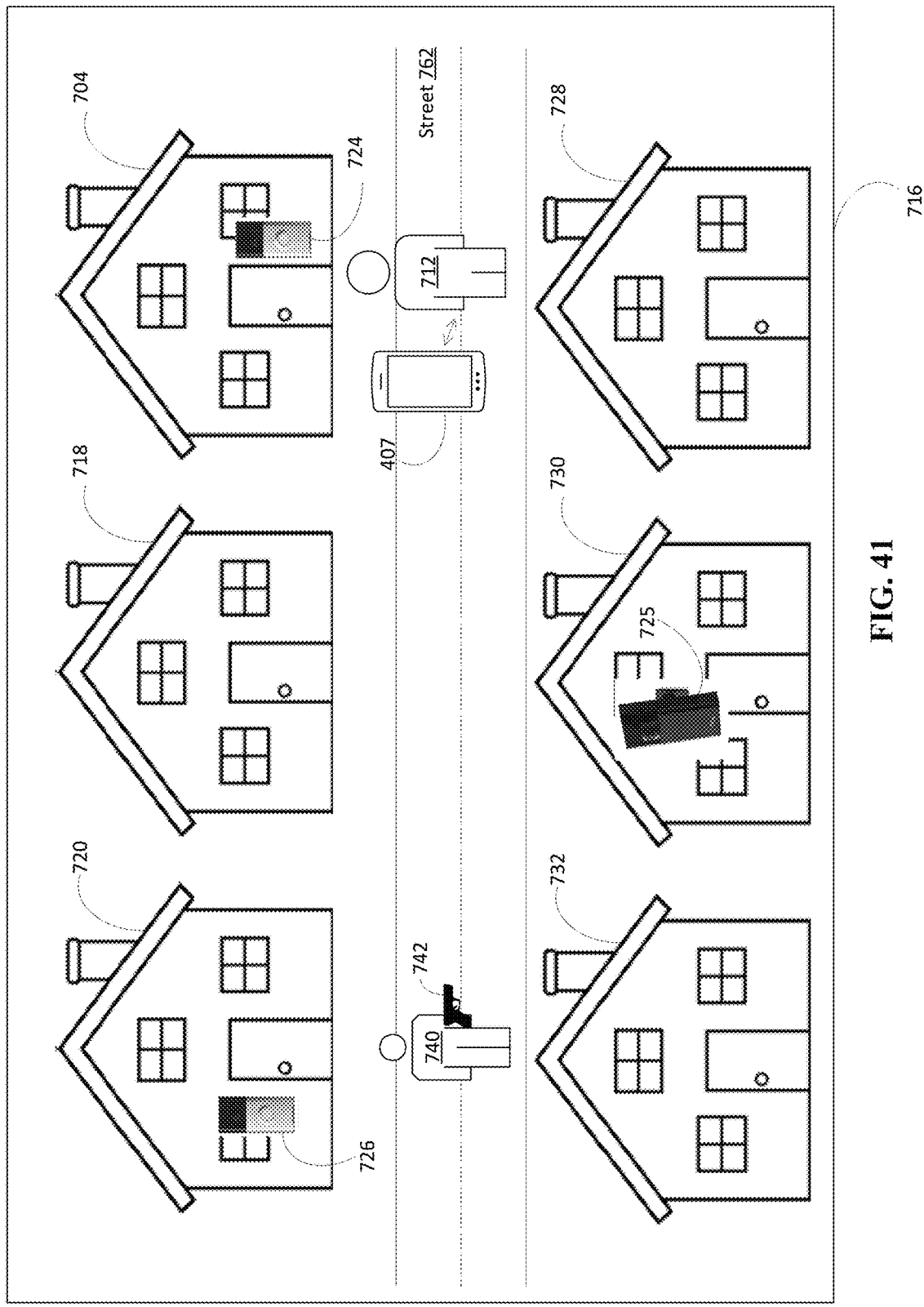

In some of the present embodiments, such as illustrated in FIG. 41, the proximity zone 470 may not be defined based on a location of a single A/V recording and communication device 402, but may be defined by a region (e.g., a street, a neighborhood, a town, etc.). In such embodiments, the backend server 430 may receive the location data 476 of the A/V recording and communication device 402 and analyze the location data 476 to determine if the A/V recording and communication device 402 is within a proximity zone 470 (such as the A/V recording and communication device 724 located within the proximity zone 716 of FIG. 41). In such embodiments, the backend server 430 (and/or the A/V recording and communication device 402) may analyze the location data 477 of the client device 407 (and/or other client devices) to determine if the client device 407 is within the proximity zone 470, and the client device 407 may be allowed access to each of the A/V recording and communication devices 402 within the proximity zone 470.

In one embodiment, and as described below, the backend server(s) 430 may be configured to, in response to the client device 407 entering the proximity zone 470 of the A/V recording and communication device 402, receive, from the client device 407, an access request 475 to allow the client device 407 access to the camera 444 of the A/V recording and communication device 402; in response to receiving the access request 475, transmit the access request 475 to the A/V recording and communication device 402; in response to transmitting the access request 475, receive, from the A/V recording and communication device 402, the image data 460 being recorded by the camera 444 of the A/V recording and communication device 402 in a field of view of the camera 444; and in response to receiving the image data 460, transmitting the image data 460 to the client device 407.

Figure 25:
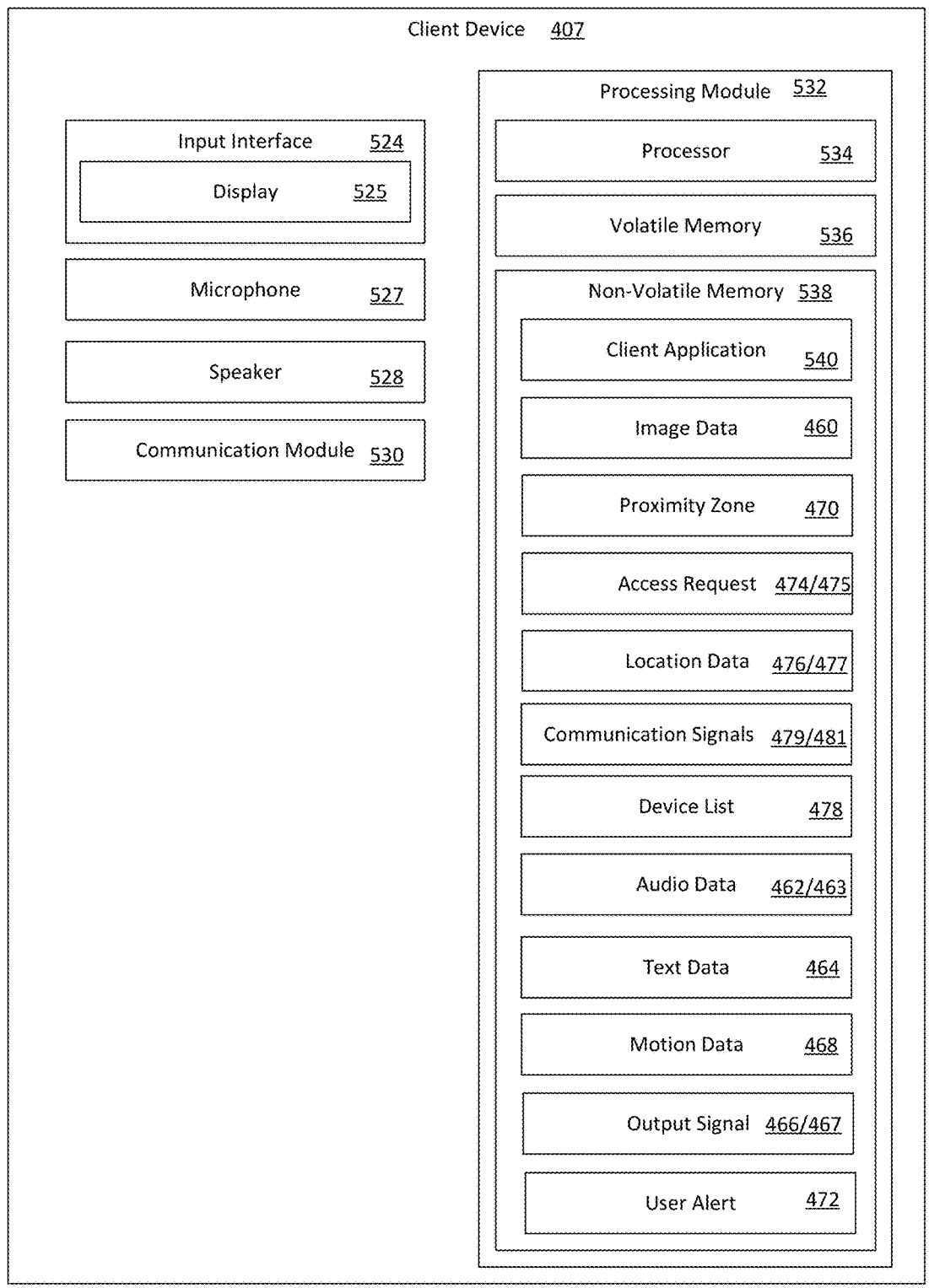
FIG. 25 is a functional block diagram illustrating one embodiment of a client device according to various aspects of the present disclosure.

Now referring to FIG. 25, FIG. 25 is a functional block diagram illustrating one embodiment of a client device 407 according to various aspects of the present disclosure. The client device 407 may comprise a processing module 532 that is operatively connected to an input interface 524, a microphone 527, a speaker 528, and a communication module 530. The client device 407 may further comprise a camera (not shown) operatively connected to the processing module 532. The processing module 532 may comprise a processor 534, volatile memory 536, and non-volatile memory 538 that includes a client application 540. In various embodiments, the client application 540 may configure the processor 534 to receive input(s) to the input interface 524 (e.g., requests for access to the A/V recording and communication device 402) and/or to capture the audio data 463 using the microphone 527, for example. In addition, the client application 540 may configure the processor 534 to transmit the location data 477, the access request 475, the audio data 463, the communication signals 481, and/or the output signal 467 to the A/V recording and communication device 402 and/or the backend server(s) 430 using the communication module 530.

With further reference to FIG. 25, the input interface 524 may include a display 525. The display 525 may include a touchscreen, such that the user of the client device 407 can provide inputs directly to the display 525 (e.g., a request for access to the A/V recording and communication device 402). In some embodiments, the client device 407 may not include a touchscreen. In such embodiments, the user may provide an input using any input device, such as, without limitation, a mouse, a trackball, a touchpad, a joystick, a pointing stick, a stylus, etc.

With further reference to FIG. 25, the location data 477 may be used by the A/V recording and communication device 402 and/or the backend server 430 to determine if the client device 407 is within the proximity zone 470. The client device 407 may transmit the location data 477 to the A/V recording and communication device 402 and/or the backend server 430 as part of the communication signals 481 and/or the output signal 467 using the communication module 450.

In some of the present embodiments, once the client device 407 is within the proximity zone 470, the client device 407 may receive the access request 474 from the A/V recording and communication device 402 and/or transmit the access request 475 to the A/V recording and communication device 402 using the communication module 450. For example, once the client device 407 enters the proximity zone 470, a device list 478 (including each of the devices from which the client device 407 may be allowed to request access) may include the A/V recording and communication device 402. As such, the user of the client device 407 may be able to select the A/V recording and communication device 402 from the device list 478, and in response, the access request 475 may be transmitted to the selected A/V recording and communication device 402. In various embodiments, the A/V recording and communication device 402 may be included in the device list 478 in response to the client device 407 receiving the access request 474 from the A/V recording and communication device 402, such that the selection of the A/V recording and communication device 402 from the device list 478 may include an acceptance of the access request 474.

In the illustrated embodiment of FIGS. 23-25, the various components including (but not limited to) the processing modules 446, 532, 500, the communication modules 450, 530, and the network interface 520 are represented by separate boxes. The graphical representations depicted in each of FIGS. 23-25 are, however, merely examples, and are not intended to indicate that any of the various components of the A/V recording and communication device 402, the client device 407, or the backend server(s) 430 are necessarily physically separate from one another, although in some embodiments they might be. In other embodiments, however, the structure and/or functionality of any or all of the components of the A/V recording and communication device 402 may be combined. In addition, in some embodiments the communication module 450 may include its own processor, volatile memory, and/or non-volatile memory. Further, the structure and/or functionality of any or all of the components of the client device 407 may be combined. In addition, in some embodiments the communication module 530 may include its own processor, volatile memory, and/or non-volatile memory. Further, the structure and/or functionality of any or all of the components of the backend server(s) 430 may be combined. In addition, in some embodiments the network interface 520 may include its own processor, volatile memory, and/or non-volatile memory.

Now referring to FIG. 26, FIG. 26 is a flowchart illustrating a process for accessing cameras of A/V recording and communication devices based on location according to various aspects of the present disclosure. At block B600, the process 2600, in response to entering a proximity zone of an A/V recording and communication device, requests, by a processor using a communication module, access to a camera of the A/V recording and communication device. For example, the processor 534 of the client device 407, in response to entering the proximity zone 470, may request, using the communication module 530, access to the camera 444 of the A/V recording and communication device 402. A variety of methods may be used to determine that the client device 407 is within the proximity zone 470. For example, the backend server 430 and/or the A/V recording and communication device 402 may compare the location data 477 of the client device 407 to the proximity zone 470, and in response to determining that the client device 407 is within the proximity zone 470, may provide an indication to the client device 407 that the A/V recording and communication device 402 may be accessed (e.g., by including the A/V recording and communication device 402 on the device list 478). In some of the present embodiments, the client device 407 may query the backend server 430 to determine whether the client device 407 is within a proximity zone of any A/V recording and communication devices, which may include the proximity zone 470 of the A/V recording and communication device 402. For example, the user of the client device 407 may open a computer program application (e.g., the client application 540, a web server, etc.) and request to view available devices, and in response, receive a notification that the A/V recording and communication device 402 may be accessed. In response, the user of the client device 407 may transmit the access request 475 to the A/V recording and communication device 402 (in some embodiments, via the backend server 430).

In some of the present embodiments, as described above, the proximity zone 470 may be defined by the communication signals 479 of the A/V recording and communication device 402. In such embodiments, the A/V recording and communication device 402 may transmit the communication signals 479 and the client device 407 may receive the communication signals 479 and analyze the communication signals 479 to determine the signal strength (e.g., RSSI), and the client device 407 may transmit the signal strength information to the A/V recording and communication device 402 and/or the backend server 430 to determine if the client device 407 is within the proximity zone 470.

In other embodiments, as described herein, the communication signals 481 of the client device 407 may be analyzed by the A/V recording and communication device 402 to determine if the client device 407 is within the proximity zone 470. In some of the present embodiments, in response to receiving the communication signals 479 from the A/V recording and communication device 402, the client device 407 may transmit the communication signals 481 to the A/V recording and communication device 402, where the communication signals 481 may include the location data 476 of the client device 407. In response, the A/V recording and communication device 402 may compare the location data 476 to the proximity zone 470 to determine if the client device 407 is within the proximity zone 470. In other embodiments, the A/V recording and communication device 402 may measure the signal strength of the communication signals 481 received from the client device 407 and the signals strength may be used to determine if the client device 407 is within the proximity zone 470.

At block B602, the process 2600, in response to the request for access, receives, by the processor using the communication module, from the camera, image data being recorded by the camera in a field of view of the camera. For example, in response to transmitting the access request 475, the processor 534 of the client device 407, using the communication module 530, may receive from the camera 444 the image data 460 being recorded by the camera 444 in a field of view of the camera 444. For example, the client device 407 may receive the image data 460 as live streaming video being recorded in the field of view of the camera 444.

At block B604, the process 2600 displays, by the processor on the display, the image data. For example, the processor 534 of the client device 407 may display the image data 460 on the display 525. The image data 460 may be displayed as a visual representation of the live video being recorded by the camera 444 in a field of view of the camera 444.

Now referring to FIG. 27, is a flowchart illustrating a process for accessing cameras of A/V recording and communication devices based on location according to various aspects of the present disclosure. At block B606, the process 2700, displays, by the processor on a display, a list of devices configured for access by a client device, the list of devices including an A/V recording and communication device 402. For example, the processor 534 of the client device 407 may display on the display 525 the device list 478 including a list of devices configured for access by the client device 407, where device list 478 may include the A/V recording and communication device 402. For example, in response to a request from the client device 407 and/or the device entering the proximity zone 470, the device list 478 of the client device 407 may be populated and displayed on the display 525.

At block B608, the process 2700 may continue to block B600 of FIG. 26.

Now referring to FIG. 28, FIG. 28 is a flowchart illustrating a process for accessing cameras of A/V recording and communication devices based on location according to various aspects of the present disclosure. At block B610, the process 2800 may continue from block B600 of FIG. 26. At block B612, the process 2800 establishes, by a processor using a communication module, a connection to an A/V recording and communication device. For example, the processor 534 of the client device 407, using the communication module 530, may connect to (and communicate with) the A/V recording and communication device 402. In some of the present embodiments, the connection/communication may be a direct connection/communication between the A/V recording and communication device 402 and the client device 407, such as over the user's network 408 and/or the network (Internet/PSTN) 408. In such embodiments, for example, in response to receiving the access request 475 from the client device 407, the A/V recording and communication device 402 may transmit the network credentials of the user's network (or an ad hoc network generated by the A/V recording and communication device 402) to the client device 407 (e.g., using the communication signals 479, 481). In response to receiving the network credentials, the client device 407 may join the user's network 408 and establish the connection/communication with the A/V recording and communication device 402. In other embodiments, the client device 407 may be connected to the network (Internet/PSTN) 410 over a cellular network, for example, and the A/V recording and communication device 402 may be connected to the network (Internet/PSTN) 410 over the user's network 408 (e.g., using a router). In such embodiments, the client device 407 may communicate with the A/V recording and communication device 402 over the network (Internet/PSTN) 410.

In other embodiments, the connection/communication may be performed using the backend server 430, such that the backend server 430 acts as an intermediary between the client device 407 and the A/V recording and communication device 402, as described below with respect to FIGS. 38-40.

The processes of FIGS. 26-28 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

Figure 40:
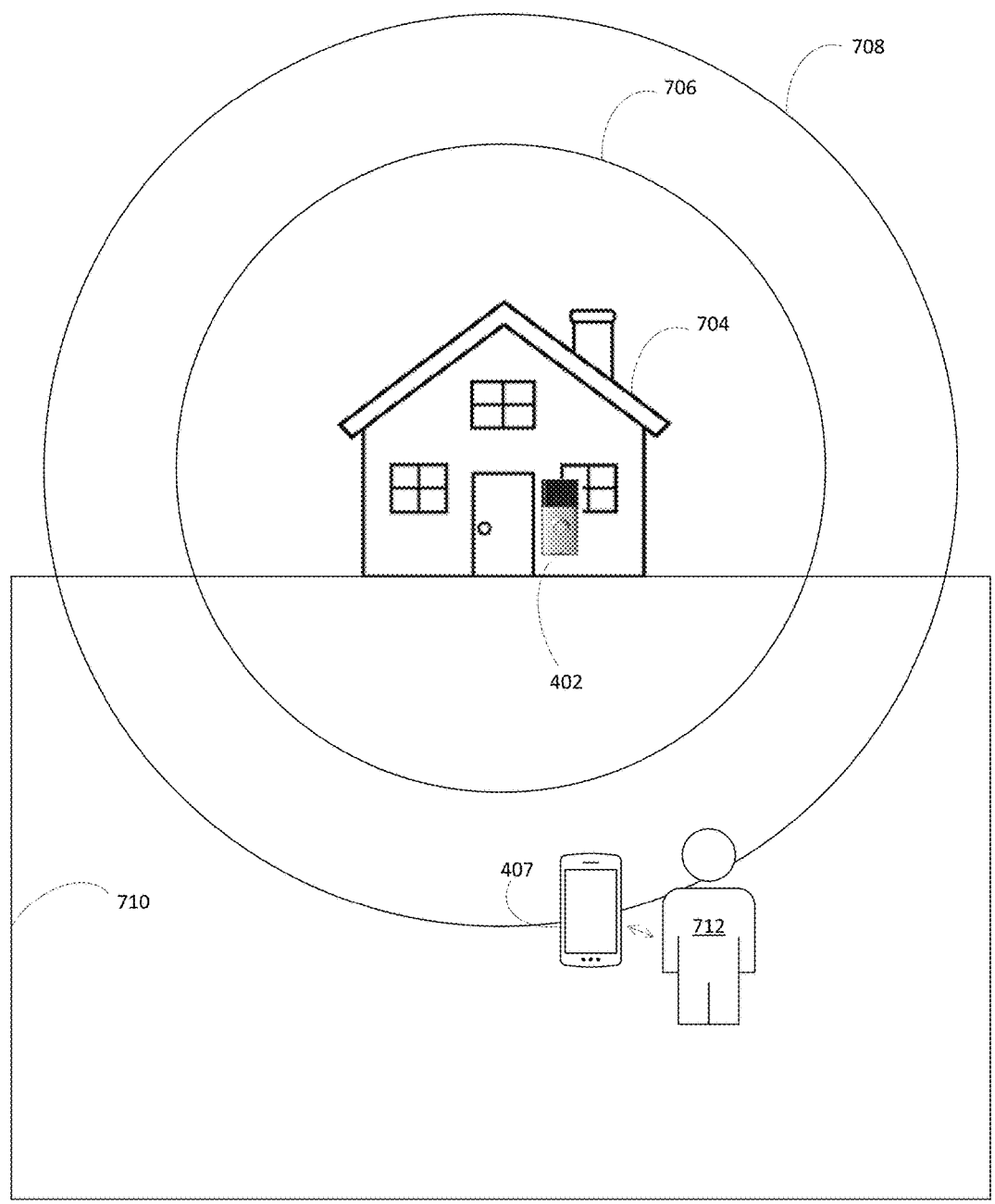
FIGS. 40-41 are example environments illustrating aspects of a process for accessing cameras of A/V recording and communication devices according to various aspects of the present disclosure.

With reference to FIG. 40, at block B600, the process 2600, in response to the client device 407 (e.g., carried by the user 712) entering the proximity zone 706, 708, and/or 710, may request access to the A/V recording and communication device 402 located at the house 704. The proximity zone 706 is an example of a proximity zone 470 that includes the A/V recording and communication device 402. In some of the present embodiments, the proximity zones 470 may be defined by the user of the client device 404, 406 associated with the A/V recording and communication device 402. The user may select a size of the proximity zone, such as a small (e.g., proximity zone 706) or large (e.g., proximity zone 708) proximity zone 470. In some embodiments, the user may fit a shape (e.g., a circle for the proximity zone 706, 708) to a map including the house 704 or a visual representation of the house 704, where the shape defines the proximity zone 470. In other embodiments, the user may define a proximity (e.g., radius) for the proximity zone 470. In other embodiments, the proximity zone 470 may be based on the settings of the A/V recording and communication device 402. For example, the proximity zones 470 (e.g., proximity zone 710) may include the area in front of the A/V recording and communication device 402, such as the field of view of the A/V recording and communication device 402. In other embodiments, the proximity zone 470 may be defined by a street or neighborhood, such that when the client device 407 enters the proximity zone 470 (e.g., enters the street or neighborhood), the client device 407 may be able to transmit the access request 475 to the A/V recording and communication device 402.

At block B612, the process 2800 establishes a connection with the A/V recording and communication device 402. The client device 407 may establish the connection with the A/V recording and communication device 402 over the network (Internet/PSTN) 410 and/or the user's network 408, as described above. For example, the client device 407 may receive network credentials for the user's network 408 (e.g., from the backend server 430) such that the client device 407 can connect to the user's network 408 to communicate with the A/V recording and communication device 402. In various embodiments, the client device 407 may be granted unsecured access to the user's network 408. In such embodiments, the client device 407 may receive temporary network credentials for the user's network 408 that expire at the expiration of the connection/communication between the client device 407 and the A/V recording and communication device 402. In some of the present embodiments, the A/V recording and communication device 402 may generate an ad hoc network, for example, and the client device 407 may receive the network credentials of the ad hoc network and connect directly to the A/V recording and communication device 402 over the ad hoc network. In some of the present embodiments, the client device 407 may communicate to the A/V recording and communication device 402 using the backend server 430 such that the backend server 430 acts as an intermediary between the client device 407 and the A/V recording and communication device 402.

In various embodiments, the client device 407 may be authenticated by the A/V recording and communication device 402 (or the backend server 430). In such embodiments, the client device 407 may transmit authentication information to the A/V recording and communication device 402 (and/or the backend server 430), and the authentication information may be compared to an authentication database (stored on the A/V recording and communication device and/or the backend server 430), for example, to determine if the client device 407 should be allowed access to the A/V recording and communication device 402. For example, the ability to access A/V recording and communication devices 402 from the client device 407 may be a paid service, and the authentication may be to verify that the user of the client device 407 has paid for the service. In another example, only client devices that are associated with an A/V recording and communication device (e.g., an A/V recording and communication device other than the A/V recording and communication device 402, such as an A/V recording and communication device owned by the user of the client device 407) may be allowed to access the A/V recording and communication device 402. As such, the authentication may include verifying that the client device 407 is associated with an A/V recording and communication device.

At block B602, the process 2600, in response to transmitting the access request 475 to the A/V recording and communication device 402, receives from the camera 444 the image data 460 being recorded by the camera 444 in a field of view of the camera 444. At block B604, the process 2600 displays the image data 460 on the display 525 of the client device 407.

Figure 42:
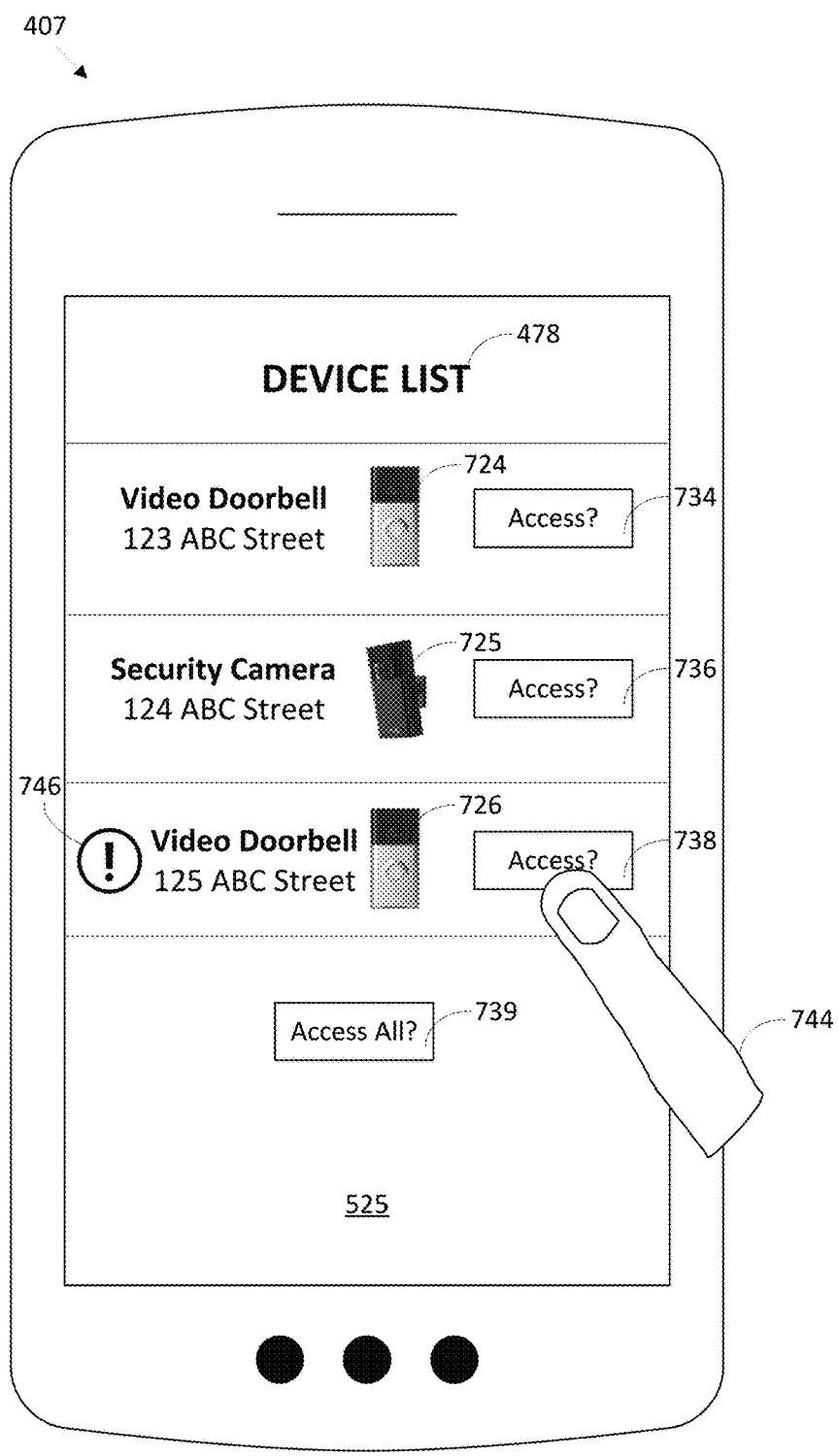
FIGS. 42-43 are screenshots of a graphical user interface (GUI) illustrating aspects of a process for accessing cameras of A/V recording and communication devices according to various aspects of the present disclosure.
Figure 43:
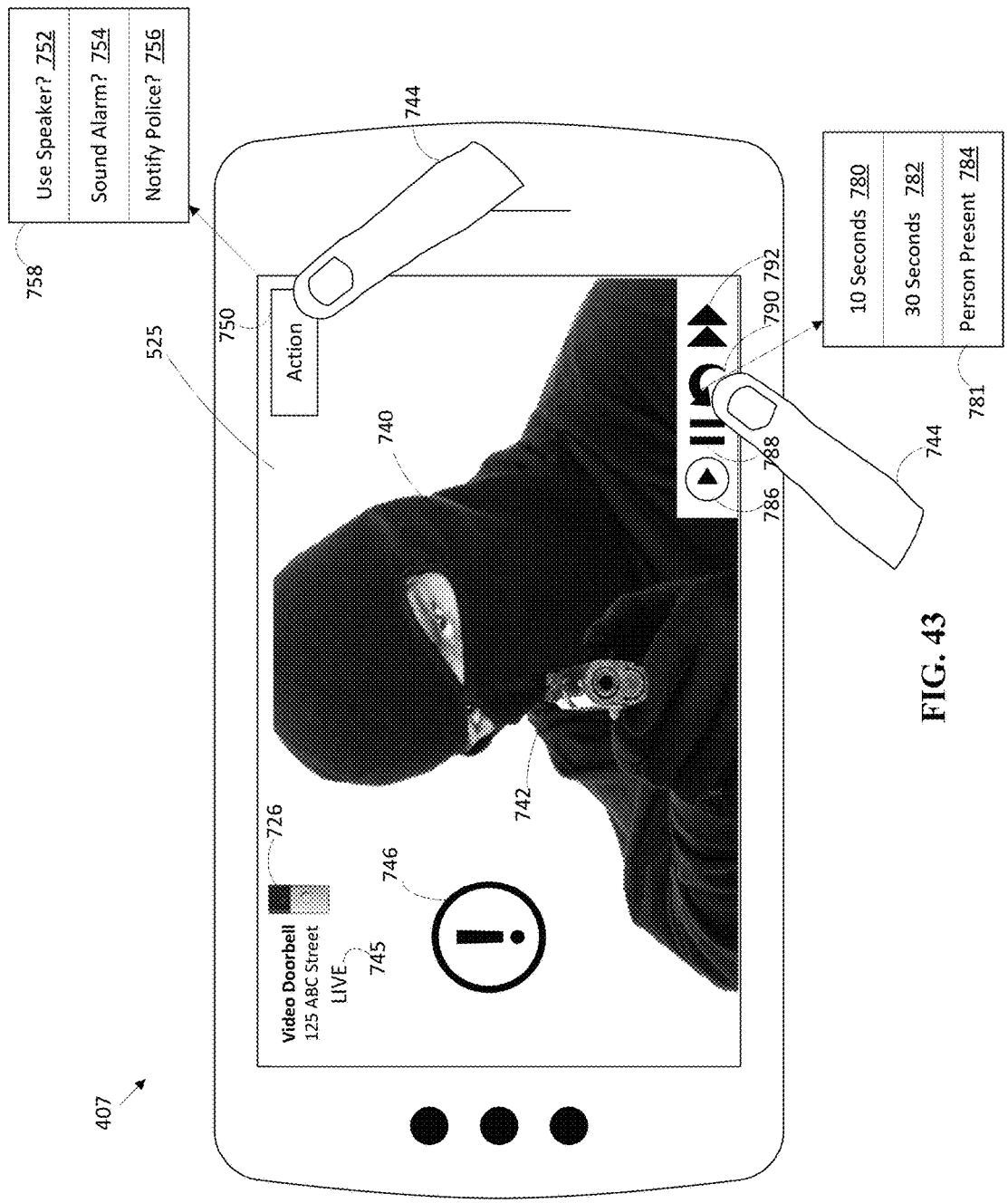

With reference to FIGS. 41-43, the process 2700, at block B606, displays the device list 478 on the display 525 of the client device 407, as illustrated in FIG. 42. The device list 478 may include all of the devices to which the client device 407 may have access (e.g., the devices in whose proximity zones 470 the client device 407 is located). As illustrated in FIG. 41, the user 712 of the client device 407 may be located on a street 762, within the proximity zone 716. The proximity zone 716 is an example of a shared proximity zone 716. For example, each of the A/V recording and communication devices 724, 725, 726 may share the proximity zone 716. In such an example, when the user 712 enters the proximity zone 716, the user may be allowed access to each of the A/V recording and communication devices 724, 725, 726. However, this embodiment is not intended to be limiting, and, in some embodiments, each of the A/V recording and communication devices 724, 725, 726 may have its own proximity zone 470, or two or more of the A/V recording and communication devices 724, 725, 726 may share a proximity zone 470 while the other(s) A/V recording and communication devices 724, 725, 726 share a proximity zone 470 and/or have their own proximity zone 470, for example. In the example of FIG. 41, the proximity zone 716 may include the A/V recording and communication device 724, which may be a video doorbell located at the house 704, the A/V recording and communication device 725, which may be a security camera located at the house 730, and the A/V recording and communication device 726, which may be a video doorbell located at the house 720. As such, because the client device 407 is within the proximity zone 716, the device list 478 may include each of the A/V recording and communication devices 724, 725, 726 configured for access by the client device 407.

The device list 478 may include an access button 734, 736, 738 for each of the A/V recording and communication devices 724, 725, 726, respectively. The access buttons 734, 736, 738 may be configured to allow the user 712 to provide an input (e.g., by the finger 744 of the user 712, or another input device, as described above) to the access buttons 734, 736, 738 to request access (e.g., transmit the access request 475) to the corresponding A/V recording and communication device 724, 725, 726. In some of the present embodiments, the device list 478 may also include an access all button 739, which may allow the client device 407 to access each of the A/V recording and communication devices 724, 725, 726 (e.g., by transmitting the access request 475 to each of the devices 724, 725, 726). In such embodiments, for example, the client device 407 may display the image data 460 on the display 525 of the client device 407 for each of the A/V recording and communication devices 724, 725, 726 (e.g., in grid form). In another example, once the client device 407 has accessed (e.g., connected to and/or established communication with) each of the A/V recording and communication devices 724, 725, 726, the user may be able to selectively view the image data 460 from one or more of the A/V recording and communication devices 724, 725, 726 as the user 712 desires (e.g., may toggle selection of different devices 724, 725, 726).

In addition, the device list 478 may include an identification of the type of device each of the A/V recording and communication devices 724, 725, 726 is, and may further include the address where each of the A/V recording and communication devices 724, 725, 726 is located. The device list 478 may also include an indication of suspicious activity identified by one or more of the A/V recording and communication devices 724, 725, 726, such as by providing the warning icon 746 when the burglar 740 (or another suspicious/dangerous person) is present (or has recently been present) in the field of the view of the A/V recording and communication device 726 (e.g., by including a time stamp). The identification of suspicious activity may be determined by the A/V recording and communication device 726 when analyzing the image data 460 generated by the camera of the A/V recording and communication device 726, such as by using a computer vision process (e.g., facial recognition, facial detection, object recognition, etc.) or the like.

At block B608, the process 2700 may continue to block B600 of the process 2600. At block B600, the client device 407 may transmit the access request 475 to the A/V recording and communication device 726 in response to the user 712 providing a selection to the access button 738 on the device list 478 using his or her finger 744, as illustrated in FIG. 42. For example, the user 712 may have selected to access the A/V recording and communication device 726 because the device list 478 included the warning icon 746 and the user 712 wanted to be notified of any potential danger in the neighborhood (e.g., on the street 762).

At block B612, in the process 2800, the client device 407 may establish a connection to the A/V recording and communication device 726. At block B614, the process 2800 may continue to block B602 of FIG. 26. At block B602 of the process 2600, in response to transmitting the access request 475 (at block B600), and in response to establishing connection/communication with the A/V recording and communication device 726 (at block B612), the client device 407 may receive the image data 460 being recorded by the A/V recording and communication device 726. In some of the present embodiments, in addition to receiving the image data 460 being recorded, the client device 407 may receive access to the previously recorded image data 460 from the A/V recording and communication device 726. For example, the client device 407 may be allowed access to the previous 10 seconds, 20 seconds, 30 seconds, or 1 minute of recorded image data 460, for example. As a result, the user 712 of the client device 407 may be able to view the suspicious activity of the burglar 740, or view better quality (e.g., closer, more focused) image of the burglar 740, even if the burglar 740 is not currently in the field of view and/or not in close proximity to the A/V recording and communication device 726 (e.g., the burglar 740 has fled the scene). This may also allow the user 712 to determine that the burglar 740 has a gun 742 and/or determine what direction the burglar 740 is traveling so that the user 712 may take a more appropriate action (e.g., hide, alert law enforcement, etc.).

At block B604 of the process 2600, the client device 407 may display the image data 460 on the display 525, as illustrated in the screenshot of FIG. 43. The screenshot of FIG. 43 may be a screenshot of a GUI of a computer program application (e.g., a smart phone application). The image data 460 may include the burglar 740 and the gun 742, allowing the user 712 to determine the reason for the warning icon 746 displayed on the device list 478. The GUI may include the warning icon 746, as illustrated in FIG. 43. The GUI may also include an identification of the type of device that the A/V recording and communication device 726 is, and may further include the address where the device 726 is located. A recording status indicator 745 may also be displayed on the display 525 to provide an indication of whether the image data 460 is live or pre-recorded, for example.

The GUI may also include an action button 750. The action button 750 (e.g., when selected) may provide the user 712 with a list of actions 758 from which the user 712 may be able to select. For example, the list of actions 758 may include a use speaker button 752, a sound alarm button 754, a notify police button 756, and/or other buttons corresponding to different actions for the user 712. The use speaker button 752 may enable the user 712 to speak through the speaker of the A/V recording and communication device 726, such as to communicate with and/or scare off the burglar 740, for example. The sound alarm button 754 may trigger an audible and/or visible alarm at the A/V recording and communication device 726. The notify police button 756 may send a notification to law enforcement and/or initiate a call between the user 712 and law enforcement. The notify police button 756 may also trigger the A/V recording and communication device 726 to transmit the image data 460 to law enforcement, as described above.

The GUI may also include control features for controlling the image data 460, such as a play button 768, a pause button 788, a return button 790, a fast forward button 792, and/or other buttons. The return button 790 (e.g., when selected) may provide a return button list 781 for allowing the user 712 to select an amount of time to go back in the image data 460 and/or a specific point in the image data 460. For example, the user 712 may be able to select 10 seconds 780 or 30 seconds 782 to go back 10 seconds or 30 seconds in the image data 460, respectively. In some of the present embodiments, the return button list 781 may also include a person present button 784. The person present button 784 may go back to in the image data 460 to when a person is present (e.g., detected by the A/V recording and communication device 726), such as when the burglar 740 was first detected, when the burglar 740 is facing the camera, and/or at any time that the burglar is in the field of view of the A/V recording and communication device 726. The A/V recording and communication device 726 may use computer vision or the like, as described above, to determine when the burglar 740 is present and/or to determine the position of the burglar 740 with respect to the A/V recording and communication device 726 (e.g., when the burglar 740 is facing the A/V recording and communication device).

Now referring to FIG. 29, FIG. 29 is a flowchart illustrating a process for accessing cameras of A/V recording and communication devices based on location according to various aspects of the present disclosure. The process 2900 may be similar to the process 2600, except in the process 2900 the A/V recording and communication device 402 transmits the access request 474. In various embodiments, without limitation, the processes 2900 and 2600 may be combined such that both the client device 407 and the A/V recording and communication device 402 may transmit the access requests 474, 475. For example, the client device 407 may periodically determine if any A/V recording and communication devices are available for access and transmit the access request 475, and the A/V recording and communication device 402 may periodically determine if any client devices are available for access and transmit the access request 474. In another example, the client device 407 may primarily transmit the access request 475, and the A/V recording and communication device 402 may only determine if any client devices are available and transmit the access request 474 in response to a suspicious activity warning/flag (e.g., after detecting that the burglar 740 is present). Similarly, with reference to FIG. 32 and FIG. 36, without limitation, the processes 3200 and 3600 may be combined. In addition, with reference to FIG. 38 and FIG. 39, without limitation, the processes 3800 and 3900, may be combined.

With further reference to FIG. 29, at block B616, the process 2900, in response to entering a proximity zone of an A/V recording and communication device, receives, from the A/V recording and communication device, an access request for allowing a client device to access a camera of the A/V recording and communication device. For example, in response to entering the proximity zone 470 of the A/V recording and communication device 402, the processor 534 of the client device 407 receives, using the communication module 530, the access request 474 from the A/V recording and communication device 402 for allowing the client device 407 access to the A/V recording and communication device 402. In some of the present embodiments, the A/V recording and communication device 402 may determine that the client device 407 has entered the proximity zone 470 (e.g., by comparing the location data 477 to the proximity zone 470) and transmit the access request 474. In other embodiments, the backend server 430 may compare the location data 477 to the proximity zone 470 and transmit the access request 474 to the client device 407 (and/or forward the access request 474 from the A/V recording and communication device 402).

At block B620, the process 2900 transmits, by the processor using the communication module, to the A/V recording and communication device, an acceptance of the access request. For example, the processor 534 may transmit, using the communication module 530, an acceptance of the access request 474 to the A/V recording and communication device 402. For example, in response to receiving the access request 474, the client device 407 may display the device list 478, and the user 712 of the client device 407 may select the A/V recording and communication device 402 from the device list 478 as an acceptance of the access request 474. In such an example, in response to the selection of the A/V recording and communication device 402 on the display 525, the client device 407 may transmit the acceptance. In some of the present embodiments, the client device 407 may, depending on the settings of the client device 407, automatically accept access requests 474. For example, if the access request 474 includes a suspicious activity warning/flag (e.g., if the access request 474 is transmitted in response to suspicious behavior detected by the A/V recording and communication device 402 and/or the backend server 430 in response to analyzing the image data 460, such as if the image data 460 includes the burglar 740), the client device 407 may be programmed to automatically transmit an acceptance to the access request 474.

At block B620, the process 2900, in response to the transmitting the acceptance, receives, by the processor using the communication module, from the camera, image data being recorded in a field of view of the camera. For example, the processor 534, in response to transmitting the acceptance, may receive, using the communication module 530, from the camera 444, the image data 460 being recorded by the camera 444 in a field of view of the camera 444. This process may be similar to that of block B602 of FIG. 26, described above.

At block B622, the process 2900 displays, by the processor on a display, the image data. For example, the processor 534 displays the image data 460 on the display 525. This process may be similar to that of block B604 of FIG. 26, described above.

Now referring to FIG. 30, FIG. 30 is a flowchart illustrating a process for accessing cameras of A/V recording and communication devices based on location according to various aspects of the present disclosure. At block B624, the process 3000 may continue from block B616 of FIG. 29. At block B626, the process 3000, in response to receiving an access request, displays, by a processor on a display, a list of devices configured for access by a client device, the list of devices including an A/V recording and communication device. For example, in response to receiving the access request 474, the processor 534 may display the device list 478 on the display 525 of the client device 407, where the device list 478 may include the A/V recording and communication device 402.

At block B628, the process 3000 receives, by the processor, an input including a selection of the A/V recording and communication device from the list of devices, the input including an acceptance of the access request. For example, the processor 534 may receive an input including a selection of the A/V recording and communication device 402 from the device list 478, where the input includes an acceptance of the access request 474. For example, as illustrated in FIG. 42, the user 712 may make a selection of one or more of the A/V recording and communication devices 724, 725, 726 from the device list 478, where the selection includes an acceptance of the access request 474 transmitted by the corresponding A/V recording and communication device 724, 725, 726. In some of the present embodiments, the device list 478 may include the A/V recording and communication devices 724, 725, 726 that transmitted the access requests 474, and/or the A/V recording and communication devices 724, 725, 726 that are available for access by the client device 407 but have not transmitted the access request 474 (e.g., where the client device 407 must transmit the access request 475). In such embodiments, when the A/V recording and communication devices 724, 725, 726 transmitted the access request 474, selecting the access button 734, 736, 738 may include an acceptance of the access request 474. When the A/V recording and communication devices 724, 725, 726 did not transmit the access request 474, selecting the access button 734, 736, 738 may include transmitting the access request 475 from the client device 407 to the corresponding A/V recording and communication device 724, 725, 726.

At block B630, the process 3000 may continue to block B618 of FIG. 29.

Figure 31:
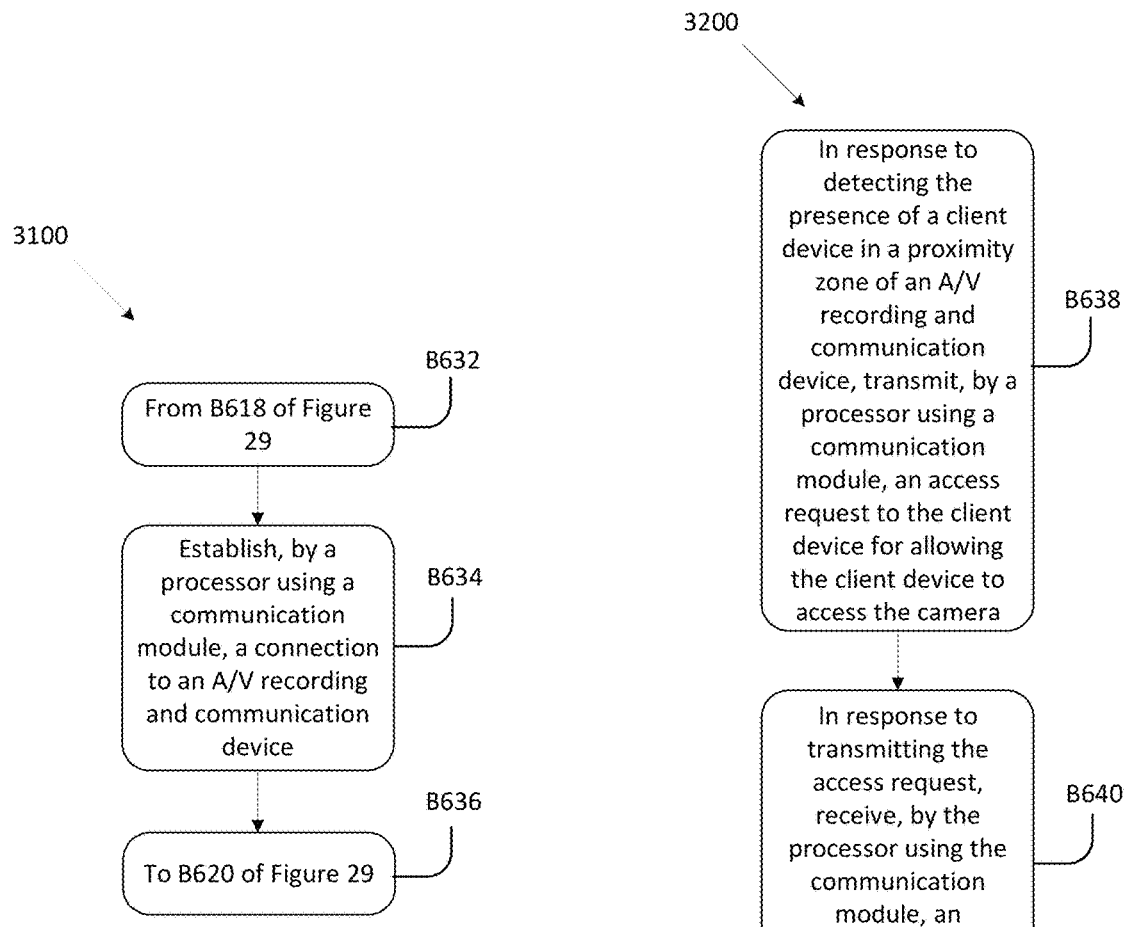

Now referring to FIG. 31, FIG. 31 is a flowchart illustrating a process for accessing cameras of A/V recording and communication devices based on location according to various aspects of the present disclosure. At block B632, the process 3100 may continue from block B618 of FIG. 29. At block B634, the process 3100 may establish, by a processor using a communication module, a connection to an A/V recording and communication device. For example, the processor 534 of the client device 407 may establish a connection to the A/V recording and communication device 402 using the communication module 530. This process may be similar to that of block B612 of FIG. 28, described above. At block B634, the process 3100 may continue to block B620 of FIG. 29.

Figure 32:
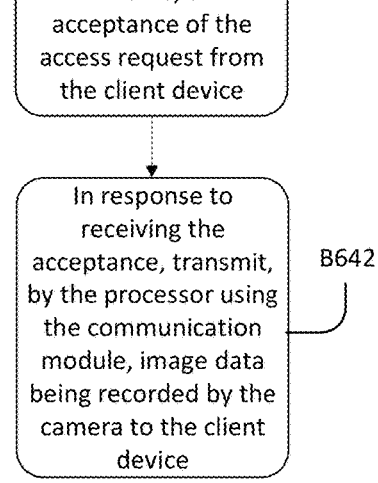

Now referring to FIG. 32, FIG. 32 is a flowchart illustrating a process for accessing cameras of A/V recording and communication devices based on location according to various aspects of the present disclosure. The process 3200 may be similar to the process 2900 of FIG. 29, except the process 3200 may be directed to the processes of the A/V recording and communication device 402 while the process 2900 may be directed to the processes of the client device 407. For example, at block B638, the process 3200 may transmit the access request 474, and at block B616 of the process 2900 of FIG. 29, the client device 407 may receive the access request 474 from the A/V recording and communication device 402.

With further reference to FIG. 32, at block B638, the process 3200, in response to detecting the presence of a client device in a proximity zone of an A/V recording and communication device, transmits, by a processor using the communication module, an access request to the client device for allowing the client device to access the camera. For example, in response to detecting the presence of the client device 407 in the proximity zone 470, the A/V recording and communication device 402 may transmit, by the processor 452 using the communication module 450, the access request 474 to the client device 407 for allowing the client device 407 access to the camera 444 (and/or other features of the A/V recording and communication device 402). The access request 474 may be transmitted over the network (Internet/PSTN) 410 and/or the user's network 408. The access request 474 may be transmitted to the client device 407 and/or to the backend server 430 and the backend server 430 may forward the access request 474 to the client device 407. In some of the present embodiments, as described above, the access request may be transmitted directly to the client device 407 over an ad hoc network generated by the A/V recording and communication device 402.

At block B640, the process 3200, in response to transmitting the access request, receives, by the processor using the communication module, an acceptance of the access request from the client device. For example, the processor 452 using the communication module 450 may receive the acceptance of the access request 474 from the client device 407 in response to transmitting the access request 474. The acceptance may be received over the network (Internet/PSTN) 410 and/or the user's network 408. The acceptance may be received from the client device 407 and/or from the backend server 430 after the backend server 430 receives the acceptance from the client device 407. In some of the present embodiments, as described above, the acceptance may be received directly by the A/V recording and communication device 402 over the ad hoc network.

At block B642, the process 3200, in response to receiving the acceptance, transmits, by the processor using the communication module, image data being recorded by the camera in a field of view of the camera. For example, the processor 452 using the communication module 450 may transmit the image data 460 being recorded by the camera 444 in field of view of the camera 444. The image data 460 may be transmitted to the client device 407 over the network (Internet/PSTN) 410 and/or the user's network 408 (in some embodiments, via the backend server 430). In other embodiments, as described above, the image data 460 may be transmitted directly to the client device 407 over the ad hoc network generated by the A/V recording and communication device 402.

Figure 33:
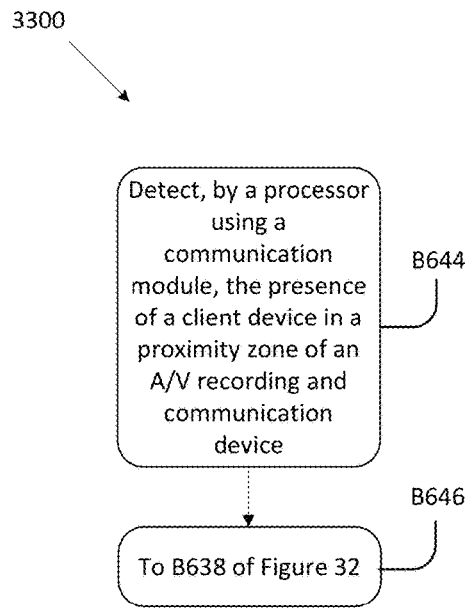

Now referring to FIG. 33, FIG. 33 is a flowchart illustrating a process for accessing cameras of A/V recording and communication devices based on location according to various aspects of the present disclosure. At block B644, the process 3200 detects, by a processor using a communication module, the presence of a client device in a proximity zone of an A/V recording and communication device. For example, the processor 452 using the communication module 450 may detect the presence of the client device 407 in the proximity zone 470 of the A/V recording and communication device 402. In some of the present embodiments, the A/V recording and communication device 402 may listen, using the communication module 450, for incoming communication signals 481 of the client device 407 (e.g., that may be transmitted by the client device 407 at an interval, such as every 10 seconds, every 20 seconds, etc.). The communication signals 481 may include the location data 477 of the client device 407 for comparison with the proximity zone 470. In some of the present embodiments, the A/V recording and communication device 402 may transmit the communication signals 479 (e.g., at interval, such as every 10 seconds, every 20 seconds, etc.), and the client device 407 may listen for the communication signals 479. In response to receiving the communication signals 479, the client device 407 may transmit the communication signals 481 including the location data 477 for the A/V recording and communication device 402 to compare to the proximity zone 470. In either of the embodiments, once it is determined, based on the location data 477, for example, that the client device 407 is within the proximity zone 470, the process 3300 may continue to block B646.

In various embodiments, the client device 407 may transmit the location data 477 to the backend server 430 and the backend server 430 may determine, and/or forward the location data 477 to the A/V recording and communication device 402 for determining, if the client device 407 within the proximity zone 470.

At block B646, the process 3300 may continue to block B638 of FIG. 32.

Figure 34:
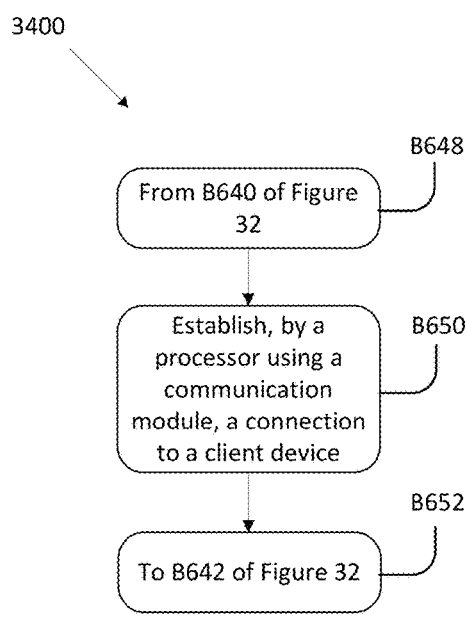

Now referring to FIG. 34, FIG. 34 is a flowchart illustrating a process for accessing cameras of A/V recording and communication devices based on location according to various aspects of the present disclosure. At block B648, the process 3400 may continue from block B640 of FIG. 32. At block B650, the process 3400 may establish, by a processor using a communication module, a connection to a client device. For example, the processor 452 of the A/V recording and communication device 402, using the communication module 450, may establish a connection/communication to the client device 407. This process may be similar to that of block B634 of FIG. 3100 and/or block B612 of FIG. 28, described above. At block B652, the process 3400 may continue to block B642 of FIG. 32.

Figure 35:
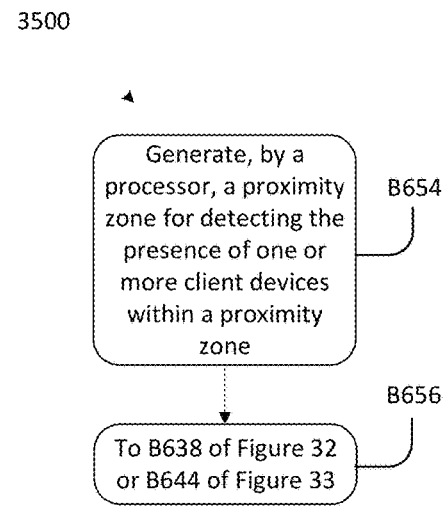

Now referring to FIG. 35, FIG. 35 is a flowchart illustrating a process for accessing cameras of A/V recording and communication devices based on location according to various aspects of the present disclosure. At block B654, the process 3500 generates, by a processor, a proximity zone for detecting the presence of one or more client devices within a proximity zone. For example, the processor 452 may generate the proximity zone 470 for detecting the presence of one or more client devices (e.g., the client device 407). The proximity zone 470, as described above, may be based on the settings of the A/V recording and communication device 402. For example, the proximity zone 470 may be a default size and shape, and the generation of the proximity zone 470 may include a determination of the location data 476 (e.g., geographical coordinates) relating to the default proximity zone 470 at the location of the A/V recording and communication device 402. In other words, for example, if the proximity zone 470 includes a 300-foot radius around the A/V recording and communication device 402, the generating of the proximity zone 470 may include determining the location data 476 (e.g., geographical coordinates) within the 300-foot radius of the A/V recording and communication device 402. As further discussed above, the proximity zone 470 may be user created (e.g., by selecting a size, setting a region, drawing the proximity zone 470 over a map on the display, etc.). In such examples, in response to receiving the user input for the proximity zone 470 from the client device 404, 406, the A/V recording and communication device 402 may generate the proximity zone 470, similar to described above, by determining the location data 476 (e.g., geographical coordinates) of the proximity zone 470. The location data 476 of the proximity zone 470 may then be compared to the location data 477 (e.g., geographical coordinates from a GPS or) of the client device 407 to determine if the client device 407 is within the proximity zone 470.

In some of the present embodiments, the backend server 430 may transmit the proximity zone 470 to the A/V recording and communication device 402. In such embodiments, the A/V recording and communication device 402 may receive the location data 476 defining the proximity zone 470, and generating the proximity zone 470 may include updating the settings of the A/V recording and communication device 402 with the location data 476 including the proximity zone 470 received from the backend server 430. As such, in response to receiving the location data 477 of the client device 407, the A/V recording and communication device 402 may determine whether the client device 407 is within the proximity zone 470.

In some of the present embodiments, the location data 477 may include (in addition to or in lieu of GPS data) cellular data, such as a Mobile Country Code (MCC), a Mobile Network Code (MNC), a Location Area Code (LAC), and a Cell ID (CID). The cellular data may be used to determine the location data 477 of the client device 407, such as geographical coordinates, which may be compared to the location data 476 of the proximity zone 470 to determine if the client device 407 is within the proximity zone 470.

In some of the present embodiments, as described above, the communication signals 479, 481 may be used to define the proximity zone 470. As an example, in some of the present embodiments, the location data 477 may include Wi-Fi Positioning System (WPS) data, and the WPS data may be used to determine a location of the client device 407. The location of the client device 407 may then be compared to the proximity zone 470 to determine if the client device 407 is within the proximity zone 470. In some of the present embodiments, the location data 477 may include Bluetooth and/or ZigBee data, and the Bluetooth and/or Zigbee data may be used to determine a location of the client device 407. The location of the client device 407 may then be compared to the proximity zone 470 to determine if the client device 407 is within the proximity zone 470.

In embodiments where Wi-Fi data, Bluetooth, ZigBee, and/or other signal types are used, the proximity zone 470 may be defined by signal strength of the Wi-Fi, Bluetooth, ZigBee and/or other signal type signals, rather than by geographical coordinates. For example, the signal strength may be measured as the Received Signal Strength Indication (RSSI) of the Wi-Fi, Bluetooth, ZigBee, and/or other signal type signals. The proximity zone 470 may then be defined (e.g., user defined or by default) by the RSSI values for the Wi-Fi, Bluetooth, ZigBee, and/or other signal type signals that may render a determination that a client device is within the proximity zone 470 (e.g., Bluetooth RSSI greater than −65 dBm on a −100-0 scale). As such, when the RSSI is within the RSSI values for the proximity zone 470, the client device 407 is determined to be within the proximity zone 470. In such embodiments, the A/V recording and communication device 402 may transmit the Wi-Fi, Bluetooth, ZigBee, and/or other signal type signals (e.g., the communication signals 479, 481) using a Wi-Fi, Bluetooth, ZigBee, and/or other signal type transmitter (e.g., a transceiver, a transmitter, or a transmitter-receiver), for example, and the client device 407 may receive the signals (e.g., via a receiver, a transceiver, or a transmitter-receiver) and measure the RSSI values of the signals. After measuring the RSSI values, the client device 407 may transmit the RSSI values to the A/V recording and communication device 402 and/or the backend server 430 to be compared to the RSSI values of the proximity zone 470 to determine if the client device 407 is within the proximity zone 470. In some of the present embodiments, the client device 407 may transmit the Wi-Fi, Bluetooth, ZigBee, and/or other signal type signals using a Wi-Fi, Bluetooth, ZigBee, and/or other signal type transmitter (e.g., a transceiver, a transmitter, or a transmitter-receiver), for example, and the A/V recording and communication device 402 may receive the signals (e.g., via a receiver, a transceiver, or a transmitter-receiver) and measure the RSSI values of the signals, and analyze the RSSI values locally on the A/V recording and communication device 402 and/or transmit the RSSI values to the backend server 430 to be compared to the RSSI values of the proximity zone 470 to determine if the client device 407 is within the proximity zone 470.

In some of the present embodiments, as described above, the proximity zone 470 may be determined by the backend server 430 and transmitted to the A/V recording and communication device 402. In such embodiments, the proximity zone 470 received from the backend server 430 may include the RSSI values that define the proximity zone 470, for example, and the A/V recording and communication device 402 may update the settings of the device 402 to reflect the received proximity zone 470 information.

In examples where ZigBee is implemented, in addition to or in lieu of the RSSI, the location data 477 may be based on active reflector technology, where the active reflector technology may be used to determine a distance of the client device 407 from the A/V recording and communication device 402, and based on the distance, determine if the client device 407 is within the proximity zone 470. In such embodiments, the proximity zone 470 may be defined by a diameter (e.g., 400 feet), and the active reflector technology may be used to determine the estimated location data 477 (e.g., distance) of the client device 407 to determine if the client device 407 is within the proximity zone 470. In such embodiments, the client device 407 and/or the A/V recording and communication device 402 may include ZigBee transceivers.

At block B656, the process may continue to block B638 of FIG. 32 or block B644 of FIG. 33.

The processes of FIGS. 32-35 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIG. 40, the A/V recording and communication device 402 may generate one of the proximity zones 706, 708, 710 for detecting the presence of a client device within (at block B654 of FIG. 35). The A/V recording and communication device 402 may generate the proximity zones 706, 708, 710 according to any of the methods described herein and/or may receive the location data 476 of the proximity zone 470 from the backend server 430.

The A/V recording and communication device 402 may detect the client device 407 within the proximity zone 706, 708, 710 (at block B644 of FIG. 33) and transmit the access request 474 to the client device 407 (at block B638 of FIG. 32). For example, the A/V recording and communication device 402 may listen for communication signals 481 from the client device 407 (and/or other client devices). The A/V recording and communication device 402 may listen at a set interval, such as every second, every 5 seconds, every 10 seconds, or every 30 seconds, for example. The communication signals 481 may include the location data 477 of the client device 407 for the A/V recording and communication device 402 to compare against the proximity zone 470. In another example, the A/V recording and communication device 402 may communicate with the backend server 430 to determine if the client device 407 (and/or other client devices 407) have location data 477 indicative of the client device 407 being within the proximity zone 470, and in response to determining that the client device 407 is within the proximity zone, may transmit the access request 474 to the client device 407 (in some embodiments, via the backend server 430). The A/V recording and communication device 402 may communicate with the backend server 430 to determine if any client devices are within the proximity zone 470 at an interval, such as every second, every 5 seconds, every 10 seconds, every 30 seconds, or at each router check-in, for example.

After transmitting the access request 474, the A/V recording and communication device 402 may receive an acceptance of the access request 474 (at block B640 of FIG. 32). For example, the user 712 of the client device 407 may select the A/V recording and communication device 402 from the device list 478. In response to receiving the acceptance, the A/V recording and communication device 402 may connect to the client device 407 (at block B650 of FIG. 34). After establishing the connection, the A/V recording and communication device 402 may transmit the image data 460 to the client device 407 (at block B642 of FIG. 32). The image data 460 may be transmitted over the user's network 408 and/or the network (Internet/PSTN) 410 to the client device 407 (in some embodiments, via the backend server 430).

With reference to FIGS. 41-43, the A/V recording and communication device 726 (and/or other A/V recording and communication devices within the proximity zone 716) may detect the suspicious activity of the burglar 740 carrying the gun 742. In response, in some of the present embodiments, the A/V recording and communication device 726 may determine (e.g., by detecting the client devices (at block B644 of FIG. 33), by querying the backend processor 430, etc.) if any client devices are within the proximity zone 716 in order to alert the users of the client devices of the suspicious behavior of the burglar 740. In response, the A/V recording and communication device 726 may determine that the client device 407 is within the proximity zone 470. The A/V recording and communication device 726 (in some embodiments, via the backend server 430) may transmit the access request 474 to the client device 407 to allow the client device 407 to access the camera 444 (and/or prerecorded image data 460) of the A/V recording and communication device 726 (at block B638 of FIG. 32). In some of the present embodiments, the access request 474 may be received by the client device 407 (e.g., at block B616 of FIG. 29) and the client device 407, based on the settings of the client application 540, for example, may automatically accept the access request 474 based on the suspicious activity warning/flag included in the access request 474). In other embodiments, the access request 474 may display as a notification on the display 525 of the client device 407 (e.g., a push notification), where the notification may include the suspicious activity warning/flag (e.g., "suspicious activity reported in your immediate vicinity, access video?"). The user 712 of the client device 407 may accept (e.g., at block B618 of FIG. 29) the access request 474 (e.g., automatically, in response to interacting with the notification, by selecting the A/V recording and communication device 726 from the device list 478 of FIG. 42, etc.). In response to the acceptance of the access request 474, the A/V recording and communication device 726 (in some embodiments, via the backend server 430) may receive the acceptance to the access request 474 from the client device 407 (at block B640). In response to receiving the acceptance, the A/V recording and communication device 402 (and/or the backend server 430) may transmit the image data 460 of the burglar 740 to the client device 407 (at block B642). In embodiments where there is a suspicious activity warning/flag, the client device 407 may automatically accept the access request 474, and may automatically display the image data 460 on the display 525 of the client device 407 in order to warn the user 712 of the suspicious activity.

In some of the present embodiments, the image data 460 may be transmitted live, such that the user 712 of the client device 407 can see the current field of view of the camera 444 of the A/V recording and communication device 726. In other embodiments, such as where the burglar 740 has now left the field of view of the camera 444 (e.g., as determined by computer vision), the image data 460 transmitted to the client device 407 may be the pre-recorded image data 460 including the burglar 740. In such embodiments, the user 712 may be able to see the appearance (e.g., physical appearance, identity, clothing, etc.) of the burglar 740 and/or the gun 742 being carried by the burglar 740 and determine that the burglar 740 is in fact suspicious. As a result, the user 712 may be more likely to hide, flee, alert law enforcement, or take other appropriate actions based on the knowledge of the burglar's 740 presence. In addition, the user 712 may access the device list 478 after being notified of the burglar 740, and determine if any of the other A/V recording and communication devices in the proximity zone 716 have identified suspicious activity (e.g., the burglar 740), in order to determine the safest exit route and/or hiding places, for example.

In some of the present embodiments, the warning icons 746 may include a time stamp, such that the user 712 can view when the suspicious activity was detected by the A/V recording and communication devices 724, 725, 726. As such, the warning icon 746 may have a time stamp of 8:05 PM, and another warning icon 746 (not shown) may be included next to the A/V recording and communication device 724 on the device list 478 with a time stamp of 8:15 PM. As such, the user 712 may be able to determine that the burglar 740 may be moving, from left to right, down the street 762 and take appropriate action. In some of the present embodiments, the A/V recording and communication devices 724, 725, 726 may use computer vision (e.g., facial recognition, facial detection, object recognition, etc.) to determine that the suspicious activity is caused by the same person(s) (e.g., the burglar 740) and provide an indication of this determination to the user 712 of the client device 407 (e.g., on the device list 478).

Now referring to FIG. 36, FIG. 36 is a flowchart illustrating a process for accessing cameras of A/V recording and communication devices based on location according to various aspects of the present disclosure. The process 3600 may be similar to the process 2600 of FIG. 26, except the process 3600 may be directed to the processes of the A/V recording and communication device 402 while the process 2600 may be directed to the processes of the client device 407. For example, at block B600 of the process 2600, the client device 407 may transmit the access request 475, and at block B658 of the process 3600, the A/V recording and communication device 402 may receive the access request 475 from the client device 407.

With further reference to FIG. 36, at block B658, the process 3600, in response to a client device entering a proximity zone of an A/V recording and communication device 402, receives, by a processor using a communication module, an access request from the client device for allowing the client device access to a camera. For example, in response to the client device 407 entering the proximity zone 470 of the A/V recording and communication device 402, the processor 452 of the A/V recording and communication device 402 using the communication module 450 may receive the access request 475 from the client device 407 for allowing the client device 407 access to the camera 444 of the A/V recording and communication device 402. For example, in response to entering the proximity zone 470, the user of the client device 470 may receive a notification that the user can access (e.g., is within the proximity zone 470 of the A/V recording and communication device 402) the A/V recording and communication device 402 (e.g., in the device list 478). As a result, the user may request access and the client device 407 may transmit the access request 475 to the A/V recording and communication device 402. In response, the A/V recording and communication device 402 may receive the access request 475.

At block B660, the process 3600, in response to receiving the access request, accepts, by the processor, the access request. For example, in response to receiving the access request 475, the processor 452 of the A/V recording and communication device 402 may accept the access request 475. In some of the present embodiments, the A/V recording and communication device 402 may receive the location data 477 of the client device 407 (e.g., along with the access request 475) and may compare the location data 477 to the proximity zone 470 to determine whether the client device 407 is within the proximity zone 470. Once the A/V recording and communication device 402 has confirmed that the client device 407 is within the proximity zone 470, the A/V recording and communication device 402 may accept the access request 475. In some of the present embodiments, the user/owner of the A/V recording and communication device 402 may receive a notification of the access request 475 from the A/V recording and communication device 402 (in some embodiments via the backend server 430), and may allow access or deny access. If the user/owner allows access, then the A/V recording and communication device 402 may accept the access request 475.

At block B662, the process 3600, in response to the acceptance, transmits, by the processor using the communication module, image data being recorded by the camera to the client device. For example, in response to accepting the access request 475 (at block B660), the processor 452 of the A/V recording and communication device, using the communication module 450, may transmit the image data 460 being recorded by the camera 444 to the client device 407. This process may be similar to that of block B642 of FIG. 32, described above.

Now referring to FIG. 37, FIG. 37 is a flowchart illustrating a process for accessing cameras of A/V recording and communication devices based on location according to various aspects of the present disclosure. At block B664, the process 3700 may continue from block B660 of FIG. 36. At block B666, the process 3700 establishes, by a processor using a communication module, a connection to a client device. For example, the processor 452 of the A/V recording and communication device 402, using the communication module 450, may establish a connection to/communication with the client device 407. This process may be similar to that of block B650 of FIG. 34, described above. At block B668, the process 3700 may continue to block B662 of FIG. 36.

Figure 38:
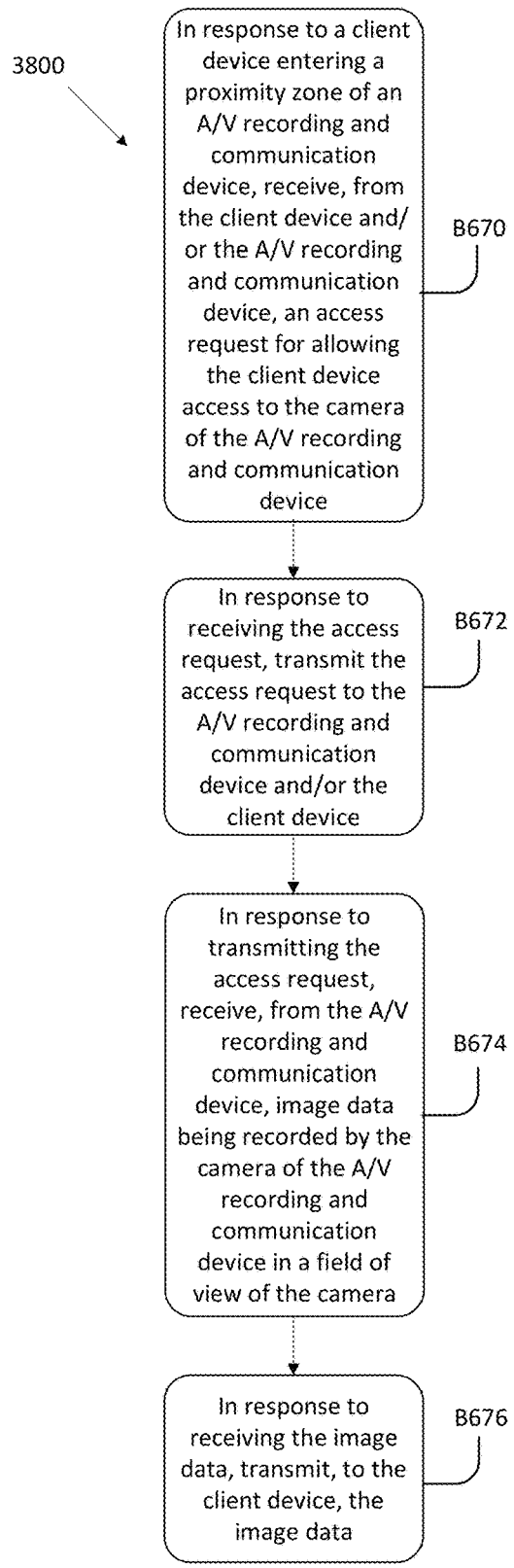

Now referring to FIG. 38, FIG. 38 is a flowchart illustrating a process for accessing cameras of A/V recording and communication devices based on location according to various aspects of the present disclosure. In some of the present embodiments, the process 3800 may be similar to the process 2600 of FIG. 26 and the process 3600 of FIG. 36, except the process 3800 may be directed to the processes of the backend server 430 while the process 2600 may be directed to the processes of the client device 407 and the process 3600 may be directed to the process of the A/V recording and communication device 402. For example, at block B600 of the process 3200, the client device 407 may transmit the access request 475, and at block B670 of the process 3800, the backend server 430 may receive the access request 475 from the client device 407, and at block B672, transmit the access request 475 to the A/V recording and communication device 402. At block B658 of the process 3600, the A/V recording and communication device 402 may receive the access request 475 from the backend server 430.

As another example, in some of the present embodiments, the process 3800 may be similar to the process 2900 of FIG. 29 and the process 3200 of FIG. 32, except the process 3800 may be directed to the processes of the backend server 430 while the process 2900 may be directed to the processes of the client device 407 and the process 3200 may be directed to the process of the A/V recording and communication device 402. For example, at block B638 of the process 3200, the A/V recording and communication device 402 may transmit the access request 474, and at block B670 of the process 3800, the backend server 430 may receive the access request 474 from the A/V recording and communication device 402, and at block B672, transmit the access request 474 to the client device 407. At block B616 of the process 2900, the client device 407 may receive the access request 474 from the backend server 430.

With further reference to FIG. 38, at block B670, the process 3800, in response to a client device entering a proximity zone of an A/V recording and communication device, receives, from the client device and/or the A/V recording and communication device, an access request for allowing the client device access to the camera of the A/V recording and communication device. For example, in response to the client device 407 entering the proximity zone 470 of the A/V recording and communication device 402, the processor 502 of the backend server 430 may receive, from the client device 407 and/or the A/V recording and communication device 402, the access request 474, 475 for allowing the client device 407 access to the camera 444 of the A/V recording and communication device 402. The backend server 430 may receive the access request 474, 475 over the network (Internet/PSTN) 410 using the network interface 520, for example. In some of the present embodiments, the access request 474, 475 may be received in the output signal 466, 467 from the A/V recording and communication device 402 and/or the client device 407. In various embodiments, the access request 475 may further include the location data 477 of the client device 407.

At block B672, the process 3800, in response to receiving the access request, transmits the access request to the A/V recording and communication device and/or the client device. For example, in response to receiving the access request 474, 475 from the A/V recording and communication device 402 and/or the client device 407, the processor 502 of the backend server 430, using the network interface 520, may transmit the access request 474, 475 to the A/V recording and communication device 402 and/or the client device 407. In embodiments where the access request 474 is transmitted to the client device 407, the backend server 430 may receive an acceptance to the access request 474 from the client device 407 and transmit the acceptance to the A/V recording and communication device 402, prior to proceeding to block B674, discussed below.

At block B674, the process 3800, in response to transmitting the access request, receives, from the A/V recording and communication device, image data being recorded by the camera of the A/V recording and communication device in a field of view of the camera. For example, in response to transmitting the access request 474, 475 (and, in some embodiments receiving the acceptance of the access request 474 from the client device 407), the processor 502 of the backend server 430, using the network interface 520, may receive the image data 460 being recorded by the camera 444 of the A/V recording and communication device 402.

At block B676, the process 3800, in response to receiving the image data, transmits, to the client device, the image data. For example, in response to receiving the image data 460, the processor 502 of the backend server 430, using the network interface 520, may transmit the image data 460 to the client device 407.

The process of FIG. 38 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIG. 40, at block B670 of the process 3800, the backend server 430 may receive the access request 474 from the A/V recording and communication device 402 and/or the access request 475 from the client device 407 in response to the user 712 entering the one of the proximity zones 706, 708, 710. For example, in response to the client device 407 entering one of the proximity zones 706, 708, 710, the client device 407 and/or the A/V recording and communication device 402 may transmit the access request 474, 475 to the backend server 430, and the backend server 430 may receive the access request 474, 475 (at block B670). In some of the present embodiments, the client device 407 may receive a notification that the A/V recording and communication device 402 is available for access in response to entering the proximity zone 470, and the user 712 may elect to access the A/V recording and communication device 402. The notification may be received from the backend server 430 and/or the A/V recording and communication device 402.

In some of the present embodiments, at block B672 of the process 3800, in response to receiving the access request 474 from the A/V recording and communication device 402, the backend server 430 may transmit the access request 474 to the client device 407 over the network (Internet/PSTN) 410. In such embodiments, the backend server 430 may receive an acceptance to the access request 474 from the client device 407 (e.g., based on a selection of the device 402 from the device list 478) over the network (Internet/PSTN) 410, and transmit the acceptance to the A/V recording and communication device 402. In other embodiments, at block B672 of the process 3800, in response to receiving the access request 475 from the client device 407, the backend server 430 may transmit the access request 475 to the A/V recording and communication device 402 over the network (Internet/PSTN) 410 and/or the user's network 408.

At block B674 of the process 3800, in response to the access request 474, 475 being transmitted (and in some embodiments, accepted), the backend server 430 may receive the image data 460 being recorded by the camera 444 of the A/V recording and communication device 402. In response to receiving the image data 460, at block B676 of the process 3800, the backend server 430 may transmit the image data 460 to the client device 407.

Figure 39:
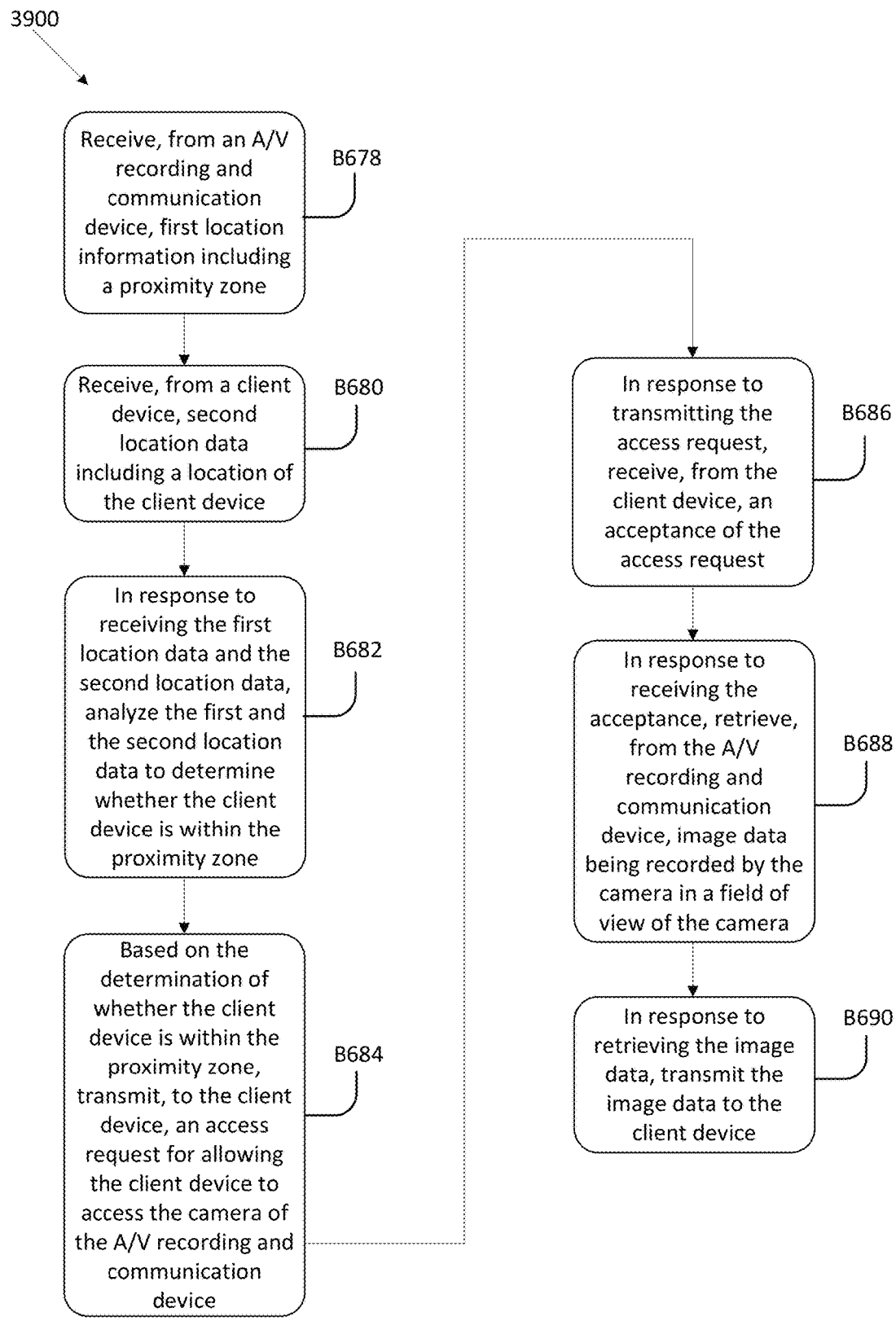

Now referring to FIG. 39, FIG. 39 is a flowchart illustrating a process for accessing cameras of A/V recording and communication devices based on location according to various aspects of the present disclosure. At block B678, the process 3900 receives, from an A/V recording and communication device, first location data including a proximity zone. For example, the processor 502 of the backend server 430 may receive, using the network interface 520, the location data 476 including the proximity zone 470 from the A/V recording and communication device 402. In some of the present embodiments, the processor 502 of the backend server 430 may receive the location data 476 over the network (Internet/PSTN) 410 and/or the user's network 408. The location data 476 may include the location of the A/V recording and communication device 402 based on GPS data, known location data of the access point (e.g., router) that the A/V recording and communication device 402 is connected to for access to the user's network 408, Internet Protocol (IP) address data, WPS data, or the like. In addition, the location data 476 may include the location data 476 for the proximity zone 470. For example, the proximity zone 470 may be defined by all of the geographical coordinates within the proximity zone 470 such that the location data 477 (e.g., geographical coordinates) of the client device 407 (received at block B680) may be compared to the geographical coordinates of the proximity zone 470 to determine if the client device 407 is within the proximity zone 470.

In some of the present embodiments, as described above, the backend server 430 may only receive the location data 476 from the A/V recording and communication device 402, and the processor 502 may generate the proximity zone 470 based on the location data 476 and the settings (e.g., user settings, default settings, etc.) relating to the proximity zone 470. For example, based on the settings, the proximity zone 470 may be defined by a 500-foot radius around the A/V recording and communication device 402. As a result, the backend server 430 may receive the location data 476 of the A/V recording and communication device 402 and determine the location data 476 (e.g., the geographical coordinates) that defines a circle having a 500-foot radius around the A/V recording and communication device 402, and this location data 476 may be stored on the backend server 430 as the proximity zone 470.

At block B680, the process 3900 receives, from a client device, second location data including a location of the client device. For example, the processor 502 of the backend server 430 may receive, using the network interface 520, the location data 477 of the client device 407. In some of the present embodiments, the location data 477 may be received by the backend server 430 over the network (Internet/PSTN) 410. The location data 477 may include the geographical coordinates of the location of the client device 407. The location data 477 may be based on GPS data, Cell ID (as described above), or the like.

In other embodiments, as described above, the proximity zone 470 may be defined by the signal strength of the communication signals 479, 481, such as the RSSI values of the communication signals 479, 481. In such embodiments, the client device 407 and/or the A/V recording and communication device 402 may measure the RSSI values of the communication signals 479, 481 received from the other device (e.g., the client device 407 may measure the RSSI values of the communication signals 479 received from the A/V recording and communication device 402) and transmit the RSSI values to the backend server 430. In such embodiments, the location data 476, 477 may include the RSSI values, and the location data 476, 477 may be received by the backend server 430 from the A/V recording and communication device 402 and/or the client device 407. In such embodiments, the proximity zone 470 may be defined by a threshold RSSI value for the signal strength of the communication signals 479, 481. For example, the proximity zone 470 may be defined by ZigBee RSSI values greater than −80 dBm (e.g., on a −100-0 scale), such that if the RSSI values for ZigBee communication signals 479, 481 are greater than −80 dBm (e.g., −60 dBm), the client device 407 may be determined to be within the proximity zone 470.

At block B682, the process 3900, in response to receiving the first location data and the second location data, analyzes the first and the second location data to determine whether the client device is within the proximity zone. For example, the processor 502 of the backend server 430 may analyze the location data 477 of the client device and the location data 476 of the proximity zone 470 to determine whether the client device 407 is within the proximity zone 470. For example, the processor 502 may compare the geographical coordinates from the location data 477 of the client device 407 to the geographical coordinates that define the proximity zone 470 to determine whether the client device 407 is within the proximity zone 470. In such an example, if it is determined that the geographical coordinates from the location data 477 of the client device 407 are included in the geographical coordinates of the location data 476 of the proximity zone 470, it may be determined that the client device 407 is within the proximity zone 470.

At block B684, the process 3900, based on the determination of whether the client device is within the proximity zone (at block B682), transmits, to the client device, an access request for allowing the client device to access the camera of the A/V recording and communication device. For example, based on the determination of whether the client device 407 is within the proximity zone 470, the processor 502 of the backend server 430 may transmit, using the network interface 520, the access request 474 to the client device 407 (e.g., over the network (Internet/PSTN) 410) for allowing the client device 407 to access the camera 444 (and/or the image data 460) of the A/V recording and communication device 402. In response, the access request 474 may be received by the client device 407, similar to that of block B616 of FIG. 29, described above. For example, in response to receiving the access request 474, the client device 407 may provide a notification to the user of the client device 407 (e.g., by listing the A/V recording and communication device 402 in the device list 478) that the client device 407 may access the A/V recording and communication device 402.

At block B686, the process 3900, in response to the transmitting the access request, receives, from the client device, an acceptance of the access request. For example, in response to transmitting the access request 474 to the client device 407, the processor 502 of the backend server 430, using the network interface 520, may receive the acceptance of the access request 474 (e.g., over the network (Internet/PSTN) 410). As an example, in response to receiving the access request 474, the client device 407 may provide a notification to the user of the client device 407 (e.g., in the device list 478), that the A/V recording and communication device 402 is accessible by the client device 407. In response, the user of the client device 407 may select the A/V recording and communication device 402 from the device list 478, and the client device 407 may transmit the acceptance.

In some of the present embodiments, the access request 474 may not be transmitted to the client device 407 (at block B684) and as a result, an acceptance to the access request 474 may not be received (at block B686). In such embodiments, the process 3900 may continue directly to block B688 after block B688.

In some of the present embodiments, the location data 477 received from the client device 407 (at block B680) may also include the access request 475 from the client device 407. In such embodiments, the access request 475 may be a general access request from the client device 407, such that the user of the client device 407 may want to connect/communicate with at least one A/V recording and communication device (which may include the A/V recording and communication device 402). As such, at block B682, the processor 502 of the backend server 430 may determine if the client device 407, based on the location data 477, is within the proximity zone 470 of any A/V recording and communication devices, such as the A/V recording and communication device 402.

In other embodiments, the user of the client device 407 may have been provided with a notification that the A/V recording and communication device 402 is accessible (e.g., that the client device 407 is within the proximity zone 470 of the A/V recording and communication device 402) and, in response to the user's input to access the A/V recording and communication device 402, the client device 407 may transmit the access request 475. In such an example, the analyzing of the location data 476 and the location data 477 (at block B682) may be a verification that the client device 407 is within the proximity zone 470, and, after the verification, the process 3900 may continue to block B688.

With further reference to FIG. 39, at block B688, the process 3900, in response to receiving the acceptance, retrieves, from the A/V recording and communication device, image data being recorded by the camera in a field of view of the camera. For example, in response to receiving the acceptance of the access request 474 (or in some embodiments, as described above, where there is no acceptance of the access request 474, such as where the client device 407 transmits the access request 475), the processor 502 of the backend server 430 may retrieve the image data 460 recorded by the camera 444 in a field of view of the camera 444. For example, as described above, the image data 460 may be a live recording, and the backend server 430 may receive the live recording from the camera 444 over the network (Internet/PSTN) 410 using the network interface 520. In other embodiments, the image data 460 may be stored on the A/V recording and communication device 402, and the backend server 430 may retrieve the image data 460 from the A/V recording and communication device 402. In some of the present embodiments, the A/V recording and communication device 402 may be programmed to transmit the image data 460 to the backend server 430 each time the camera 444 records the image data 460. In such embodiments, the image data 460 recorded by the A/V recording and communication device 402 may already be stored on the backend server 430, and the backend server 430 may retrieve the image data 460 from the non-volatile memory 506, for example.

At block B690, the process 3900, in response to retrieving the image data, transmits the image data to the client device. For example, in response to retrieving the image data 460, the processor 502 of the backend server 430, using the network interface 520, may transmit the image data 460 to the client device 407. In some of the present embodiments, the image data 460 may be transmitted over the network (Internet/PSTN) 410. In response, the client device 407 may receive the image data 460 and display a virtual representation of the image data 460 on the display 525.

The processes of FIG. 39 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIGS. 41-43, the backend server 430 may receive the location data 476 from at least one of the A/V recording and communication device 724, 725, 726 (at block B678). In some embodiments, the backend server 430 may receive the location data 476 from each of the A/V recording and communication devices 724, 725, 726 during each set-up/activation process of the devices 724, 725, 726. In addition, the backend server 430 may receive the proximity zone 716 of each of the A/V recording and communication devices 724, 725, 726 and/or may generate the proximity zone 716, as described above. The backend server 430 may receive the location data 477 of the client device 407 (at block B680). In some of the present embodiments, the client device 407 (and/or other client devices) may transmit their location to the backend server 430 at an interval, such as every 10 seconds, every 20 seconds, every 30 seconds, or every minute, for example. In some of the present embodiments, the backend server 430 may receive the image data 460 from the A/V recording and communication devices 724, 725, 726, and may determine if the image data 460 includes any suspicious activity (e.g., suspicious activity warnings/flags). In response to determining that the image data 460 includes suspicious activity, the backend server 430 may analyze the location data 477 received from the client device 407 (and/or other client devices) to determine if the client device 407 is within the proximity zone 716 of the A/V recording and communication device 726 that generated the image data 460 including the suspicious activity (at block B682). In response to determining that the client device 407 is within the proximity zone 716, the backend server 430 may transmit the access request 474 to the client device 407 (at block B684), as described above, and may receive the acceptance of the access request 474 from the client device 407 (at block B686). In response to receiving the acceptance, the backend server 430 may retrieve (at block B688) and transmit (at block B690) the image data 460 from the A/V recording and communication device 726 to the client device 407.

In some of the present embodiments, the image data 460 may be transmitted live, such that the user 712 of the client device 407 can see the current field of view of the camera 444 of the A/V recording and communication device 726. In other embodiments, such as where the burglar 740 has now left the field of view of the camera 444 (e.g., as determined by computer vision), the image data 460 transmitted to the client device 407 may be the pre-recorded image data 460 including the burglar 740, and thus may be retrieved from the non-volatile memory 506 of the backend server 430 and/or from the A/V recording and communication device 726. In such embodiments, the user 712 may be able to see the appearance (e.g., physical appearance, identity, clothing, etc.) of the burglar 740 and/or the gun 742 being carried by the burglar 740 and determine that the burglar 740 is in fact suspicious. As a result, the user 712 may be more likely to hide, flee, alert law enforcement, or take other appropriate actions based on the knowledge of the burglar's 740 presence. In addition, the user 712 may access the device list 478 after being notified of the burglar 740, and determine if any of the other A/V recording and communication devices in the proximity zone 716 have identified suspicious activity (e.g., the burglar 740), in order to determine the safest exit route and/or hiding places, for example.

The processes 2600-3900, described above, may provide users of client devices that may not be associated with A/V recording and communication devices in the user's vicinity, access to image data recorded by the A/V recording and communication devices. As a result, the user may be more likely to avoid dangerous and/or suspicious situations that the user may not otherwise be made aware of. For example, the user may be able to view video of a suspicious person in the vicinity of the user by accessing the camera of an A/V recording and communication device in the user's vicinity. After viewing the suspicious person, the user may turn around and decide to take an alternate route, or the user may alert law enforcement, ultimately preventing or detecting criminal activity. As a result, the overall public safety may be enhanced, as persons may be more likely to avoid dangerous scenarios that they otherwise may not have been aware of.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

Figure 44:
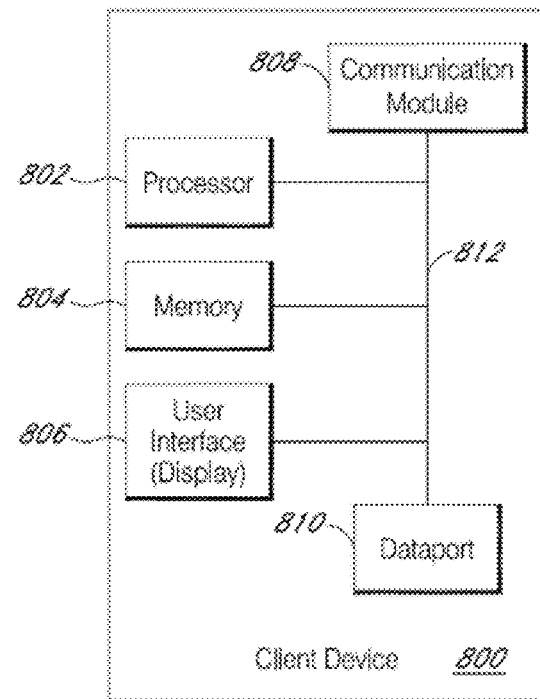
FIG. 44 is a functional block diagram of a client device on which the present embodiments may be implemented according to various aspects of the present disclosure.

FIG. 44 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 44, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 45:
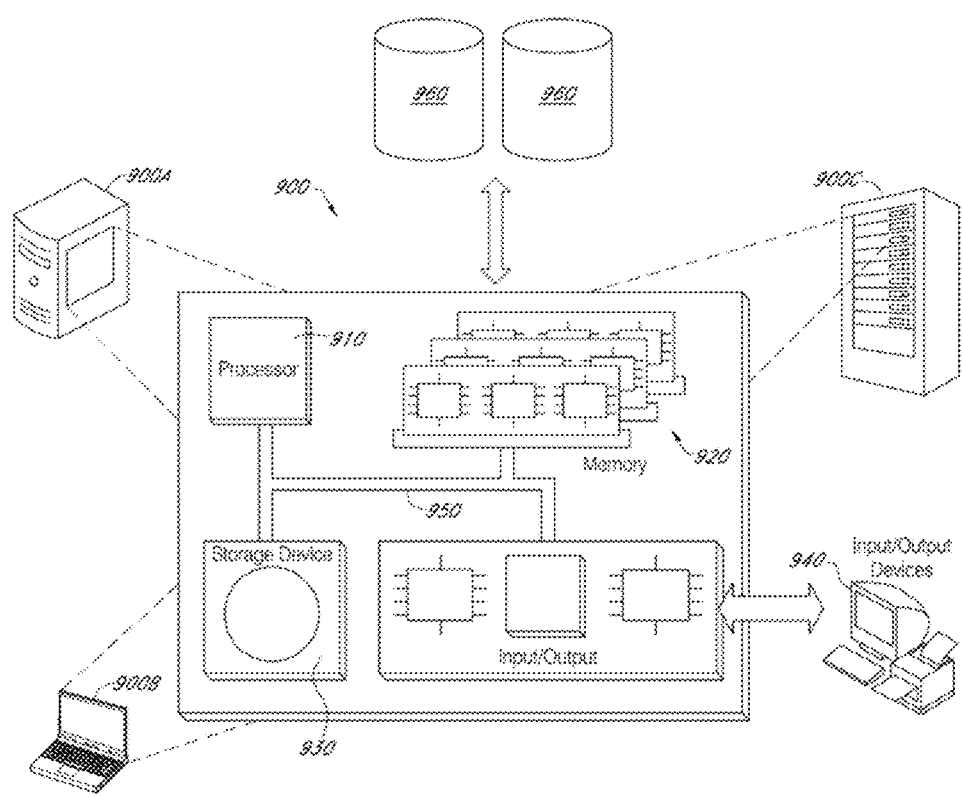
FIG. 45 is a functional block diagram of a general-purpose computing system on which the present embodiments may be implemented according to various aspects of present disclosure.

FIG. 45 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for at least one server for providing access to an audio/video recording and communication device (A/V device), the method comprising:
   receiving, from a first client device associated with the A/V device, first data representing a proximity zone for access to the A/V device, wherein the proximity zone is defined about the A/V device;
   receiving, from a second client device, second data representing a location of the second client device;
   determining that the location of the second client device is within the proximity zone for access to the A/V device based at least in part on the first data and the second data;
   transmitting, to the second client device, third data indicating that the A/V device is accessible;
   receiving, from the second client device, a request for access to the A/V device; and
   based at least in part on the request for access to the A/V device, transmitting image data generated by a camera of the A/V device to the second client device.

2. The method of claim 1, further comprising:
   determining fourth data representing an additional proximity zone for an additional A/V device;
   determining that the location of the second client device is within the additional proximity zone for access to the additional A/V device based at least in part on the second data and the fourth data;
   transmitting, to the second client device, fifth data indicating that the additional A/V device is accessible;
   receiving, from the second client device, an additional request for access to the additional A/V device; and
   based at least in part on the additional request for access to the additional A/V device, transmitting additional image data generated by a camera of the additional A/V device to the second client device.

3. The method of claim 1, wherein the third data, when received by the second client device, causes display of a user interface element representing the A/V device.

4. The method of claim 3, wherein the receiving the request is in response to selection of the user interface element.

5. The method of claim 1, wherein the first data is received from the first client device in response to one or more inputs to the first client device defining the proximity zone.

6. The method of claim 5, wherein the one or more inputs include at least one of:
   at least one first input defining a radius extending from a location of one of the A/V device or a physical address where the A/V device is installed;
   at least one second input drawing the proximity zone over a map; or
   at least one third input selecting a region.

7. The method of claim 1, further comprising:
   based at least in part on the first data, determining the proximity zone; and
   based at least in part on the second data, determining the location of the second client device,
   wherein the determining that the location of the second client device is within the proximity zone for access to the A/V device based at least in part on the first data and the second data comprises comparing the proximity zone to the location of the second client device.

8. A method for at least one server for providing access to an audio/video recording and communication device (A/V device), the method comprising:
   determining a location of a proximity zone for access to the A/V device, wherein the proximity zone is defined about the A/V device;
   receiving, from a client device, first data representing a location of the client device;
   comparing the location of the proximity zone to the location of the client device;
   based at least in part on the comparing, determining that the location of the client device is within the proximity zone for access to the A/V device;
   transmitting, to the client device, second data indicating that video generated by the A/V device is accessible;
   receiving, from the client device, a request for the video;
   based at least in part on the request for the video, transmitting image data representing the video generated by the A/V device to the client device.

9. The method of claim 8, wherein the determining the location of the proximity zone for access to the A/V device comprises receiving, from an additional client device associated with the A/V device, fourth data defining the proximity zone.

10. The method of claim 8, wherein the determining the proximity zone for access to the A/V device comprises:
    determining a location of the A/V device;
    determining at least one setting associated with the proximity zone of the A/V device; and
    based at least in part on the at least one setting, determining the proximity zone for access to the A/V device.

11. The method of claim 8, further comprising:
    determining a condition is present at the A/V device,
    wherein the transmitting the second data indicating that the video generated by the A/V device is accessible is based at least in part on the condition being present at the A/V device.

12. The method of claim 11, wherein the condition present at the A/V device includes a determination that a suspicious person is present at the A/V device.

13. The method of claim 11, wherein the condition present at the A/V device includes a determination that suspicious activity is happening at the A/V device.

14. The method of claim 11, wherein the condition present at the A/V device includes a determination that a user associated the A/V device is present at the A/V device.

15. The method of claim 8, further comprising:
    determining an additional proximity zone for an additional A/V device;
    determining that the location of the client device is within the additional proximity zone;
    transmitting, to the client device, fifth data indicating that additional video generated by the additional A/V device is accessible;
    receiving, from the client device, an additional request for access to the additional video;
    based at least in part on the additional request for access to the additional video, transmitting additional image data representing the additional video generated by the additional A/V device to the client device.

16. A method for a client device, the method comprising:
    transmitting first data indicating a location of the client device;
    receiving second data representing a first A/V recording and communication device (A/V device) associated with a first proximity zone for access to the first A/V device, wherein the first proximity zone is defined about the first A/V device, and wherein the first A/V device is accessible by the client device based on the location of the client device being within the first proximity zone;

receiving third data representing a second A/V device associated with a second proximity zone for access to the second A/V device, wherein the second proximity zone is defined about the second A/V device, wherein the second A/V device is accessible by the client device based on the location of the client device being within the second proximity zone;

displaying, on a display of the client device, a first user interface element representing the first A/V device;

displaying, on the display of the client device, a second user interface element representing the second A/V device;

receiving an input of a selection of the first user interface element;

transmitting, based at least in part on the input, fourth data representing a request for access to the first A/V device;

receiving image data generated by the first A/V device; and displaying, on the display of the client device, video represented by the image data.

17. The method of claim 16, further comprising:

receiving an additional input of a selection of the second user interface element;

transmitting, based at least in part on the additional input, fifth data representing an additional request for access to the second A/V device;

receiving additional image data generated by the second A/V device; and displaying, on the display of the client device, additional video represented by the additional image data.

18. The method of claim 16, wherein the transmitting the first data is at a first time, the method further comprising:

transmitting, at a second time different from the first time, fifth data representing another location of the client device;

receiving sixth data representing a third A/V device accessible by the client device based at least in part on the another location of the client device; and displaying, on the display of the client device, a third user interface element representing the third A/V device.

19. The method of claim 16, wherein the transmitting the first data is at a first time, the method further comprising:

transmitting, at a second time different from the first time, fifth data representing another location of the client device;

receiving sixth data representing the first A/V device no longer being accessible by the client device based at least in part on the another location of the client device; and removing the first user interface element from the display of the client device.

20. The method of claim 16, wherein the first user interface element and the second user interface element are displayed on the display of the client device as a list.

* * * * *